US012574110B2

(12) United States Patent
Vaez-Ghaemi et al.

(10) Patent No.: US 12,574,110 B2
(45) Date of Patent: Mar. 10, 2026

(54) MODULAR CELL SITE INSTALLATION, TESTING, MEASUREMENT, AND MAINTENANCE TOOL

(71) Applicant: VIAVI SOLUTIONS INC., Chandler, AZ (US)

(72) Inventors: Reza Vaez-Ghaemi, Potomac, MD (US); Craig Stephen Boledovic, Walkersville, MD (US); Andrew Thomas Rayno, Frederick, MD (US); Waleed Wardak, Ashburn, VA (US); Michael Jon Bangert, Jr., Kensington, MD (US); Kanwaljit Singh Rekhi, Potomac, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 291 days.

(21) Appl. No.: 18/455,457

(22) Filed: Aug. 24, 2023

(65) Prior Publication Data

US 2024/0063900 A1     Feb. 22, 2024

Related U.S. Application Data

(63) Continuation of application No. 17/707,625, filed on Mar. 29, 2022, now Pat. No. 11,784,712, which is a continuation of application No. 17/061,266, filed on Oct. 1, 2020, now Pat. No. 11,323,176.

(51) Int. Cl.
*H04B 10/00* (2013.01)
*G02B 6/42* (2006.01)
*H04B 10/071* (2013.01)

(52) U.S. Cl.
CPC ......... *H04B 10/071* (2013.01); *G02B 6/4277* (2013.01); *G02B 6/4284* (2013.01)

(58) Field of Classification Search
CPC .. H04B 10/071; G02B 6/4277; G02B 6/4284; G01M 11/3109
See application file for complete search history.

(56) References Cited

U.S. PATENT DOCUMENTS

| | | | | |
|---|---|---|---|---|
| 5,398,276 A | * | 3/1995 | Lemke | H04W 24/00 |
| | | | | 379/1.01 |
| D363,440 S | * | 10/1995 | Hoofnagle | D10/78 |
| 5,511,108 A | * | 4/1996 | Severt | G01R 15/12 |
| | | | | 379/22 |
| 5,521,958 A | * | 5/1996 | Selig | H04M 3/247 |
| | | | | 379/27.01 |
| 5,592,528 A | * | 1/1997 | Nelson | H02J 7/0045 |
| | | | | 455/67.11 |

(Continued)

*Primary Examiner* — Agustin Bello
(74) *Attorney, Agent, or Firm* — Mannava & Kang, P.C.

(57) ABSTRACT

A cell site test tool provides field technicians with resources to support multiple aspects of cell site testing. The cell site test tool includes multiple, integrated and removably connectable modules such as a base module, a user interface module, and a battery module. Additional modules include a CPRI module to provide Common Public Radio Interface testing, an OTDR module to provide dedicated Optical Time-Domain Reflectometer testing, a CAA module to provide Cable Antenna Analysis testing, a fiber inspection module to visually inspect optical fiber, and an SA/CPRI module to provide Radio Frequency over Common Public Radio Interface testing.

20 Claims, 37 Drawing Sheets

(56) References Cited

U.S. PATENT DOCUMENTS

| | | | | |
|---|---|---|---|---|
| 5,619,489 | A * | 4/1997 | Chang | H04J 3/14 370/254 |
| 5,677,633 | A * | 10/1997 | Moser | G01R 31/58 324/540 |
| 6,064,721 | A * | 5/2000 | Mohammadian | H04M 1/24 379/10.01 |
| 6,405,049 | B2 * | 6/2002 | Herrod | G07G 1/0018 455/552.1 |
| 6,466,767 | B1 * | 10/2002 | Lidbrink | H04W 16/20 455/67.11 |
| 6,516,053 | B1 * | 2/2003 | Ryan | H04M 3/308 379/19 |
| 6,611,147 | B2 * | 8/2003 | White | G01R 31/58 324/538 |
| 6,657,214 | B1 * | 12/2003 | Foegelle | G01R 29/0821 333/228 |
| 7,234,880 | B1 | 6/2007 | Charny et al. | |
| 7,302,361 | B2 * | 11/2007 | Baleta | H04L 43/50 702/182 |
| 7,477,521 | B2 | 1/2009 | Charny et al. | |
| 7,769,297 | B2 | 8/2010 | Royle et al. | |
| 8,310,383 | B2 | 11/2012 | Royle et al. | |
| 8,311,486 | B2 * | 11/2012 | Negami | H04B 17/23 455/67.14 |
| 8,694,306 | B1 * | 4/2014 | Short | G10L 15/14 704/200 |
| 8,706,047 | B2 | 4/2014 | Sato et al. | |
| 8,903,324 | B1 | 12/2014 | Bradley | |
| 9,042,839 | B2 * | 5/2015 | Takahashi | H04L 41/145 455/67.14 |
| 9,098,605 | B2 * | 8/2015 | Kitagawa | G06F 11/327 |
| 9,288,683 | B2 * | 3/2016 | Garcia | H04W 24/08 |
| 9,294,945 | B2 | 3/2016 | Takizawa et al. | |
| 9,313,682 | B2 * | 4/2016 | Tanaka | H04B 17/382 |
| D763,712 | S * | 8/2016 | Recoura-Massaquant | D10/78 |
| D764,328 | S * | 8/2016 | Lafrance | D10/78 |
| 9,485,682 | B2 | 11/2016 | Samejima et al. | |
| D773,946 | S * | 12/2016 | Hoofnagle | D10/78 |
| 9,756,515 | B1 * | 9/2017 | Ross | H04W 4/60 |
| 9,945,906 | B2 | 4/2018 | Schnizler et al. | |
| D821,235 | S * | 6/2018 | Howell | D10/78 |
| 10,009,784 | B1 * | 6/2018 | Evircan | H04L 41/142 |
| 10,064,075 | B2 * | 8/2018 | Baldwin | H04W 24/06 |
| 10,101,240 | B1 * | 10/2018 | Bonche | H04B 10/071 |
| 10,165,459 | B2 * | 12/2018 | Jack | H04W 24/08 |
| 10,470,070 | B1 * | 11/2019 | Ghaemi | H04W 24/10 |
| 10,598,566 | B2 | 3/2020 | Bonche et al. | |
| 10,659,178 | B2 * | 5/2020 | Martel | G01M 11/3109 |
| 10,892,922 | B2 * | 1/2021 | Eun | H04L 27/32 |
| 11,018,761 | B2 * | 5/2021 | Ahadian | H04B 10/0793 |
| 11,029,347 | B2 * | 6/2021 | Brant | G01R 31/003 |
| 11,122,158 | B2 * | 9/2021 | Christie | H04M 1/72436 |
| 11,277,763 | B2 * | 3/2022 | Ueda | H04B 17/23 |
| 11,323,176 | B2 * | 5/2022 | Vaez-Ghaemi | G01M 11/3109 |
| 11,490,456 | B2 * | 11/2022 | Nguyen | H04W 92/12 |
| 11,540,234 | B2 * | 12/2022 | Di Pietro | H04W 24/10 |
| 11,784,712 | B2 * | 10/2023 | Vaez-Ghaemi | G02B 6/4277 398/115 |
| 2002/0109509 | A1 * | 8/2002 | Ziegler | H04M 3/308 324/556 |
| 2002/0175689 | A1 * | 11/2002 | White | H04L 43/50 324/628 |
| 2014/0295901 | A1 * | 10/2014 | Griffioen | H04W 24/00 455/507 |
| 2017/0237484 | A1 * | 8/2017 | Heath | H04L 43/045 398/26 |
| 2017/0245162 | A1 * | 8/2017 | Beck | H04L 43/50 |
| 2018/0062703 | A1 * | 3/2018 | Fang | H02J 9/06 |
| 2018/0081047 | A1 * | 3/2018 | Gander | H04B 17/0085 |
| 2018/0295553 | A1 * | 10/2018 | Abdelmonem | H04W 72/29 |
| 2018/0323815 | A1 * | 11/2018 | Beadles | H04W 24/08 |
| 2018/0352451 | A1 * | 12/2018 | Bonnett | H04W 24/06 |
| 2018/0368801 | A1 * | 12/2018 | Allen | G06F 1/3218 |
| 2019/0044840 | A1 * | 2/2019 | Agrawal | H04L 43/50 |
| 2019/0058534 | A1 * | 2/2019 | Anderson | H04B 17/345 |
| 2019/0246345 | A1 * | 8/2019 | Murthy | H04B 17/0085 |
| 2019/0386753 | A1 * | 12/2019 | Martel | H04B 10/071 |
| 2020/0145264 | A1 * | 5/2020 | Eun | H04L 25/08 |
| 2020/0198805 | A1 * | 6/2020 | Brüchmann | B64D 11/0015 |
| 2020/0228210 | A1 * | 7/2020 | Lapierre | H04B 17/29 |
| 2020/0252125 | A1 * | 8/2020 | Martel | H04B 10/27 |
| 2020/0252144 | A1 * | 8/2020 | Levesque | H04W 24/08 |
| 2021/0176716 | A1 * | 6/2021 | Di Pietro | H04W 52/34 |
| 2021/0263881 | A1 * | 8/2021 | Jäger | G06F 15/7867 |
| 2021/0345142 | A1 * | 11/2021 | Vierimaa | H04W 24/06 |
| 2021/0359762 | A1 * | 11/2021 | Barlow | H04B 10/0795 |
| 2022/0109498 | A1 * | 4/2022 | Vaez-Ghaemi | H04B 10/071 |
| 2022/0294528 | A1 * | 9/2022 | Vaez-Ghaemi | G02B 6/4277 |
| 2023/0017470 | A1 * | 1/2023 | Niiranen | G01R 31/2844 |
| 2024/0063900 | A1 * | 2/2024 | Vaez-Ghaemi | G02B 6/4284 |

* cited by examiner

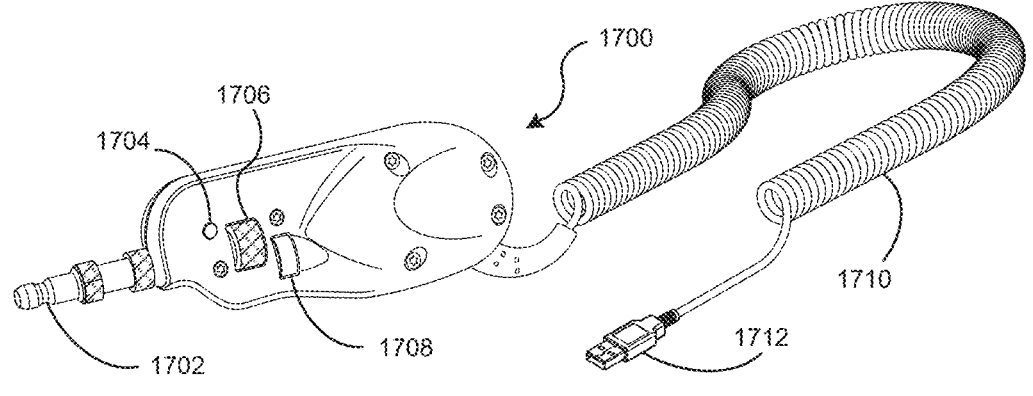
FIG. 17
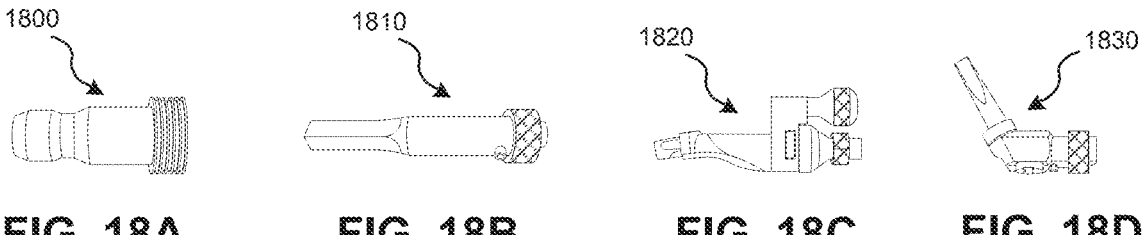
FIG. 18A      FIG. 18B      FIG. 18C      FIG. 18D

2000

2002 — FDD ?

2010 — Run Gated Sweep

2004 — Select and Run Test Case (TC) TC-1 or TC-2

2006 — Event = 0 ?

2012 — Spectrum Logging / RtSA

2014 — Check Spectral flatness

2016 — Check RSSI (Ch. Power)

2008 — Generate Test Report

2102 — Connect to Antenna 0

2100

2104 — FDD?

2106 — Run Gated Sweep

2108 — Select and Run Test Case (TC) TC-1 or TC-2

2110 — Event = 0

2112 — Check Spectral flatness

2114 — Check RSSI (Ch. Power)

2116 — Change to Antenna 1

2118 — FDD?

2120 — Run Gated Sweep

2122 — Select and Run Test Case (TC) TC-1 or TC-2

2124 — Event = 0

2126 — Check Spectral flatness

2128 — Check RSSI (Ch. Power)

2130 — Generate Test Report

2400

Conducted Conformance Test

2402 — FDD ?

2404 — Run Gated Sweep

2406 — Define external offset
Cable Loss, Coupler Offset

2408 — Channel setting
CF, Bandwidth, RBW, Atten,
AVG

2410 — Channel Power
Pass/Fail test with High/Low
limit

2412 — ACLR
Pass/Fail test with low limit

2414 — SEM
Pass/Fail test with predefined
Mask

2416 — Spurious Emission
Pass/Fail test with predefined
Mask

2418 — Generate Test Report

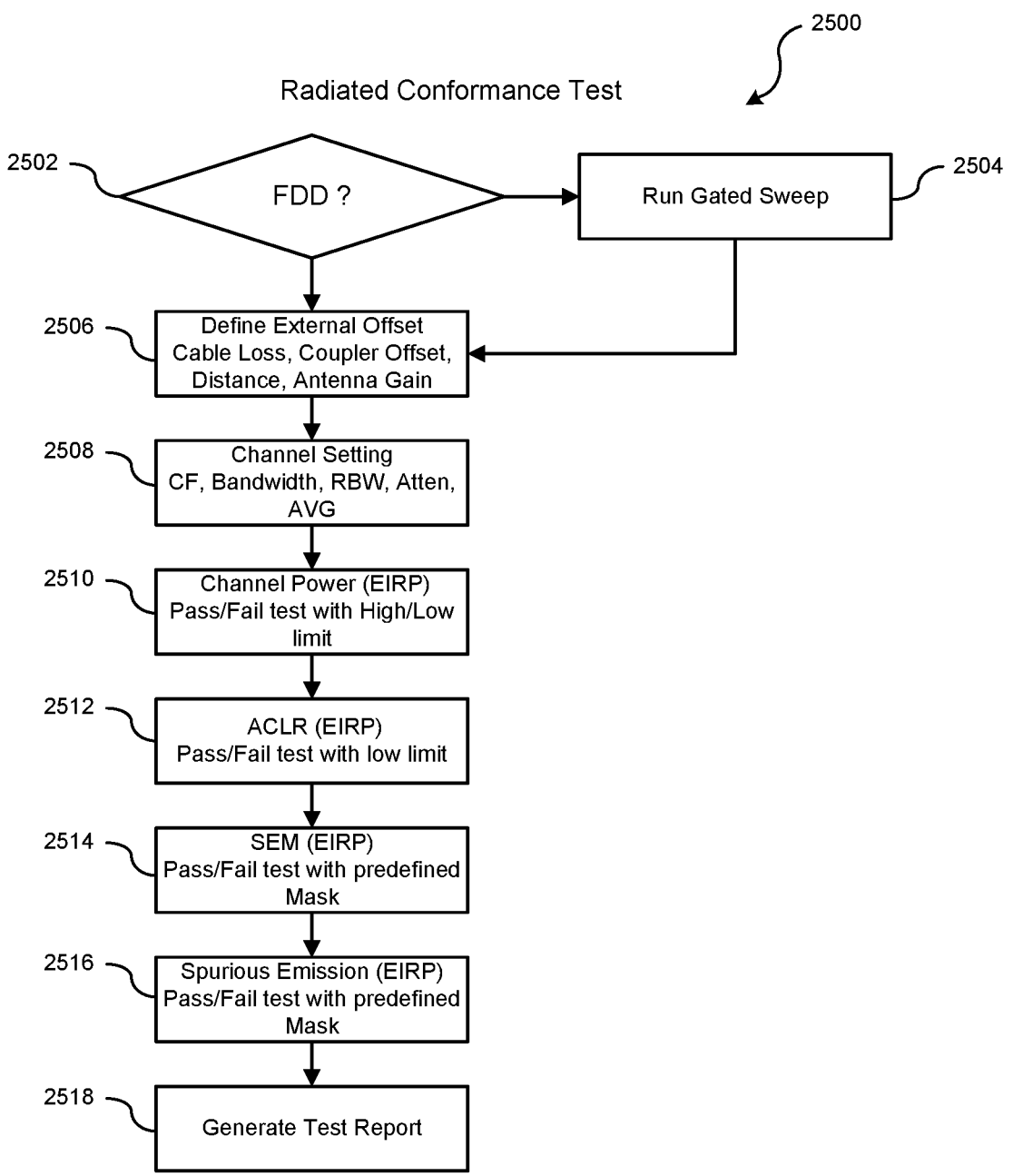

2500

Radiated Conformance Test

2502 — FDD ?

2504 — Run Gated Sweep

2506 — Define External Offset
Cable Loss, Coupler Offset,
Distance, Antenna Gain 2508 — Channel Setting
CF, Bandwidth, RBW, Atten,
AVG 2510 — Channel Power (EIRP)
Pass/Fail test with High/Low
limit 2512 — ACLR (EIRP)
Pass/Fail test with low limit 2514 — SEM (EIRP)
Pass/Fail test with predefined
Mask 2516 — Spurious Emission (EIRP)
Pass/Fail test with predefined
Mask 2518 — Generate Test Report

FIG. 25

MODULAR CELL SITE INSTALLATION, TESTING, MEASUREMENT, AND MAINTENANCE TOOL

CROSS REFERENCE TO RELATED APPLICATIONS

This patent application is a Continuation of commonly assigned and co-pending U.S. patent application Ser. No. 17/707,625, filed on Mar. 29, 2022, which is a Continuation of commonly assigned and co-pending U.S. patent application Ser. No. 17/061,266, filed on Oct. 1, 2020, now U.S. Pat. No. 11,323,176, the disclosure of which are hereby incorporated by reference in their entireties.

BACKGROUND

A cell site, also known as a cell tower or cellular base station, includes an antenna and electronic communications equipment to support cellular mobile device communication. The antenna and equipment are typically placed in connection with a radio mast or tower, and the equipment generally connects cell site air interfaces to wireline networks, which may be comprised of fiber optic cables and coaxial cables. Cellular mobile devices communicating with a single cell tower generally constitute a local subnetwork, while the connection between the cell tower and the rest of the world may be referred to as a backhaul link or simply backhaul. A backhaul may include wired, fiber optic and wireless components, such as microwave transmission equipment. Fronthaul is associated with a Radio Access Network (RAN) architecture including centralized Base Band Units (BBUs), i.e. baseband controllers, and stand-alone Remote Radio Heads (RRHs) installed at remote cell sites. These BBU and RRH functional blocks, as well as the equipment that performs these functions, are located further away from each other than in prior mobile backhaul models. The RRH is typically located at the cell site, whereas the BBU is located in a centralized and protected location where it serves multiple RRHs. The optical links that interconnect the newly BBU and the multiple RRHs may be referred to as fronthaul.

Alternate terms may be used to describe a cell site. For example, in Global System for Mobile Communications (GSM) networks, the term Base Transceiver Station (BTS) or simply base station may be used. Multiple cellular providers often mount their antennas on a common shared mast, and may use different frequencies to minimize interference. Some cellular providers operate multiple cellular networks and similarly use co-located base stations for two or more cellular networks. With over 300,000 cell sites in the United States and numerous generations of cellular air interfaces, the number of potential failure points in the communications chain can be daunting.

With proper equipment and training, modern cell sites may be serviced by a technician, and thereby reduce the need for an on-site Radio Frequency (RF) engineer. The technician may be responsible for proper operation of a large group of network elements. Technician responsibilities may include installation, preventative and remedial maintenance, optimization, and integration of network hardware and interconnect facilities. Other responsibilities may include maintaining and repairing base station equipment and transmitters, testing and analyzing network coverage to ensure contiguous communication, testing network integrity and quality, updating databases with site-specific information, preparing reports for system documentation, and performing audits required by local, regional, corporate or regulatory agencies.

BRIEF DESCRIPTION OF THE DRAWINGS

Features of the present disclosure are illustrated by way of examples shown in the following figures. In the following figures, like numerals indicate like elements, in which:

FIG. 17 illustrates a fiber microscope used to test fiber by a cell site tool, according to an example of the present disclosure;

FIG. 18A-D illustrate various fiber microscope inspection tips that may be attached to a fiber microscope during fiber testing, according to an example of the present disclosure;

FIG. 25 illustrates a workflow for a Radiated Conformance Test, according to an example of the present disclosure;

DETAILED DESCRIPTION

Figure 1A:
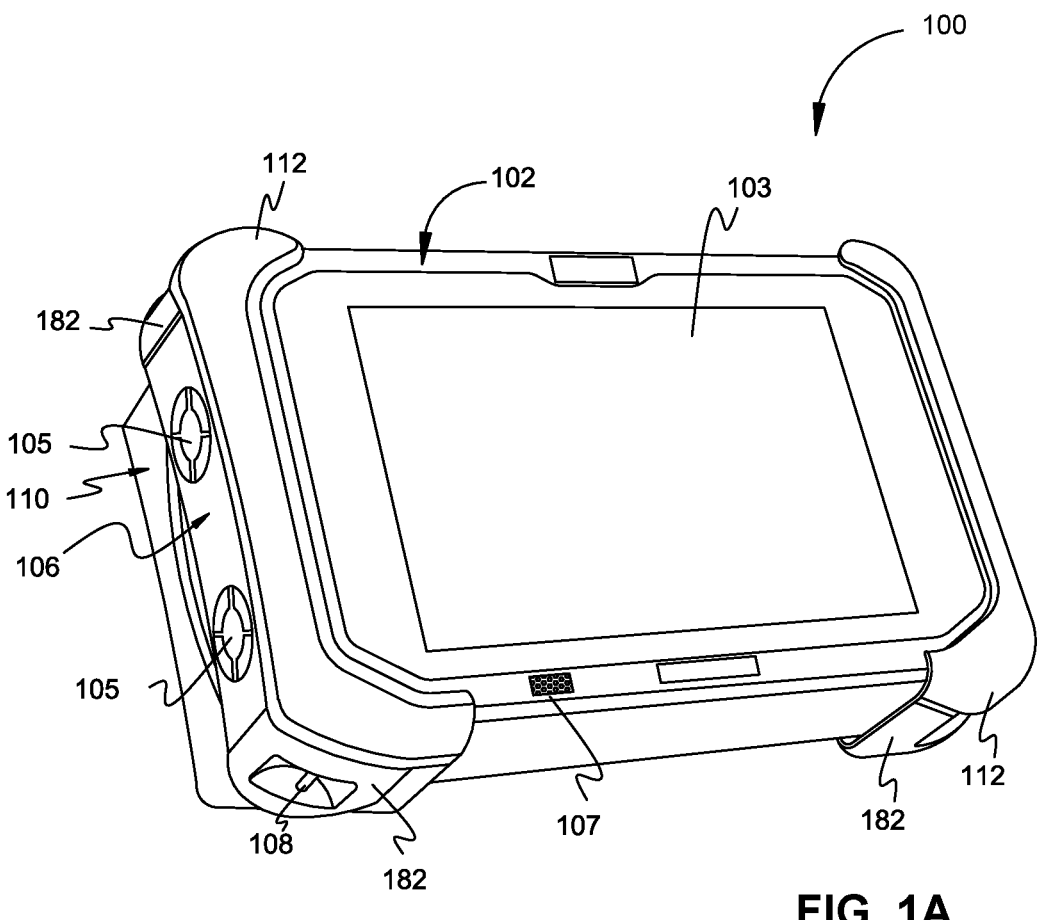
FIG. 1A illustrates a perspective view of a cell site tool including a base module and an input/output (I/O) device, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to de at least one of a particular element. As used herein, the term "includes" means includes but not limited to, the term "including" means including but not limited to. The term "based on" means based at least in part on.

A cell site installation, testing, measurement, and maintenance tool, referred to herein as a cell site tool or test tool, provides field technicians with resources to support multiple aspects of cell site testing, including testing for installation and maintenance of cell sites, and testing related to fiber optic cables (i.e., fiber) and optical signals, Radio Frequency (RF) signals, coaxial cables (i.e., coax) and antennas. The cell site tool provides multiple technical advantages over existing tools. The cell site tool provides improved efficiency because it may replace multiple independent tools as well as provide additional measurements and insights that can improve installation and maintenance of cell sites. The cell site tool can test multiple radio types including Third Generation Partnership Project (3GPP) Long-Term Evolution (LTE) and 3GPP Fifth Generation (5G), as well as multiple topologies (Macro-cell, Small-cell, Centralized Radio Access Network (C-RAN), and/or Distributed Antenna System (DAS). In an example, the cell site tool is modular and different modules can be added to the cell site tool to provide different types of testing. Thus, the cell site tool is scalable, because modules can be added to the cell cite tool to accommodate new testing requirements. Also, according to an example, the cell site tool includes job manager software that allows automated testing to be performed. A job may comprise multiple tests to be performed by the cell site tool in a specified sequence. One or more jobs may be created and stored in the cell site tool for different tasks, such as a job for installation, a job for maintenance, a job for troubleshooting a particular type of problem, etc. A job may be comprised of a script that can be executed by the cell site tool to execute the tests in a stated sequence. Accordingly, a job may automatically execute multiple tests as needed. A job may be configured at the cell site tool or at a backend workstation or server and downloaded to the cell site tool. The job manager software provides a number of technical advantages. For example, in typical situations, hundreds or even thousands of cell sites may be installed for a given installation region. The cell sites may be the same or similar. Accordingly, the same tests may need to be executed for each cell site. The job manager software on the cell site tool may be configured from a workstation or server to perform the same tests for each site. Accordingly, a test plan specified in a job can be repeated for each cell site exactly to specifications of the service provider with precise measurements. Also, it provides consistency. Jobs, including workflows for testing, can be defined centrally and downloaded to cell site tools at multiple cell sites, eliminating the variability of manual procedures and thereby driving consistent, repeatable results, regardless of technician skill or experience level. Training for technicians shifts to the test process itself, which is faster and easier to learn, rather than on technical information that is generally time-consuming and overwhelming for new technicians. The job manager software can eliminate wasted technician time regarding trying to remember which tests to run and how to run them. The above-described technical advantages and other technical advantages are further described below.

The cell site tool permits cell site technicians to test fiber, RF, Spectrum Analysis (SA), Common Public Radio Interface (CPRI), and Ethernet from a single instrument, replacing multiple independent tools. Examples of other tests the cell site tool may perform include Optical Time-Domain Reflectometer (OTDR), Cable Antenna Analysis (CAA), fiber inspection, RF spectrum analysis, interface analysis, Radio Frequency over Common Public Radio Interface (RFoCPRI) analysis, and physical layer tests such as sweep testing with Remote PHY (separating out the physical (PHY) layer and redistributing it out to the fiber node, also known as R-PHY, R PHY, and RPHY). In an example, the cell site tool includes modules that provide the ability to test specific protocols, e.g., SA, CPRI, OTDR, and CAA, all in one device.

As was mentioned above, the cell site tool may be comprised of multiple modules that allows it to scale to accommodate new testing requirements as needed. A module may be software or hardware or a combination of hardware and software as is further described below. One or more of the modules may be removably connected to the cell site tool. For example, many non-US service providers don't perform CPRI/RFoCPRI tests, and thus do not have a need for equipment to perform those tests. The cell site tool may have one or more removably attached modules for performing those tests, so the modules can be provided as needed.

A description is now provided of some examples of modules for the cell site tool that can perform various tests on cell sites. According to an example, the cell site tool may include various removably connectable Solution Modules, various removably connectable Expansion Modules, and various integrated modules that may be factory installed. According to an example, the cell site tool may include an Advisor LE (ALE) Base Module to provide core processing functionality. The cell site tool may also include: a User Interface Module, a Battery Module to supply portable power, an RF Module to test radio frequency interference, a CPRI Module to provide Common Public Radio Interface testing, an OTDR Module to provide dedicated Optical Time-Domain Reflectometer testing, a CAA Module to provide Cable Antenna Analysis testing, a Fiber Inspection Module, an SA/CPRI Module to provide Radio Frequency over Common Public Radio Interface testing, and an Optical Spectrum Analyzer (OSA) Module for optical spectrum analyzer testing by way of a coarse wavelength division multiplexer (CWDM) analyzer. Additional modules, such as an OtA Module may provide Over the Air testing and be related to 5G technologies such as Massive MIMO testing, network slice testing, beamforming and Network Function Virtualization (NFV) testing, and 5G New Radio Enhanced Mobile Broadband (5G-NR eMBB) testing. 5G NR (New Radio) is a new radio access technology (RAT) developed by 3GPP for the 5G (fifth generation) mobile network. The eMBB is the first of three main application areas for enhanced capabilities defined by the Radiocommunication Sector of the International Telecommunication Union (ITU-R). The ALE Base Module is compatible with other ALE Solution Modules and may support a job manager workflow to load configurations for automated tests and create consolidated reports which shall include individual reports for each of the automated tests. The ALE Base Module may communicate with a synchronizing server or workstation to automatically obtain configuration settings, software options, updates, and registration.

The cell site tool may include a removably connectable ALE Base Module, to support a common platform, also known as an Advisor LE Platform or ALE Platform, and provide common base testing of a Device Under Test (DUT). The ALE Base Module includes interfaces ready to connect to various other Solution Modules and/or Expansion Modules to form a unified cell site tool. According to an example, common base testing includes: power meter testing, talkset datalink testing, and Visual Fault Locator (VFL) testing. The ALE Base Module controls other removably connectable equipment, such as a fiber microscope.

The cell site tool may perform fiber inspection and testing. Standards bodies have established acceptance criteria for the quality and cleanliness of fiber and fiber connector end faces. Fiber inspection probes and fiber optic inspection scopes are required to maintain fiber in accordance with these standards and specifications. For example, a single particle mated into the core of a fiber can cause significant back reflection, insertion loss, and equipment damage. Contaminated or "dirty" fiber is a cause of fiber optic network degradation. As a result, proactive fiber optic inspection programs support the deployment of large-scale fiber optic network and fiber optic testing initiatives to ensure reliable, high-quality, high-speed, and high-capacity broadband services. Fiber inspection probes and fiber optic inspection scopes (also known as fiber microscopes) integrate with the cell site tool to determine the cleanliness of fiber connections during network installation.

Industry associations maintain guidance for fiber optic inspection and fiber optic cleaning practices and procedures, including BISCI and the Fiber Optic Association. BICSI is a professional association supporting the advancement of the information and communications technology profession. The Fiber Optic Association is an international society of professionals that creates industry standards for training and certifying fiber optic technicians. The International Electrotechnical Commission (IEC) created IEC 61300-3-35, which specifies Pass/Fail requirements for connector end-face quality and network performance throughout the fiber optic life cycle.

A cell site tool provides a CAA Module for cable and antenna analysis and testing. Problems in mobile networks occur in cell site infrastructure, including antennas, cables, amplifiers, filters, connectors, combiners, jumpers, etc. A CAA Module provides cell site installation verification and maintenance. A CAA Module may characterize and verify feed line systems and verify antenna or sector-to-sector isolation. Technicians often need to perform cable and antenna testing because signal reflections on a feed-line may reduce cell coverage. Statistically, problems in cell sites may be over 70% due to cable and antenna systems. Problems may occur because of loose connectors, dented or damaged cables, and defective or incorrectly connected antennas.

Measurements to detect and resolve antenna and cable issues include: Return Loss (RL) or Voltage Standing Wave Ratio (VSWR), Distance to Fault (DTF), Insertion Loss or Gain, and RF power measurements. Both tests of RL and VSWR indicate how well a cable and antenna system is matched for impedance. VSWR is also a measure of how efficiently RF power is being transmitted through a transmission line and into an end-load. A cell site tool that provides a CAA module may provide workflow automation via Bluetooth tethering to a cell phone in connection with a server. The cell site tool may also provide wireless network connectivity and web-based remote control. A GPS receiver may assign a location stamp, which may in turn be included in a configurable report.

The cell site tool may include a removably connectable OTDR Module for optical time domain reflectometer testing. OTDR testing is fiber optic testing for the characterization of optical networks that support telecommunications. The purpose of OTDR testing is to detect, locate, and measure elements at any location on a fiber optic link. An OTDR Module may require access to only one end of a link and acts like a one-dimensional radar system. By providing pictorial trace signatures of the fibers under test, it is possible to obtain a graphical representation of an entire fiber optic link. In other words, the OTDR Module creates a virtual "picture" of a fiber optic cable route. The analyzed data can provide insight into the integrity of the fibers, as well as any passive optical component such as the connectors, splices, splitters, and multiplexers along the cable path. The data can be recalled as needed to evaluate the degradation of the same cable over time. The OTDR module is capable of troubleshooting fiber optic cable failures by locating a distance to fault (DTF) and identifying the type of fault, such as breaks, bends, bad connectors, and portions having excessive loss.

The OTDR module injects pulsed light energy (pulsed optical power), generated by a laser diode, into one end of an optical fiber. A photodiode measures over time the returning light energy or optical power (reflected and scattered back) and converts it into an electrical value. Once amplified and sampled, the value may be graphically displayed on a screen. The OTDR Module measures and shows the location and loss of passive optical network elements which are called OTDR trace "events". The location or distance to each event is calculated from the round-trip time of the light pulse traveling along the fiber. The loss is calculated from the amplitude value of the returned signal or optical power (also known as a backscattering effect).

The cell site tool may include a removably connectable Optical Spectrum Analyzer (OSA) Module for optical spectrum analyzer testing by way of a coarse wavelength division multiplexer (CWDM) analyzer. Historically, large and expensive optical spectrum analyzers (OSA) were used to precisely test wavelength and power levels in CWDM networks, and optical channel checkers were used to verify optical channel presence. The OSA Module offers the functionality and speed of a conventional OSA in a handheld form factor.

Fiber optic cable lengths may be measured in kilometers with varying equipment along a backhaul signal path. The International Telecommunication Union Telecommunication Standardization Sector (ITU-T) coordinates standards for telecommunications. ITU-T G.695 specifies transmitter/multiplexer characteristics at one end of a CWDM link and de-multiplexer/receiver characteristics at the other end. ITU-T G694.2 specifies a spectral grid for CWDM applications with 18 channels from 1271 to 1611 nm, with 20 nm channel spacing. The OSA Module may verify optical interface parameters according to the above standards, such as Tx output power, Rx input power, and central wavelengths.

In CWDM networks, transmitter lasers are typically not equipped with a cooling system, thus temperature variations can cause a drift of the central wavelength and the power level. The OSA Module can verify possible wavelength shifts or power loss. Transmitters with a wavelength offset can create additional attenuation in the multiplexers and de-multiplexers. When test access points are available, the OSA Module may determine a wavelength's presence and its associated power level to verify that all transmitted wavelengths have been correctly multiplexed without excess power loss on one of the channels. A wavelength drift in a transmitter can create power drift which may cause bit errors. The OSA Module may monitor and record the evolution of channel power and wavelength over time. The OSA Module may include Small Form-factor Pluggable (SFP) transceivers to test a link between a head end and a tail end when a system transceiver is unavailable.

The cell site tool may include a removably connectable RF Spectrum Analyzer (SA) Module for RF spectrum analysis Testing. A Spectrum Analyzer monitors and analyzes the RF spectrum. The Spectrum Analyzer function performs measurements such as: channel power; Occupied Bandwidth (BW); Spectrum Emission Mask (SEM); Adjacent Channel Power (ACP); spurious emissions; field strength; route map; Passive InterModulation (PIM) detection; and dual spectrum measurements. Channel power measures the power level, spectral density, and/or peak-to-average power ratio (PAR) of an input signal received at the cell site tool in a specified channel bandwidth, and shows Pass/Fail for the defined power. The input signal may be received at the cell site tool over the air from the cell site to test power of signals emitted from the cell site, or the input signal may be received over a wired link. The Occupied BW measures the frequency bandwidth that contains the specified percentage of the power, the total integrated power, and the occupied power with Pass/Fail for the defined bandwidth. SEM compares the total power level within the defined carrier bandwidth and the given offset frequencies to defined mask limits with Pass/Fail results. ACP measures the amount of RF power leakage in adjacent channels and its ratios, with Pass/Fail for the defined test condition. Spurious Emissions measurements identify and determine the power level of spurious emissions in certain frequency bands, showing Pass/Fail based on the defined mask limits. A spurious emission is any radio frequency not deliberately created or transmitted, especially in a device which normally does create other frequencies. Spurious emissions include harmonic emissions, parasitic emissions, intermodulation products and frequency conversion products but exclude out-of-band emissions. Frequency and power levels of spurious emissions are determined by the spectrum analysis testing. Field Strength measures and analyzes field strength to user-definable multi-segment lines. Measuring field strength is accomplished once a technician specifies the antenna factors in the Spectrum Analyzer. PIM detection identifies passive intermodulation in an uplink band caused when signals are combined and transmitted on a single nonlinear feed line. Dual Spectrum measurement provides a view of spectrum activity for two different uplink and downlink spectrum bands on one screen simultaneously rather than switching between screens.

The RF SA Module validates that an RF transmitter is operational and is emitting signals at a proper power level and correct carrier frequency/band. The RF SA Module can detect a carrier signal at an expected frequency even if the carrier signal has correct power level, bandwidth, and signal to noise ratio. The RF SA Module can detect a radio transmitter incorrect power level, incorrect frequency range (downlink), and incorrect signal to noise ratio (downlink). The RF SA Module can detect the presence of external interferers that impair the cellular service (uplink) and identify the location of external interferers (also known as interference hunting).

The cell site tool may include a removably connectable Common Public Radio Interface (CPRI) Module for common public radio interface testing. CPRI is an evolving standard by industry partners as a complement to activities in formal standards organizations such as 3GPP and 3GPP2. In general, the CPRI standard defines an interface between Radio Equipment Control (REC) and Radio Equipment (RE). CPRI links may be used to carry data between cell sites and base stations. A main purpose of CPRI is to allow replacement of a copper or coax cable between a radio transceiver (typically located in a cell tower) and a base station (typically located at the ground nearby) with a fiber optic connection. This fiber optic connection, often referred to as a fronthaul link or Fronthaul, can be a fiber to an installation where multiple remote base stations may be served. This fiber typically supports multi-mode communication. The fiber end is typically connected with an SFP transceiver.

Recent advancements in radio technology—such as improved power amplifier efficiency, better design, and longer mean time before failure (MTBF)—have allowed service providers to deploy networks using a distributed baseband architecture. Radios (also known as Remote Radio Heads (RRHs)) are typically installed at the top of a cell tower, close to the antenna, and separated from the digital unit or Base Band Unit (BBU) located at the base of the tower. When the BBU is located a distance from the base of the tower, this is known as a backhaul link or simply Backhaul. An extension of this distributed architecture allows service providers to co-locate a group of BBUs at a remote location. This architecture is known as a Centralized Radio Access Network (C-RAN), which enables ultra-dense cell deployments. By utilizing features of LTE Advanced, such as carrier aggregation and Uplink Coordinated Multi-Point (UL CoMP), C-RAN can significantly improve uplink capacity and cell edge throughput. Generally, transmission links between the central baseband units and distributed radio units use Common Public Radio Interface (CPRI) fronthaul over fiber links. This CPRI fronthaul requires tight latency and large bandwidths. As service providers move towards 5G, new services are anticipated to be built upon or coordinate with C-RAN. CPRI fronthaul complexity is expected to increase.

As set forth above, the RRH and BBU are generally connected through a physical fiber link. The communication link is typically a CPRI link. An alternative standard is an Open Base Station Architecture Initiative (OBSAI) link. Both CPRI and OBSAI digitize the baseband signal and transmit same over a fiber optic cable between the BBU and RRH. The BBU translates the data stream coming from the core network into a form suitable for transmission over the air by the RRH, and vice versa. Cellular radios generally use Quadrature Amplitude Modulation (QAM) by creating two waveforms, known as an in-phase waveform (I) component and a quadrature waveform (Q) component. This IQ data is encapsulated in the CPRI or OBSAI link. CPRI based fronthaul links may tend to require stringent delay and jitter requirements. The C-RAN environment may have an associated long range of fronthaul of up to 20 km, and also include closely coordinated transmissions of dense radio deployments. The C-RAN environment using CPRI has increased requirements to improve throughput, reduce latency, improve timing, and improve synchronization.

The cell site tool may include a removably connectable SA/CPRI Module running a software application for Radio Frequency over Common Public Radio Interference (RFoC-PRI) analysis and testing. As set forth above, the BBU and RRH communicate over optical fiber via CPRI. However, direct RF access, traditionally accessed via coaxial cable connected to an antenna, is only available at the top of the tower. Hence, the ability to detect interference can be a challenging, dangerous, and expensive due to safety concerns involving tower climbs. To perform RF testing from the base of the tower, the SA/CPRI Module decodes or demaps the CPRI protocol information presented on the fiber. The SA/CPRI Module may generate a test signal, according to a CPRI protocol, to emulate a BBU and output the test signal over fiber (via an SFP) to the RRH. The SA/CPRI Module may then receive a CPRI protocol response signal over the fiber from the RRH, and compare the two signals to perform RF analysis. Hence, the SA/CPRI Module may perform interference analysis from the base of the tower. The SA/CPRI Module and application may identify PIM or interference issues from remote locations by performing Spectral Analysis on CPRI signals.

PIM is a form of signal interference that can be caused by metal components or two or more carriers sharing a same downlink path in a wireless network. Carrier sharing is becoming more common as wireless networks become more complex, with multiple technologies and technology generations at a single site. In other words, signals combine to generate undesired interference, which impacts Over-The-Air signals, such as LTE signals and 5G signals. Sources of PIM include antennas, cables, dirty or loose connectors, damaged RF equipment, or metal objects near the cell site. PIM can have substantial impacts on the performance of LTE and 5G signals. PIM levels around −100 decibel-milliwatts (dBm) or less are generally considered acceptable, but the lower the better. Drive tests have found an 18% drop in download speeds when PIM levels were increased from −125 dBm to −105 dBm, even though the latter number can be considered an acceptable PIM level.

RFoCPRI testing may involve the combination of emulating a BBU and simultaneously analyzing the uplink signals. This combination enables a technician to "turn on" an RRH RF port and observe the uplink signal for irregularities, such as presence of PIM or existence of external interferers. This application typically requires one optical interface to the RRH. Recent deployment of new services (such as Public Safety) in bands (such as band 14) in close proximity to existing services (such as PCS) has promoted operation of up to three RRHs at the same time. The tester is expected to emulate two BBU's (in downlink), and observe any unwanted PIM products at a third RRH. RFoC-PRI testing may also be passive, and involves testing the uplink spectrum for presence of any unwanted signals. This test is advantageous because traditional testing has been met by observing one optical signal at one time.

The cell site tool may perform QSFP Monitoring. QSFPs are Quad Small Form-factor Pluggable units that support optics functionality. QSFPs are available in different variants, covering a wide range of applications, and include: SR-4, LR-4, etc.; 4×10G (QSFP+) or 4×25G (QSFP28). A QSFP can carry CPRI or eCPRI/Ethernet signals, and are typically transparent to the type of protocols. The SA/CPRI Module and application detect the presence of a CPRI signal and provide testing for optical interfaces carrying the CPRI signal. QSFPs may carry four independent CPRI signals, and may be expected to be 10G followed by 24G. For example, an "SR-4" QSFP may be used in a monitoring mode. Since the QSFPs carry independent CPRI signals, RFoCPRI may be performed on single fiber (uplink) at the time. For live monitoring applications, the SA/CPRI Module may access an uplink and downlink signal at the same time. A minimum requirement is for uplink monitoring. RFoCPRI may analyze QSFP Termination. In this case, a BBU direction (in downlink) is emulated in order to turn on the RRH and transmit a known waveform. Next, the uplink is analyzed by performing Spectral Analysis.

According to examples of the present disclosure, some testing by the cell site tool may be performed automatically and sequentially, while some testing may be performed concurrently. According to an example, an OTDR test may be performed separately and sequentially. According to an example, a Spectrum Analyzer test may be performed while performing a CPRI test (i.e. emulation of a BBU or BBU-E). According to an example, RFoCPRI may be performed by executing a Spectrum Analyzer test while performing a CPRI test by turning on antenna power and transmitting a test waveform. Hence, according to an example, two separate applications, Spectrum Analyzer and CPRI/RFoCPRI/BBU-E, may be executed together. According to an example, a CAA test and a Spectrum Analyzer test are not executed concurrently, but may be executed sequentially. According to an alternate example, a CAA test and a Spectrum Analyzer test are executed concurrently by implementing a dual port gain/loss (scalar) test. According to an example, a CAA test is executed separately from an OTDR test and separately from a CPRI test, but such tests may be executed sequentially. According to an example, the cell site tool may include a CPRI Module for CPRI testing, a Spectrum Analyzer Module for Spectrum Analysis testing, and an OTDR Module for Optical Time Domain Reflectometer testing, and a CAA Module for Cable Antenna Analysis testing. According to an example, a cell site tool my optionally include an Optical Spectrum Analyzer (OSA) Module for Optical Spectrum Analysis testing. According to an example, the OSA Module may be substituted for the OTDR Module or the CAA Module. According to an example, all tests set for above may be performed automatically and sequentially in accordance with a predetermined test plan stored in memory of the cell site tool.

FIG. 1A illustrates a perspective view of a modular cell site tool 100 including ALE base module 106 and I/O device 102 (which may be removably connected), according to an example of the present disclosure. Cell site tool 100 may be a modular hand-held tool comprising removably connectable field replaceable Modules for cell site installation, testing, measurement, and maintenance. According to an example, cell site tool 100 includes removably connectable I/O device 102, and a removably connectable ALE base module 106. According to an example, I/O device 102 includes a display 103 that provides user control and information. According to an example, display 103 may be a touch screen, e.g., liquid crystal display (LCD) touchscreen. The cell site tool 100 provides user information including: a listing of jobs, a listing of reports to be compiled, a compilation of executed test results in a test report or test reports, and an interface control with a work station or server, described in greater detail below. ALE base module 106 provides hardware, software and firmware, described in greater detail below, to control cell site tool 100.

According to the illustrated example of FIG. 1A, ventilation ports 105 are provided to the outer structure of ALE base module 106 to facilitate internal cooling of components by way of an internal cooling unit. Loudspeaker 107 provides audio information. ALE base module 106 provides a structural base for cell site tool 100, and includes support structures 108 for attachment of a support strap (not shown). According to an example, support structures 108 are metal pins permanently secured to the structure of ALE base module 106. I/O device 102 includes elastomeric bumpers 112 to provide impact protection. Likewise, ALE base module 106 includes elastomeric bumpers 182.

According to an example, cell site tool 100 may be configured in a variety of assemblies with a plurality of different removably connectable Modules to support workflow and project specifications. According to the illustrated example of FIG. 1A, cell site tool 100 includes first expansion module 110 removably connected to the bottom of ALE base module 106.

Figure 1B:
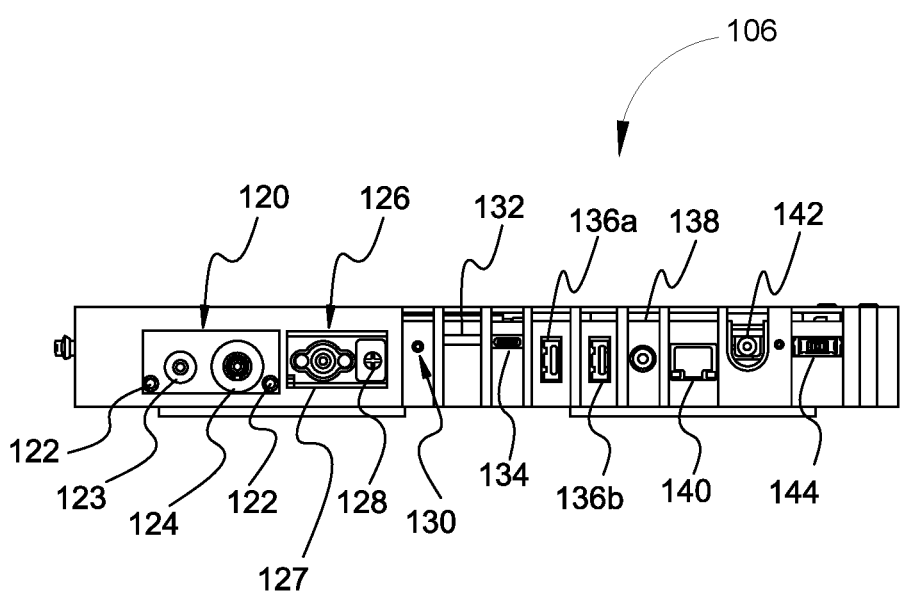
FIG. 1B illustrates a back side view of a base module, according to an example of the present disclosure.

FIG. 1B illustrates a back side view of ALE base module 106, according to an example. ALE base module 106 includes a plurality of modular elements used for cell site installation, testing, measurement, and maintenance. According to an example, ALE base module 106 includes PM-DL module 120, also known as a power meter/datalink optical module. PM-DL module 120 and other modules described herein may be factory installed with ALE base module 106 or one or more modules may be attached to ALE base module 106 by a user. In an example, PM-DL module 120 is secured by way of connection members 122. Connection members 122 provide integration of PM-DL 120 and mechanical structural support for an optical connection. PM-DL module 120 includes power meter port 123 and TS-PC port 124, also known as a Talkset-Datalink port. Power meter port 123 is used to determine optical power of a fiber under test. TS-PC port 124 is used to communicate voice or data with another device along an optical fiber.

Power meter port 123 and TS-PC port 124 may be optical Universal Push Pull (UPP) connectors, compatible with all diameter 2.5 mm connectors (fiber connector (FC), subscriber connector (SC), straight tip (ST) connector, Deutsches Institut fOr Normung (DIN) connector, E2000, etc.). An FC connector is a single mode connector using a 2.5 mm ferrule according to Telecommunications Industry Association (TIA) connector intermateability standard FOCIS-4 (TIA-604-4). An SC connector is a snap-in connector using a 2.5 mm ferrule according to TIA connector intermateability standard FOCIS-3 (TIA-604-3). An ST connector is a spring loaded optical connector that has a bayonet mount and a long cylindrical 2.5 mm ceramic ferrule to hold the fiber according to TIA connector intermateability standard FOCIS-2 (TIA-604-2). A DIN connector is a fiber connector having a 2.5 mm ferrule and a screw type connector according to International Electrotechnical Commission standard IEC 61754-3. An E-2000 connector is a fiber connector having a 2.5 mm ferrule and a snap coupling and a light and dust cap according to IEC standard 61754-15.

According to an example, ALE base module 106 also includes VFL module 126, also known as a Visual Fault Locator module, to provide detection of a visual fault location. VFL module 126 includes VFL optical port 127. According to an example, VFL optical port 127 is a UPP connector. A VFL test uses brightly visible light to check patch cords for defects and verify continuity. According to examples, combinations of PM-DL module 120 and VFL module 126 may provide various functions including: 1. Power Meter-Only; 2. Talkset and Datalink; 3. Talkset and Datalink & Power Meter; 4. VFL-Only; and 5. VFL & Power Meter.

According to an example, ALE base module 106 includes a number of additional inputs and control interfaces as follows. Reset button 130 provides a hard reset of cell site tool 100. Reset button 130 may be depressed with a small object, such as an extended paperclip. Micro-SD port 132 provides removable storage to cell site tool 100 by accepting a micro-SD card. The micro-SD card may provide memory for storing cell site data, predetermined setup configurations, test results, and compiled reports. USB-C port 134 provides an interface to cell site tool 100 according to the USB-C standard. USB-C port 134 also provides a debug-serial-port to support testing and trouble-shooting of cell site tool 100. An audio interface, and/or headset may be multiplexed with USB-C port 134 by way of an external adapter, such as a USB-C to 3 mm adapter. A pair of USB-A Interfaces 136*a* and 136*b* provides support for connection of USB 2.0/3.0 peripherals, such as an external fiber microscope, set forth in greater detail below.

Audio jack 138 provides a direct audio interface by accepting a 3 mm male plug. Ethernet port 140 is RJ-45 jack to provide 10/100/1000-BaseT Ethernet management. On/Off switch 142 is configured to turn cell site tool 100 on and off. DC-input 144 is configured to receive DC power for cell site tool 100 from an external power supply. In addition, an internal smart battery module may provide DC power. Although not illustrated in FIG. 1B, a mini USB port may also be provided. Internal to ALE base module 106 is a wireless network module to support wireless network communication, such as at 2.4 GHz and 5 GHz, and a Bluetooth module to support Bluetooth communication with an external device, such as a Bluetooth audio headset.

Figure 1C:
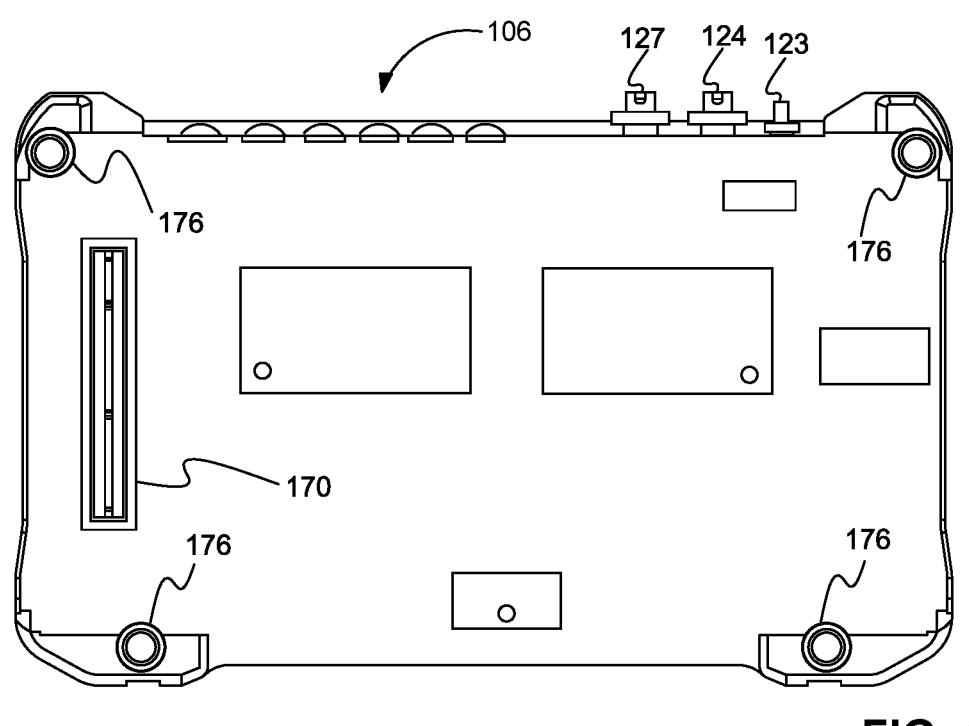
FIG. 1C illustrates a top view of a base module, according to an example of the present disclosure.

FIG. 1C illustrates a top view of ALE base module 106, according to an example of the present disclosure. ALE base module 106 includes a plurality of through holes 176 to mate with corresponding protrusions 174 in the housing of I/O device 102. ALE base module 106 provides electrical power and communication to I/O device 102 or other modules, including Solution Modules and Expansion Modules, by way of base module backplane interface 170. According to an example, base module backplane interface 170 is a 140 pin connector having 0.8 mm pitch Gold-Fingers.

Figure 1D:
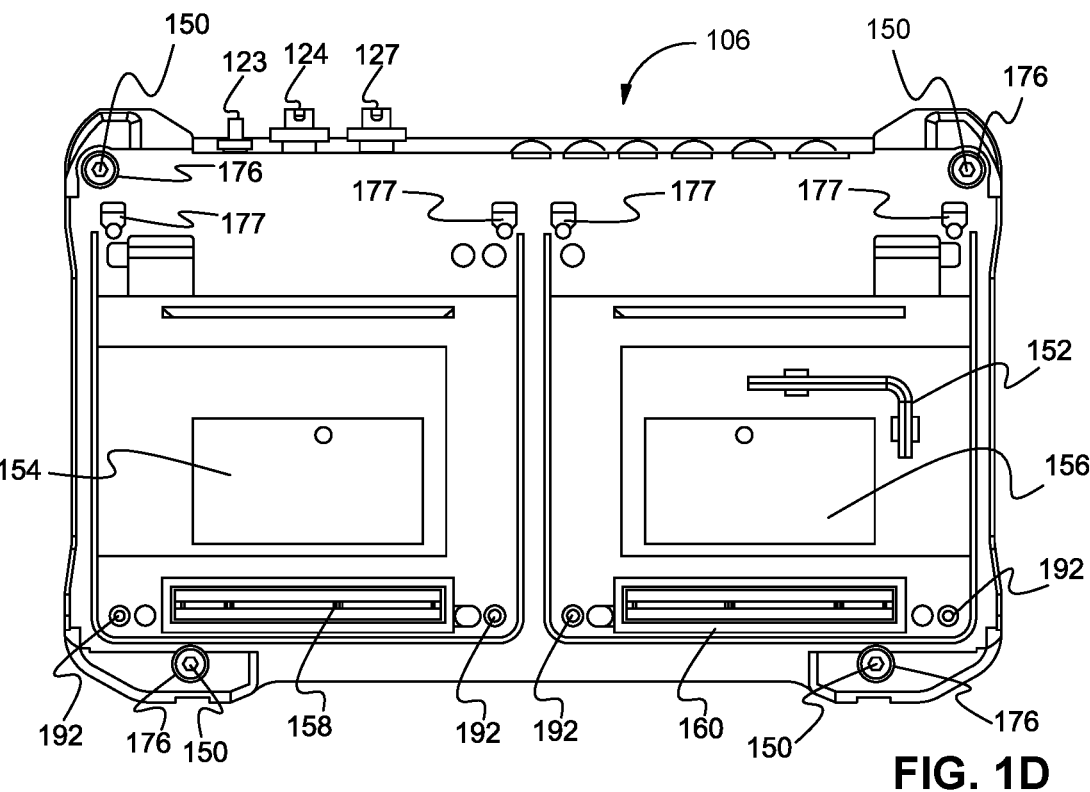
FIG. 1D illustrates a bottom view of a base module, according to an example of the present disclosure.

FIG. 1D illustrates a bottom view of ALE base module 106, according to an example of the present disclosure. ALE base module 106 includes a plurality of through holes 176 to receive a plurality of connection members 150 to removably secure ALE base module 106 to I/O device 102. If another Solution Module is removably inserted between ALE base module 106 and I/O device 102, connection members 150 pass through structurally defined holes in the inserted Solution Module before being received into I/O device 102. According to an example, connection members 150 are machine screws having a hexagonal head. According to an example, connection tool 152 is disposed within ALE base module 106 to support field replacement of different removably connectable Solution Modules (attachable to a top side of ALE base module 106). According to an example, connection tool 152 is an Allen wrench having a hexagonal head to mate with connection members 150. ALE base module 106 includes a plurality of access panels, such as access panels 154 and 156 to support factory installation of various internal modules, such as the wireless network module or Bluetooth module.

ALE base module 106 includes first expansion interface 158 and second expansion interface 160 to provide electrical communication and power to a plurality of different Expansion Modules. According to an example, first expansion interface 158 and second expansion interface 160 are 140 pin connectors having 0.8 mm pitch Gold-Fingers. According to an example, the bottom of ALE base module 106 includes recesses to receive corresponding cleats from Expansion Modules, such as cleats 188 shown in FIG. 1E of expansion modules 110 and 111. Threaded bushings 192 then receive structural members, which pass through holes in the Expansion Modules to be received therein.

Figure 1E:
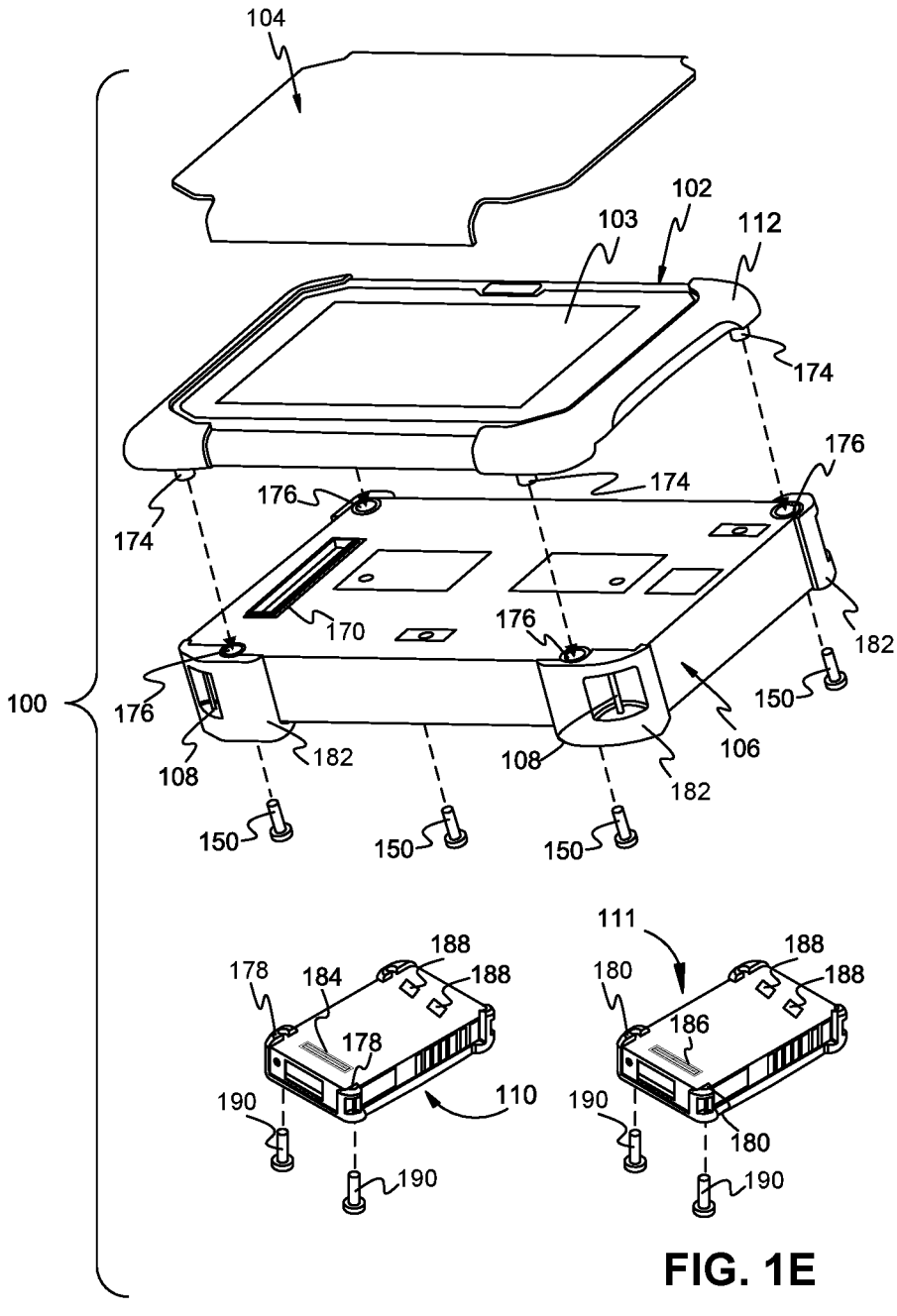
FIG. 1E illustrates an exploded perspective view of a cell site tool including an I/O device, a base module, and dual expansion modules, according to an example of the present disclosure.

FIG. 1E illustrates an exploded perspective view of cell site tool 100 including I/O device 102, ALE base module 106, and expansion modules 110 and 111, according to an example of the present disclosure. An optional screen cover 104 may be removably attached to the housing of I/O device 102 to provide protection to display 103. ALE base module 106 is removably connected to I/O device 102 by a plurality of connection members 150. According to an example, I/O device 102 includes a plurality of protrusions 174 that are configured to be received within through-holes 176 defined by the structural housing of ALE base module 106. Connection members 150 pass through holes 176 and are removably received within protrusions 174 to create an integrated modular cell site tool 100. As illustrated, elastomeric members 182 are disposed about the corners of ALE base module 106 to provide impact protection.

According to an example, first expansion module 110 has structure defining holes 178 and expansion module 111 has structure defining holes 180. Connection members 190 pass through holes 178 and 180 and are received within threaded bushings 192 of ALE base module 106. Cleats 188 of expansion modules 110 and 111 are received within recesses 177 in the bottom of ALE base module 106.

First expansion module 110 includes expansion interface 184 to communicate power and control signals with ALE base module 106. Likewise, expansion module 111 includes expansion interface 186 to communicate power and control signals. According to an example, expansion interfaces 184 and 186 are 140 pin connectors having 0.8 mm pitch Gold-Fingers to mate with first and second expansion interfaces 158, 160 in ALE base module 106. According to an example, expansion modules 110 and 111 are field replaceable and may be a CAA module, an OTDR module or an OSA module. According to an example, either of expansion modules 110 or 111 may be a smart battery module. According to an example, either of expansion modules 110 or 111 may be a spacer module that does not contain internal components or a battery.

For a CAA Module in the form of a removably connected Expansion Module, the CAA Module includes a Reflection/RF out port and a bias voltage port. The Reflection/RF out port may be a Type-N, female connector having an associated impedance of 50Ω nominal, a damage level of 30 dBm maximum nominal and ±50 V DC maximum nominal. The bias voltage port is provided for connecting to an external bias-tee device. The bias voltage port may be an SMA, female connector having an associated impedance of 50Ω nominal. According to an example, an Expansion Module including a CAA module may require a power input of 19 V DC, with a power consumption of 6.2 W without using the external bias-tee device.

For an OTDR Module in the form of a removably connected Expansion Module, the OTDR Module includes an OTDR port to receive a connection from a Launch Cable. The OTDR port may be an SC/APC port, also known as a Singlemode Core/Angle-polished Physical Contact port, to receive the Launch Cable. The Launch Cable may be a minimum 20-meter Fiber optic patch cable with connectors matching the OTDR port and the fiber under test. An optical coupler may be used to connect the Launch Cable to the fiber under test.

For an OSA Module in the form of a removably connected Expansion Module, the OSA Module includes an integrated SFP slot to host up to 2 SFP CWDM transceivers. The transceivers can be used to simulate CWDM transmitters for testing insertion loss per wavelength, and end-to-end continuity of a link in CWDM networks with mux/demux and optical add-drop multiplexers (OADMs). An OADM is a device used in wavelength-division multiplexing systems for multiplexing and routing different channels of light into or out of a single mode fiber (SMF). An Expansion Module for OSA testing may also include an Optical Port having a single-mode/physical-contact (SM/PC) input port and FC/SC/LC and ST switchable optical adapters. The Optical Port should have an optical return loss >35 dB, and total safe power of +15 dBm. Spectral Measurement Ranges may include a wavelength range of 1260 to 1625 nm with a wavelength accuracy of ±0.5 nm. The cell site tool 100 with an OSA testing Expansion Module should have a readout resolution of 0.001 nm, a resolution bandwidth (FWHM) of typically 4 nm with a minimum channel spacing of 8 nm. Power Measurement Ranges include a dynamic range of −55 to +10 dBm, a noise floor RMS of −55 dBm, an absolute accuracy of ±0.5 dB, a linearity of ±0.1 dB, a readout resolution of 0.01 dB, and a scanning time of <4 s.

Figure 1F:
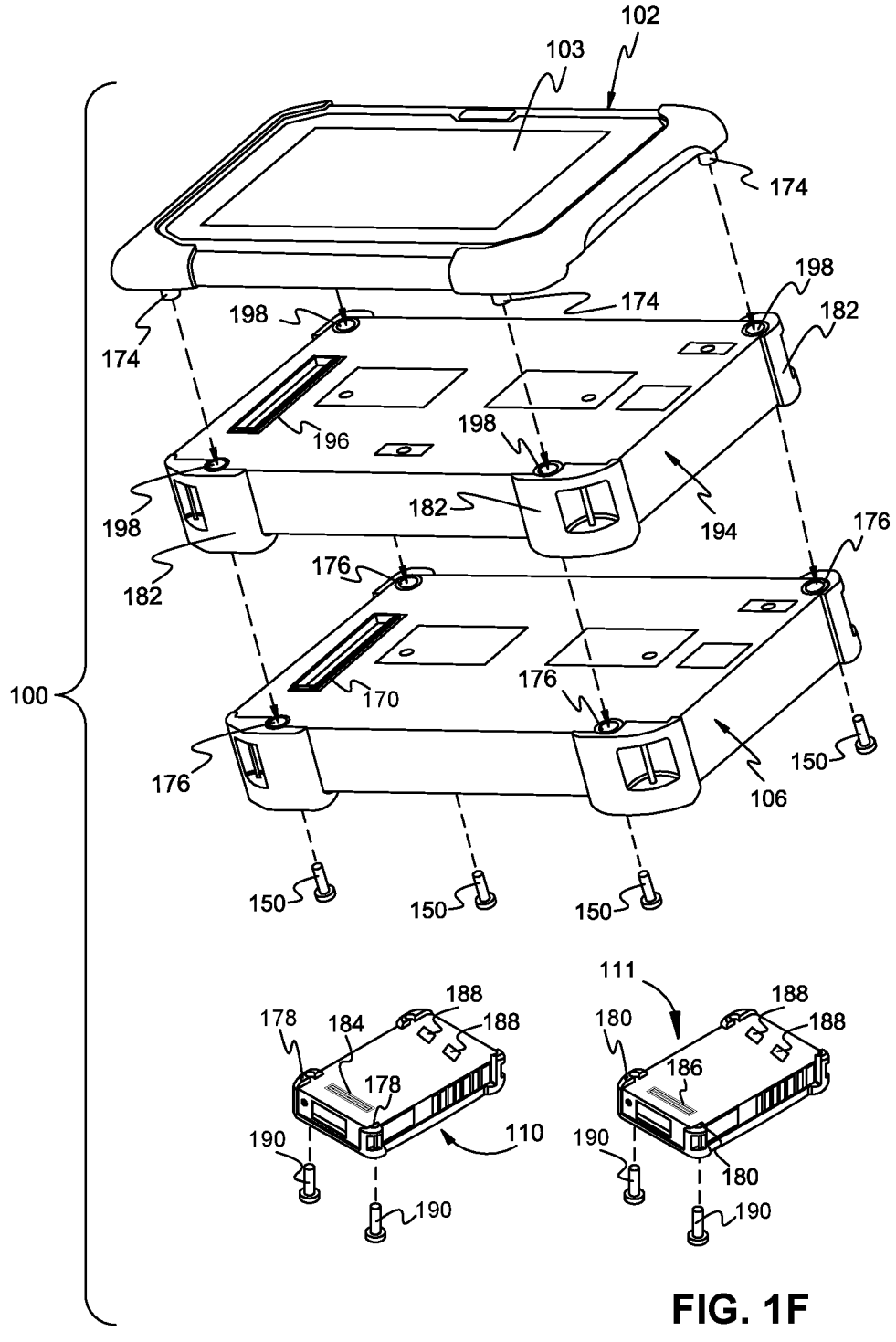
FIG. 1F illustrates an exploded perspective view of a cell site tool including a removably connected first solution module, according to an example of the present disclosure.

FIG. 1F illustrates an exploded perspective view of cell site tool 100 including a removably connected first ALE solution module 194, according to an example of the present disclosure. Upon integration of first ALE solution module 194, ALE base module 106 provides electrical power and communication to first ALE solution module 194 by base module backplane interface 170. Likewise, first ALE solution module 194 provides electrical power and communication to I/O device 102 by way of top solution interface 196. First ALE solution module 194 also includes a bottom solution interface (not shown) connectable to base module backplane interface 170, described in greater detail below. According to another example, a second ALE Solution Module may be optionally disposed between first ALE solution module 194 and ALE base module 106, described in greater detail below. The base module backplane interface 170 connects power and communication (e.g., carrying data) busses of the ALE base module 106 to modules connected to the ALE base module 106 via base module backplane interface 170 or other interfaces.

First ALE solution module 194 has a similar housing and form factor to ALE base module 106 to provide integration between I/O device 102 and ALE base module 106. First ALE solution module 194 includes a plurality of through holes 198 to mate with corresponding protrusions 174 in the housing of I/O device 102. First ALE solution module 194 provides electrical power and communication to I/O device 102 by way of top solution interface 196. According to an example, top solution interface 196 is a 140 pin connector having 0.8 mm pitch Gold-Fingers. First ALE solution module 194 also provides a structural base for cell site tool 100, and includes additional support structures for attachment of a support strap (not shown).

First ALE solution module 194 is removably connected to I/O device 102 by connection members 150. As illustrated, First ALE solution module 194 also includes elastomeric bumpers 182 for impact protection. According to an example, first ALE solution module 194 may be a CPRI Solution Module, housing a single internal module. According to another example, first ALE solution module 194 may be Spectrum Analyzer and Common Public Radio Interface (SA/CPRI) Solution Module, housing dual internal modules. A dual module SA/CPRI Solution Module may provide RFoCPRI testing.

Figure 2:
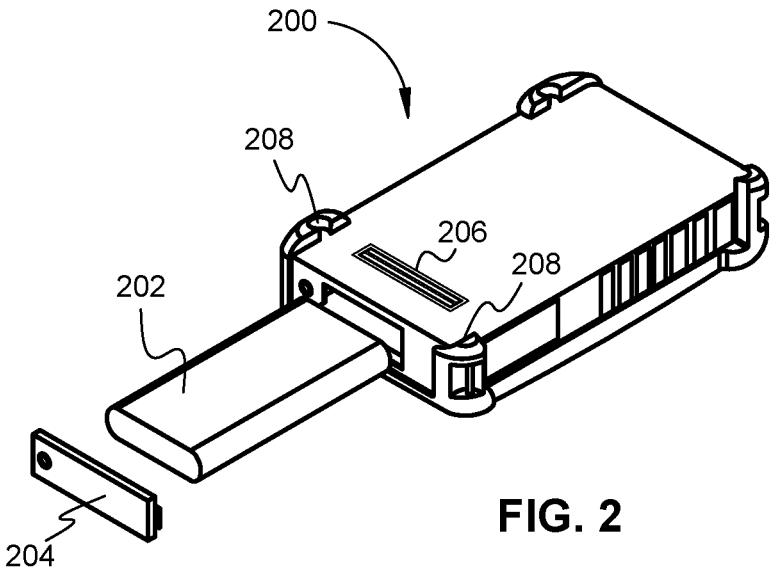
FIG. 2 illustrates a perspective view of removably connectable smart battery module in the form of an expansion module, according to an example of the present disclosure.

FIG. 2 illustrates a perspective view of removably connectable smart battery module 200 in the form of an expansion module, such as first expansion module 110, according to an example of the present disclosure. Smart battery module 200 includes a battery 202 removably disposed therein, and secured by battery door 204. Internal circuitry is included within smart battery module 200 to regulate smart charging of battery 202 and to ensure that power is supplied to ALE base module 106 in a uniform manner. Smart battery module 200 provides power and communication with ALE Base Module 406 by way of expansion interface 206. According to an example, expansion interface 206 is a 140 pin connector having 0.8 mm pitch Gold-Fingers.

Figure 3:
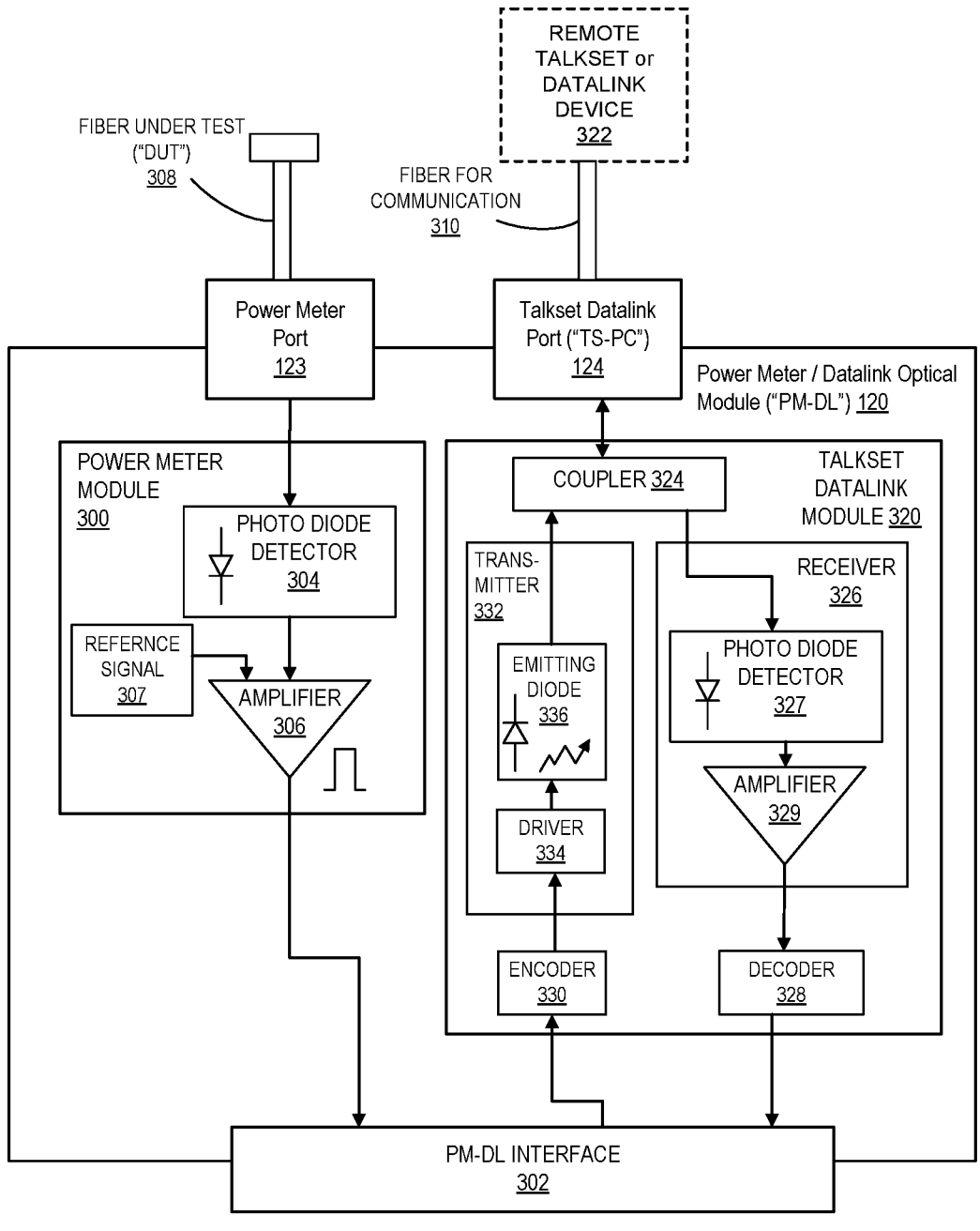
FIG. 3 illustrates a Power Meter/DataLink (PM-DL) module integrated into a base module, according to an example of the present disclosure.

FIG. 3 illustrates a Power Meter/DataLink (PM-DL) module 120 integrated into ALE base module 106, according to an example of the present disclosure. PM-DL module 120 includes a power meter module 300 to receive an optical signal from power meter port 123 and output information corresponding to power of the received optical signal. Power meter port 123 may be a UPP connector. Once activated via I/O device 102, power meter module 300 is brought into use and results are displayed. A high degree of accuracy is often required, and hence it may be necessary to perform a preliminary calibration without connection to an optical fiber. For an optical fiber link, the loss or attenuation of the cable or link is measured to ensure it meets system requirements. As the optical signal traverses fiber under test 308, it decreases in power level. The decrease in power level may be expressed in dB or as a rate of loss per unit distance dB/kilometers (Km). Power attenuation may be caused by: Absorption of light by impurities within the fiber; Scattering losses from variations in the silica structure within the fiber; Bending losses due to over tightening of clamps or cable ties; or Contaminated or damaged connectors of the equipment and patch panels. Fiber loss is not a deterministic process that always behaves in the same way. There are many factors that can produce signal loss, including fiber impurities and poor installations. During transmission, losses also occur when light is injected and by different couplings and junctions made by connectors and splices.

According to an example, power meter port 123 may be used to conduct an optical power test. Power meter port 123 is, according to an example, a factory installed option on ALE Base Module 106. An optical power test may certify that fiber cable installation meets system optical budget requirements. An example minimum basic Tier 1 test performs a link or channel insertion loss measurement using an optical light source (OLS) and an optical power meter (also known as "OLP" or "MP) to verify receipt of a correct power range with proper optical headroom. ALE base module 106 provides an optical power meter function by connecting DUT 308, such as an optical fiber with a known or anticipated optical light source power, to power meter port 123.

According to an example, power meter module 300 receives an optical signal corresponding to the DUT by way of power meter port 123. The optical signal is received by photo diode detector 304, which converts the optical single into an electrical signal. The electrical signal is received by amplifier 306, compared to a reference electrical signal 307, and the results are output to PM-DL interface 302.

For fiber optic measurements, power meter module 300 measures the power of the optical signal coming out of the end of DUT 308. The DUT 308 may also be a test source for calibration of power meter module 300, a transmitter, or the input of receiver, measured in dBm. Whenever tests are performed on fiber optic networks, the results are displayed on a meter readout in units of "dB." Optical loss is measured in "dB" which is a relative measurement, while absolute optical power is measured in "dBm," which is dB relative to 1 mw optical power. Loss is a negative number (like −3.2 dB) while power measurements can be either positive (greater than a reference) or negative (less than the reference.) The measurement in dBm is "absolute" power— absolute in that it refers to power calibrated to a national standard maintained by the US National Institute of Standards and Technology (NIST). To measure loss, measurement is made before the connection and after the connection, then the two results are compared to get a relative measurement of loss in dB. The equation used to calculate dB is $$dB = 10 \ \log_{10}(\text{measured power/reference power})$$

According to an example, power meter testing by power meter module 300 may be configured as part of a predetermined Job or manually configured. In manual configuration, a wavelength is first selected. In an automatic configuration, the wavelength of the input signal is automatically detected and selected to perform the measurement. Example wavelengths include: 850, 980, 1300, 1310, 1420, 1450, 1480, 1490, 1510, 1550 or 1625 nm, with measurement performed at the specified wavelength. According to an example, a dB level may be chosen for displaying a result relative to a reference (i.e. link loss). Attenuator compensation may also be provided. A choice of dB level to be applied to the wavelength may be chosen for measurement to compensate for the loss due to an external attenuator (+XX.XX dB). Further, alarm parameters may be configured for power meter module 300 of the cell site tool 100. Upon alarm activation, a result below a lower threshold or above an upper threshold will be displayed. According to an example, choice of lower and upper thresholds for each available wavelength, from −60 to +40 dBm may be selected.

A testing result is displayed in units selected during setup, and optionally together with: 1. the mode of transmission of the signal measured: continuous (CW) or modulated to a frequency of 270 Hz, 330 Hz, 1 KHz, or 2 KHz; 2. the wavelength of the signal measured; 3. the reference level expressed in dB; and 4. the level of attenuation compensation. For one and the same fiber, a power meter display may include results corresponding to different wavelengths. Likewise, a Reference Level or an Attenuator Compensator on all wavelengths may be selected with respect to a reference wavelength and the results saved in a report.

According to a simplified example, operation of power meter testing includes: 1. Connecting a light source to be tested to the connector; 2. Choosing units of dBm, dB, or Watts; 3. Initiating START/STOP of measurement via I/O device 102; and 4. Stopping measurement via the user interface. Setting a "zero value" of the power meter via I/O device 102 may be applied before initiation of operation. Initial setting of a "zero value" before measurement reduces the effect of noise from an internal germanium photodiode that may fluctuate over time with variations in temperature. During setting of the zero value, a plug is fixed over power meter port 123 so that no light can reach the internal photodiode of the internal power meter. If the zero value adjustment is made without this plug, an error may occur because the photodiode will have detected too much light.

According to an example, PM-DL module 120 also includes talkset datalink module 320 for communicating speech and data with a remote talkset or datalink device 322 across a spare optical fiber for communication. Talkset is also known as an optical telephone and a datalink is also known as optical digital communication. TS-PC port 124, also known as a Talkset-Datalink port, communicates an optical signal with communication fiber 310. TS-PC port 124 may be a UPP connector. TS-PC port 124 communicates the optical signal from fiber 310 to coupler 324. For receiving talkset or datalink data, the optical signal is output from coupler 324 to receiver 326, including photodiode detector 327 and amplifier 329. Receiver 326 outputs an electrical signal corresponding to the received optical signal. The electrical signal is then decoded by decoder 328 then output to PM-DL interface 302. Likewise, talkset or datalink information may be received from PM-DL interface 302 and encoded for optical communication by encoder 330. The encoded talkset or datalink information is then received by transmitter 332, which includes driver 334 and emitting diode 336 produce an optical signal corresponding to the received electrical signal. The optical signal is then communicated by coupler 324 to TS-PC port 124 and output to communication fiber 310.

Talkset testing enables two operators at opposite ends of optical fiber 310 to communicate along the fiber, usually using spare fibers from a fiber optic cable, and to transfer data. According to an example, each end of the optical link is provided with a platform, such as cell site tool 100, equipped with a Talkset option. It is also possible to use the talkset function to carry out dual measurements at the same time using a different fiber. In other words, power meter module 300 can conduct measurement of DUT 308 during communication along fiber 310 with talkset datalink module 320. It is also possible, through modulation, to transfer data transfer feature while using the optical talkset. Data transfer uses the same fiber as the optical telephone. However, in this case, the data transfer speed may be decreased.

According to an example, talkset datalink module 320 provides an interface for a Talkset testing configuration. The Talkset testing configuration is set, according to an example, in a System Settings screen of I/O device 102. An operation for connections at each end of the fiber may include connecting the fiber 310 to the TS-PC port 124 port either directly or through jumpers. If fiber 310 is connected through jumpers, an FC adapter may be used to connect the jumper to TS-PC port 124. Alternately, an SC adapter may also be used. Recommended connections to TS-PC port 124 include: a PC Fiber Connection (APC is not recommended), or an SC/FC connection. A PC fiber connector is a "physical contact" connector that is polished at the location of physical contact. The PC fiber connector was generated to overcome the air gap between two surfaces from small imperfections in the original flat fiber connector. APC refers to Angled Physical Connect, wherein the ferrule end face radius is polished at an 8° angel to minimize back reflection. An operation for connections at each end of fiber 310 may also include a headset (with earphones and a microphone) supplied as an alternative option and plugged into Audio jack 138 of ALE base module 106.

The Talkset testing configuration of TS-PC port 124 may establish communication by initiating operation by way of I/O device 102. After the desired function is validated, Talkset may be used to communicate via fiber 310. Alternatively, Datalink may be used to transfer data along the fiber. If a remote instrument is ready to receive (i.e. is on standby), the Talkset/Datalink is indicated via I/O device 102 and optional audio signals are emitted. Further, an icon may appear via I/O device 102 indicating that telephone communication can now take place. Alternatively, an icon may appear via I/O device 102 indicating that data transfer can now take place. If the remote instrument is not ready to receive, a message may be indicated. According to an example, a Talkset icon is displayed on a top banner of display 103 as long as communication remains established, letting the technician user know that the connection is working. When communication is established, the headset may be automatically enabled. Optionally, loud speaker 107 included in I/O device 102 may be used. Alternatively, sound may be transmitted to the earphones of a headset connected to audio jack 138. Volume may be adjusted via I/O device 102.

A Datalink function transfers data that varies according to a type of application in use. For fiber optics testing, for example, I/O device 102 may show information similar to a conventional computer file structure. A distant platform may be shown just like a disk and all file and directory features can be used from and to that disk.

Figure 4:
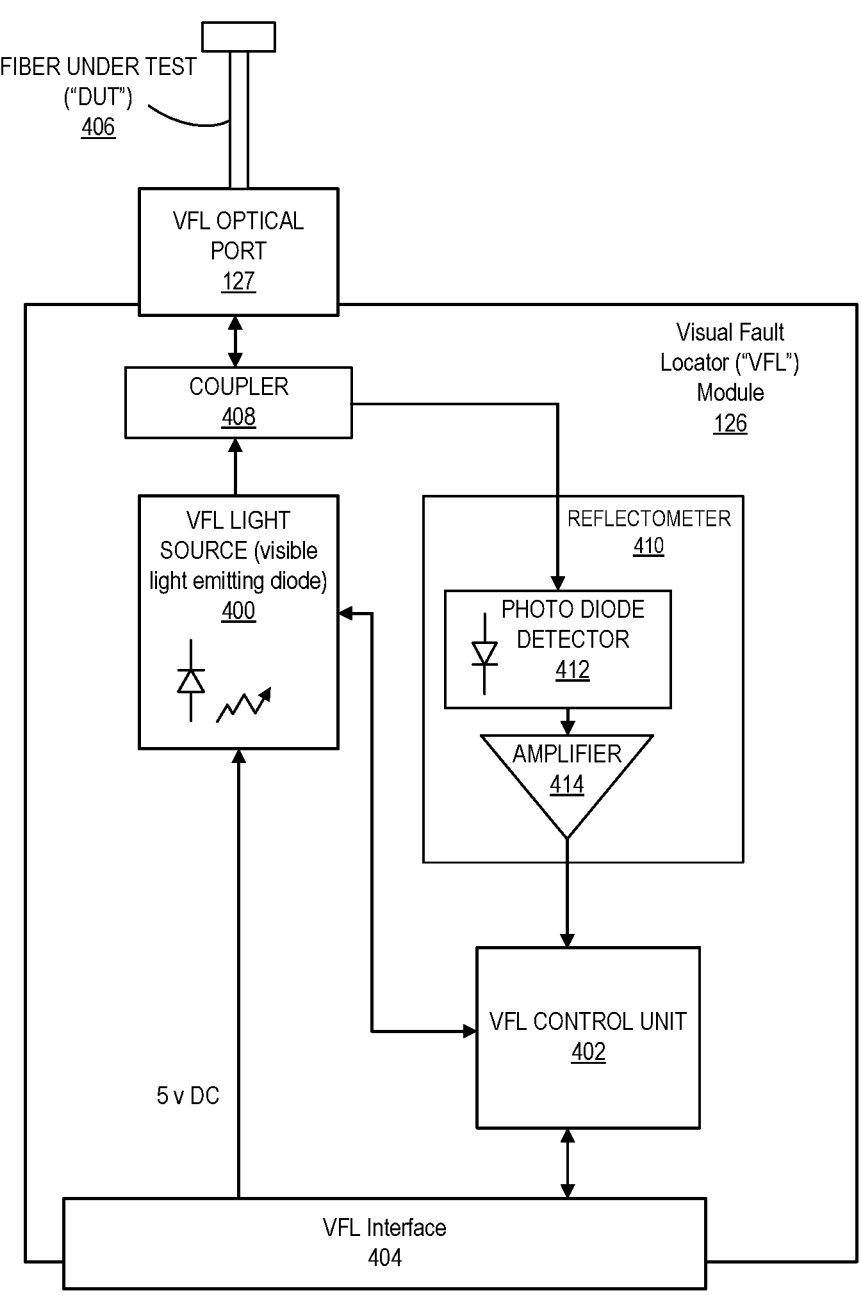
FIG. 4 illustrates a Visual Fault Locator (VFL) module integrated into a base module, according to an example of the present disclosure.

FIG. 4 illustrates VFL module 126 integrated into ALE base module 106, according to an example of the present disclosure. According to an example, VFL module 126 is a factory installed option on ALE base module 106. VFL module 126 includes VFL optical port 127, which may be a UPP connector. VFL optical port 127 is connected to fiber under test 406, also known as a device under test (DUT). VFL light source 400 emits visual light onto optical port 127 through coupler 408 in response to control signals from VFL control unit 402. The control signals turn VFL light source 400 on and off. VFL control unit 402 may supply the control signals to VFL light source 400 in quick succession to provide flash illumination. VFL light source 400 receives power from VFL interface 404. Likewise, VFL control unit 402 receives control signals from VFL interface 404. Visible light received from VFL optical port 127 is transmitted to reflectometer 410 by way of coupler 408. Reflectometer 410 includes photodiode detector 412 and amplifier 414, which convert the optical signal into an electrical signal indicating a measure of reflectance. The electrical signal is output to VFL control unit 402.

A VFL test uses brightly visible light to: 1. Check patch cords for micro-bends, macro-bends, breaks, or bad terminations; and 2. Verify continuity (i.e. determine whether fiber X on a primary end really matches up with fiber Y on a distal end). A technician may identify continuity by observing visible light escaping from fiber under test 406. According to an example, VFL light source 400 emits a red laser light signal of 650 nm, frequency of 1 Hz and power of 1 mW in continuous or flash illumination. According to an example, VFL light source 400 is a Class 2 laser in compliance with standard EN60825-1 by the IEC System of Conformity Assessment Schemes for Electrotechnical Equipment and Components (IECEE) and FDA 21 CFR Part 1040.10. The visible light is emitted onto fiber under test 406 to detect any defects in a dead zone by an internal reflectometer 410. In other words, a defect or artifact in fiber under test 406 will produce a reflectance onto fiber 406, which is then detected by reflectometer 410. This test is suitable for short fibers (length <5 km) or the first few meters of a long fiber. Fault identification is facilitated by the blinking of light in the fiber. To emit a light signal into fiber 406, a technician may interact with I/O device 102. Steps include: 1. Connect fiber under test 406 to VFL optical port

127 on ALE base module 106; and 2. Interact with I/O device 102 to activate the VFL test. According to an example, the VFL test is executed automatically in accordance with a predetermined test plan or Job stored in memory of ALE base module 106. Icons on I/O device 102 may provide a status to the technician. According to an example, measurement results may be stored automatically in reports, and may be reloaded. A single measurement test may be stored as multiple files. A first file may provide an immediate display to the user via I/O device 102. A second file may be transmitted to a workstation (such as a spreadsheet program on a PC) or a server supporting an archival database. According to an example, the second file format may be ASCII.

Figure 5:
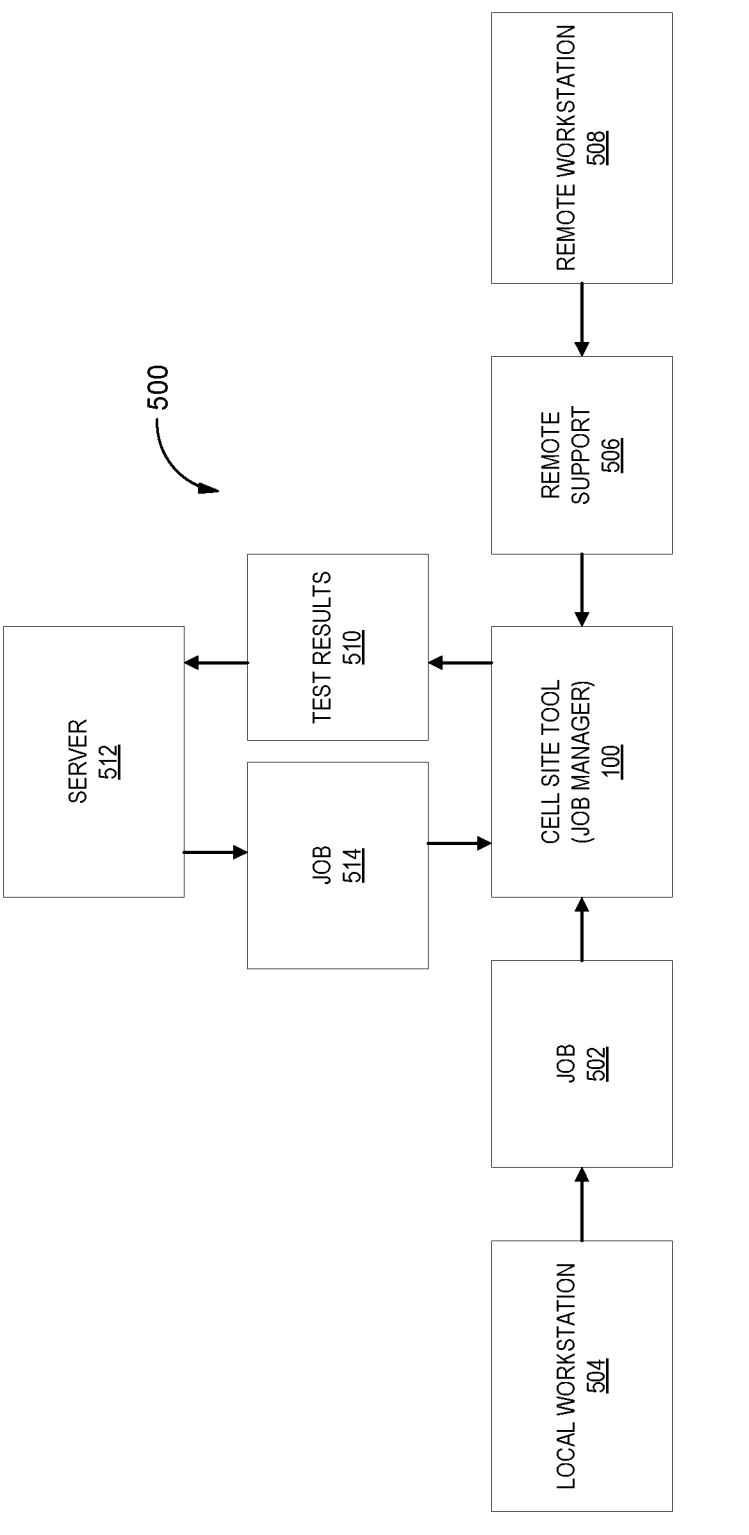
FIG. 5 illustrates a test process automation workflow, according to an example of the present disclosure.

FIG. 5 illustrates test process automation workflow 500, according to an example of the present disclosure. A workstation, such as local workstation 504, creates a job, such as job 502, which may be loaded onto cell site tool 100. Alternatively, server 512 may load a job, such as job 514, onto cell site tool 100. Cell site tool 100 may receive remote support 506 from remote workstation 508. According to an example, local workstation 504 and remote workstation 508 have the same functionality, but differ in their connection to cell site tool 100. Cell site tool 100 may deliver test results 510 to server 512. According to an example, cell site tool 100 may also deliver test results to local workstation 504 or remote workstation 508. Cell site tool 100 includes job manager software, known simply as job manager, which presents GUIs to manage jobs and execute tests. A job is a set of tests to be executed by cell site tool 100. The job manager can be used to define and customize jobs, and coordinates tasks and results across multiple test tools and modules connected to cell site tool 100. The job manager displays step-by-step instructions to a user for executing tests with cell site tool 100. Job manager also displays progress and test results related to tests executed by cell site tool 100.

Cell site tool 100 supports communication with centralized management (CM) software running on server 512, which is presented to a user as a graphical user interface (GUI). The CM organizes and pushes test configurations and job assignments 514 to cell site tool 100. The CM automatically collects and organizes tests results 510 executed by cell site tool 100. The CM presents a GUI on server 512, including a server dashboard of Key Performance Indicators (KPIs). Simply, a KPI dashboard is a visual display of the most important information that decision makers need to help achieve objectives.

Cell site tool 100 may receive remote support 506, including communication and control, by remote workstation 508. Remote workstation 508 provides remote access and control of cell site tool 100, and also supports file transfer.

Figure 6A:
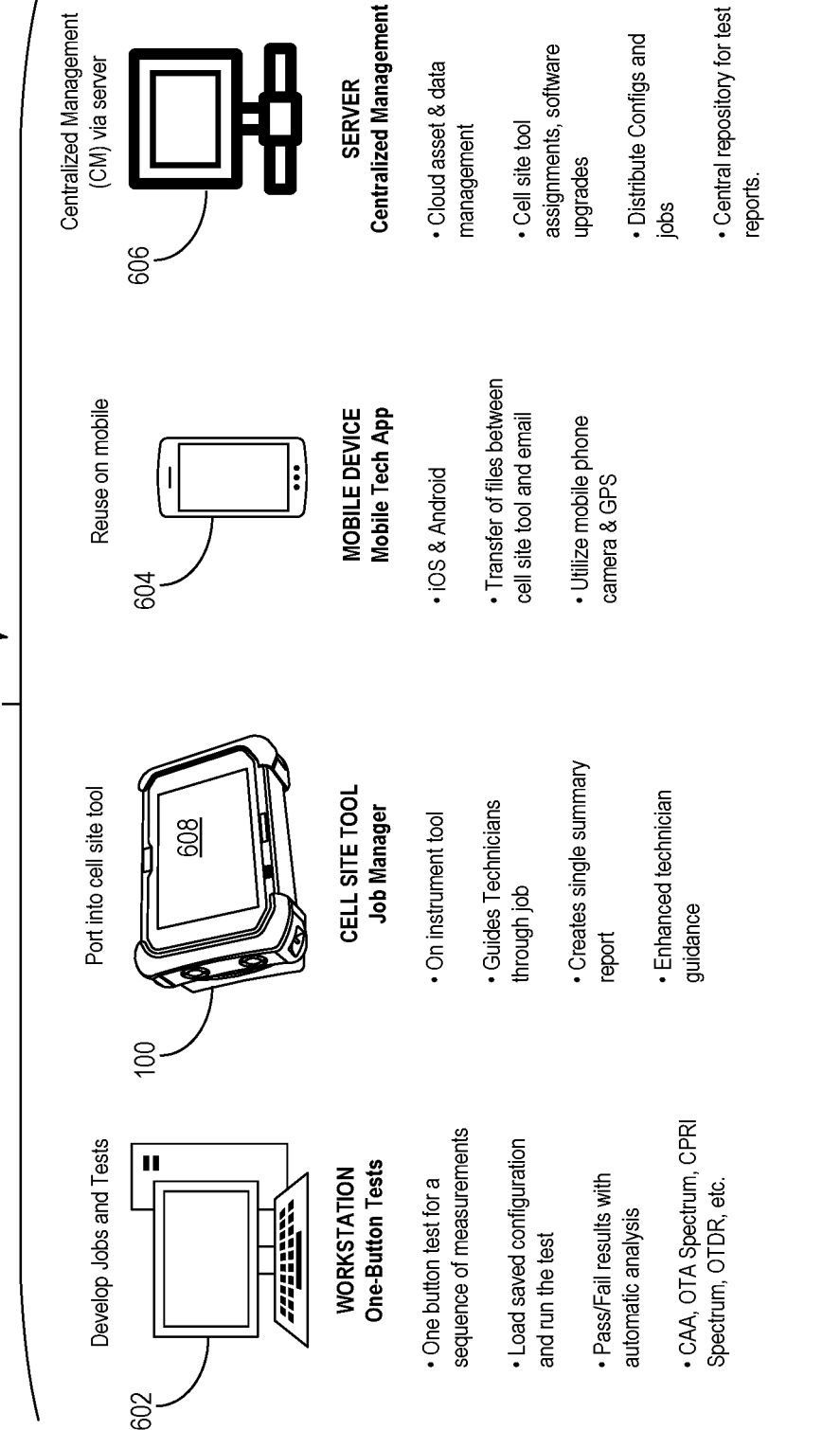
FIG. 6A illustrates a high level system diagram of test process automation, according to an example of the present disclosure.

FIG. 6A illustrates a high level system diagram of test process automation 600, according to an example of the present disclosure. Test process automation 600 includes cooperation and communication between cell site tool 100, workstation 602, mobile device 604, and server 606. Workstation 602 is used to develop jobs, tests, and one-button tests. A one button test may be developed to execute a sequence of measurements by cell site tool 100. Workstation 602 may communicate with cell site tool 100 to load a saved configuration into cell site tool 100, and optionally control the cell site tool to run the test. Workstation 602 may develop a test with Pass/Fail results, and configure cell site tool 100 to perform automatic analysis. According to an example, workstation 602 may develop automated tests for CAA, OtA Spectrum, CPRI Spectrum, OTDR, etc.

Cell site tool 100 runs a Job Manager application, which may control the cell site tool 100 to perform the tests. The Job Manager application may guide technicians through a job, and create a single summary report corresponding to the executed job tests. According to an example, the Job Manager application also includes enhanced technician guidance, which may be selected by the technician to display step-by-step instructions on GUI 608 of cell site tool 100.

Mobile device 604 is a smart phone running an iOS or Android operating system and a Mobile Tech Application. By using the Mobile Tech Application on mobile device 604, a technician may communicate with server 606 and cell site tool 100 to transfer files such as a summary report corresponding to executed job tests. The Mobile Tech Application may also be used to transfer files between cell site tool 100 and email. Mobile device 604 is a smart phone that includes a camera and GPS. A technician may control mobile device 604 to transfer GPS information and photographs to cell site tool 100 corresponding to a test. The Job Manager application on cell site tool 100 associates the GPS information and the photographs with a test, and stores the information in a corresponding summary report.

Server 606 runs centralized management software (CM) to provide centralized management of jobs executed by cell site tool 100, and other similarly configured cell site tools. A service provider may manage thousands of similarly configured cell sites and seek to ensure that all technicians servicing the cell sites perform the same tests. According to an example, a service provider may deliver the same jobs, tests, and one button tests to cell site tools in their fleet. According to an example, server 606 provides asset and data management, and delivers cell site tool assignments and software upgrades. Server 606 may distribute configurations and jobs to cell site tool 100, and serve as a central repository for test reports.

Figure 6B:
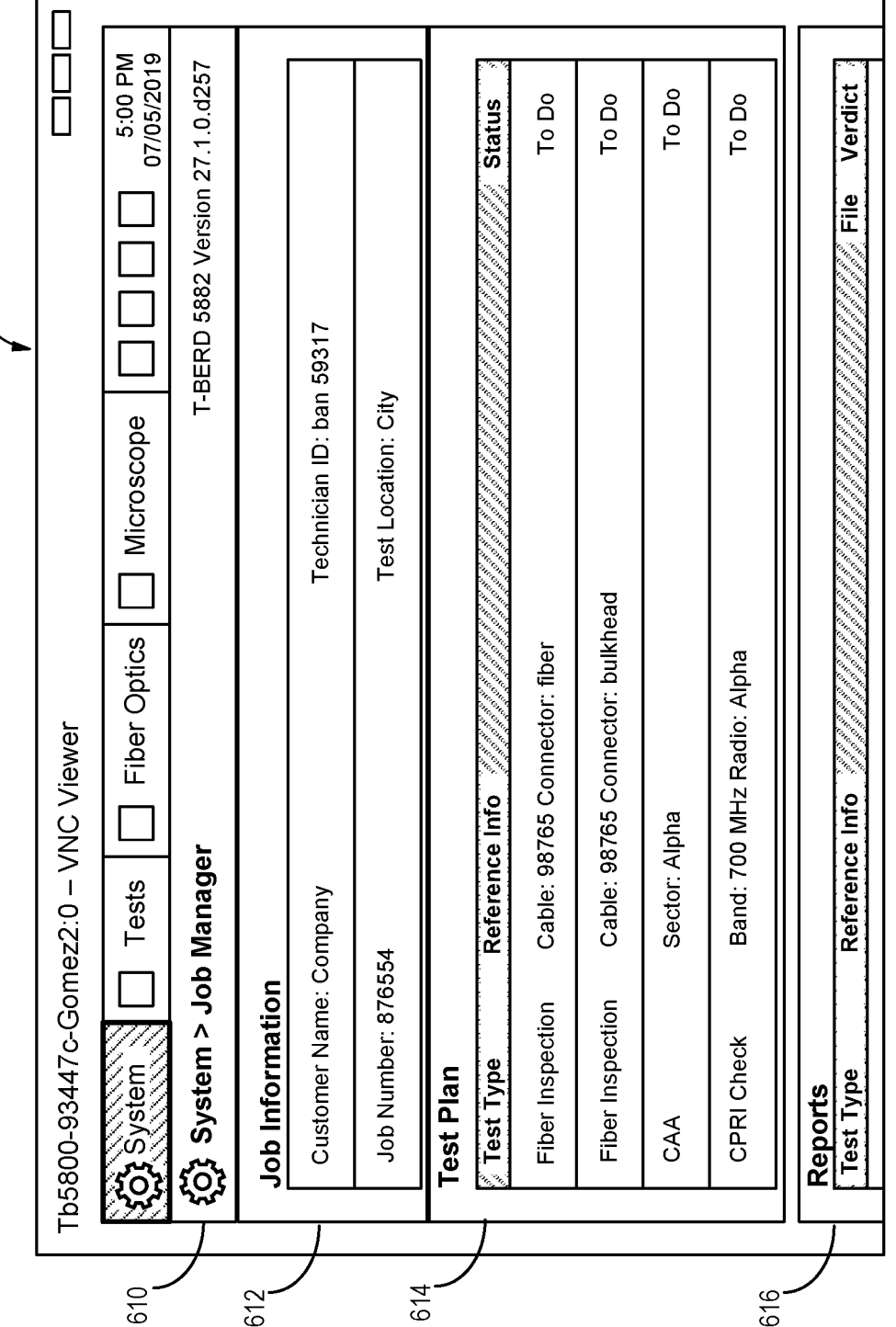
FIG. 6B illustrates a graphical user interface (GUI) for a cell site tool having an automated test plan, according to an example of the present disclosure.

FIG. 6B illustrates a graphical user interface (GUI) 608 for cell site tool 100 having an automated test plan, according to an example of the present disclosure. Cell site tool 100 runs a Job Manager application, which is presented to a technician by Job Manager indication 610. According to an example, GUI 608 presents Job Information 612, including customer name, job number, technician ID, and test location. According to an example, GUI 608 presents Test Plan 614, also known as a Job, indicating tests to be executed by cell site tool 100, and test status. According to the illustrated example, Test Plan 614 includes a fiber inspection test on cable 98765 for the fiber, a fiber inspection test on cable 98765 for the bulkhead, a CAA test at sector alpha, and a CPRI test at 700 MHz for radio alpha. According to an example, GUI 608 presents Reports 616 of tests that have been previously executed by cell site tool 100 for review and comment by a technician. For example, a technician may add GPS and photographs to a test indicated in Reports 616.

Figure 6C:
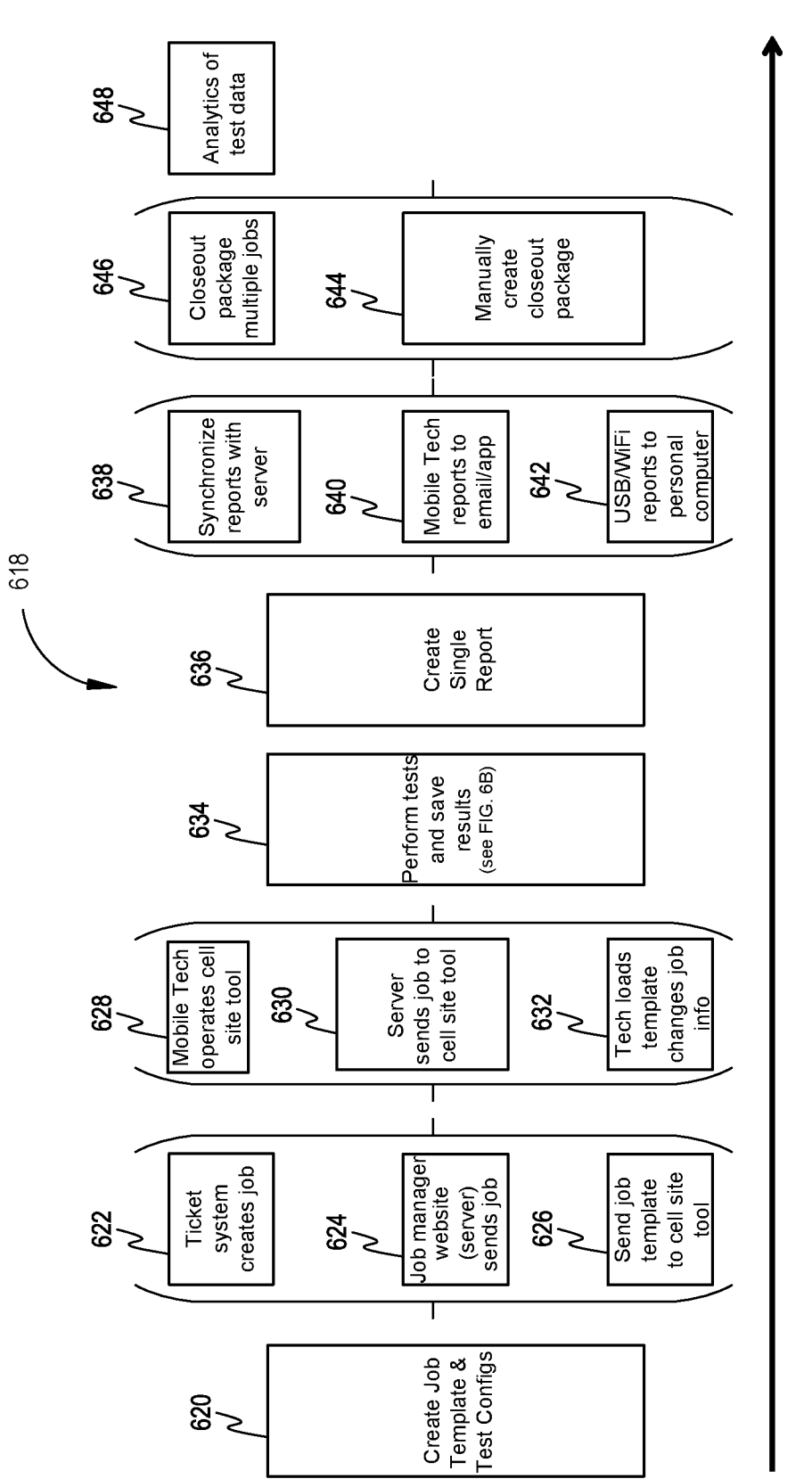
FIG. 6C illustrates a high level system diagram of a workflow for end to end test process automation, according to an example of the present disclosure.

FIG. 6C illustrates a high level system diagram of workflow for end to end test process automation 618, according to an example of the present disclosure, wherein brackets indicate that operations are generally performed at a same time in the process automation. At 620, a job template is created and test configurations are applied to the job template. At 622 a ticket system creates a job including a plurality of tests to be executed by cell site tool 100. At 624, centralized management server 606, which is available on the internet via a job manager website, sends a job request to workstation 602 for creation of a job template. At 626, workstation 602 sends a job template to cell site tool 100 for execution. At 628, a technician operates cell site tool 100 and establishes communication with server 606. At 630, CM software on server 606 sends a job to cell site tool 100. At 632, a technician loads the job and may change job information to correspond to the requested job. At 634, a technician performs tests and saves corresponding results on cell site tool 100. At 636, cell site tool 100 creates a single report corresponding to the executed tests. At 638, reports produced by cell site tool 100 are synchronized in CM software on server 606. At 640, a technician may optionally forward reports using a mobile tech application on mobile device 604 via email. At 642, a technician may load reports from cell site tool 100 to a personal computer via a USB or wireless network connection. At 644, a closeout package is manually created for the job executed by cell site tool 100. At 646, a closeout package is compiled corresponding to multiple jobs executed by cell site tool 100 or similarly configured jobs executed by multiple cell site tools with respect to multiple cell sites at different locations. At 648, analytics of test data may be conducted using the job reports.

According to an example, the cell site tool 100 can generate a GUI on display 103 that presents jobs that are executable by the test tool. The cell site tool 100 can receive user input, such as via a touch screen or other input device, selecting a job shown in the GUI. In an example, a job may comprise a sequence of tests, including an SA test, a CPRI test, an OTDR test and a CAA test, or a job may comprise a set of SA tests, or a set of OTDR tests, etc. A job manager being executed by the cell site tool 100 automatically executes the tests in the sequence to determine a pass or fail condition associated with each test. A pass condition means the test has passed. For example, a measurement taken for the test is within a predetermined range or within predetermined tolerances. A fail condition means the test has failed. For example, a measurement taken for the test is outside a predetermined range or outside predetermined tolerances. Upon receiving the pass condition, the job manager automatically display the pass condition on the GUI and proceeds to execute a next test in the sequence. Test results for each of the tests may be saved in memory, such as in a memory of ALE base module 106. The test results may be displayed in the GUI. One or more of these aspects of the cell site tool 100 are described with respect to FIG. 6D.

Figure 6D:
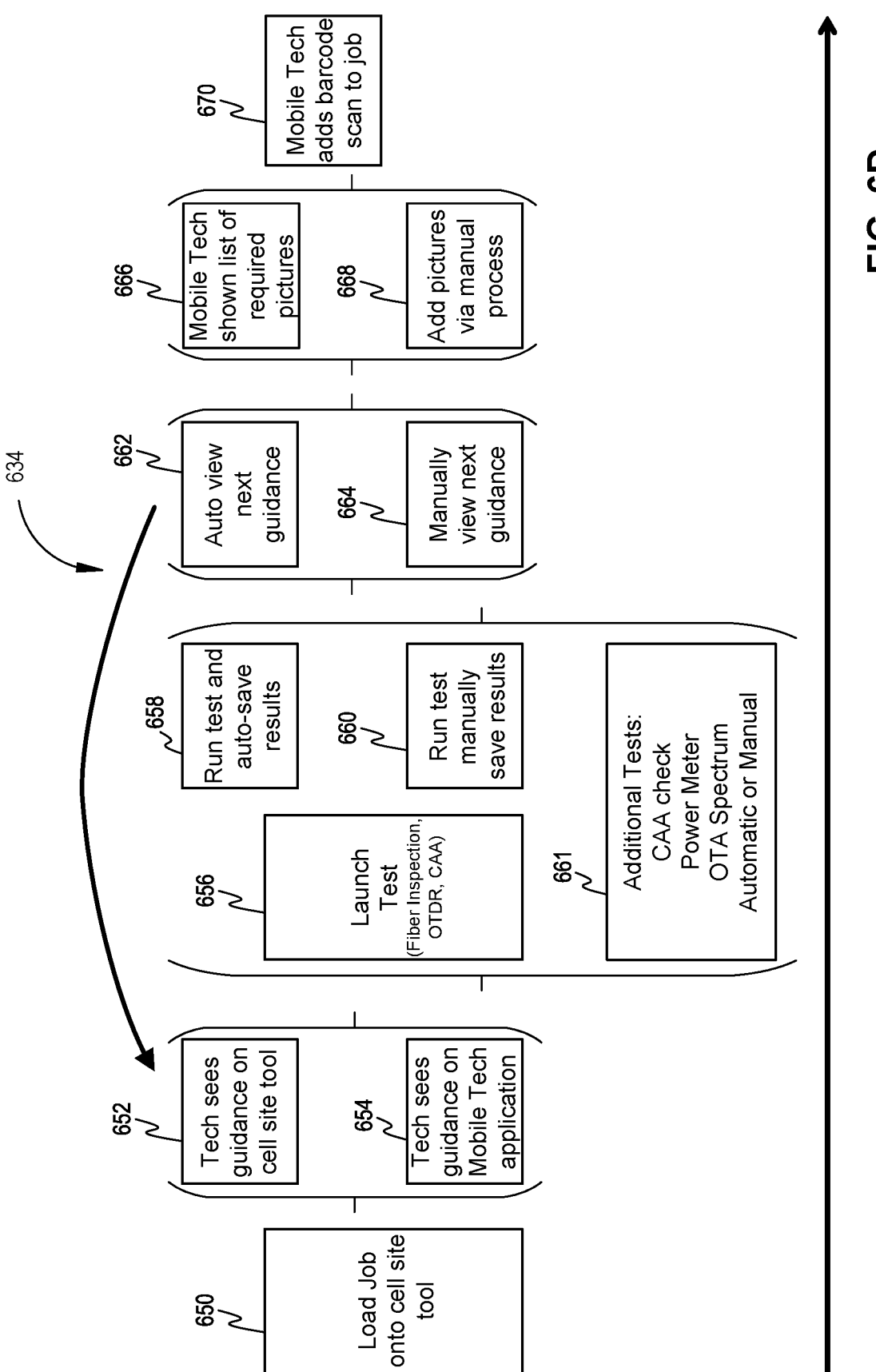
FIG. 6D illustrates a high level system diagram of a workflow for performing tests and saving results, according to an example of the present disclosure.

FIG. 6D illustrates a high level system diagram of workflow element 634 of FIG. 6C for performing tests and saving results, according to an example of the present disclosure, wherein brackets indicate that operations are generally performed at the point in the process automation. At 650, a job is loaded onto cell site tool 100. The job may be selected from a plurality of jobs via a GUI on the cell site tool 100. At 652, a technician may see guidance for performing a test on cell site tool 100. At 654, a technician may also see guidance for a test via a Mobile Tech Application running on mobile device 604. At 656, a test may be launched on cell site tool 100 such as fiber inspection, OTDR, CAA, etc. The test may be launched responsive to a user providing input to launch a job and or a test in the job. At 658, the test is run and the results are automatically saved by cell site tool 100. At 660, alternatively to 658, the test may be run manually by a technician interacting with cell site tool 100 and the results manually saved. At 661, additional tests may be performed by cell site tool 100, such as, according to an example, CAA check, Power Meter, OtA Spectrum. Additionally, regardless of the initial configuration of cell site tool 100, a technician may select automatic or manual testing. At 662, the next guidance for the next test to be executed by cell site tool may be automatically displayed. At 664, if cell site tool 100 is not configured to display the next guidance but the technician wishes to view the next guidance, the technician may interact with cell site tool 100 to manually display the next guidance. At 666, cell site tool 100 shows the technician a list of required pictures to be taken with mobile device 604 associated with the current test. At 668, a technician may elect to add pictures to a test report via a manual process. At 670, cell site tool 100 is used by a technician to add a barcode scan to a job. Barcodes are often located at a point of test for a cell site for tracking jobs. Test results may be saved and displayed in a test report via a GUI.

According to an example of the disclosure, cell site tool 100 may execute tests by including automated test support, starting an automated test instance, and exiting an automated test instance. An "Automated Test" mode will appear as a choice in a Mode list box on a Start Menu of the cell site tool. The Automated Test, when selected, will populate a right pane of a display, such as display 103 of I/O device 102, with a list of available Automated Tests.

According to an example, an Automated Test Instance may be initiated in the cell site tool. All Automated Tests may invoke an underlying Measurement Application as needed, if the Measurement Application is not already running. If another Automated Test is currently running, a dialog will appear to verify that a technician actually wants to abandon the currently running Automated Test instance before closing the current one and invoking the new one. If the technician elects to switch modes while an Automated Test instance is running, a dialog will appear to verify that the user actually wants to end the currently running Automated Test instance. According to an example, a technician may have the ability to exit an Automated Test instance at any time.

According to an example, a technician is able to determine certain parameters and configurations of the cell site tool. According to an alternate example, certain parameters and configurations of the cell site tool may be predetermined. A cell site tool may provide the option to initialize configurations with the last saved settings and the option to initialize configurations from a saved user Profile. A cell site tool may provide the option to initialize configurations to factory defaults. A cell site tool may also provide the ability to generate a report that records the configurations used for an Automated Test instance and includes the results analysis with the option to include Pass/Fail determinations and screenshots. A cell site tool may also provide the ability to navigate through the steps of configuring the test as well as view the test results in an intuitive, wizard-like way. A cell site tool may also provide a progress bar/overall test status widget that is always visible to give the user an indication of how the test is proceeding in time. A cell site tool may also provide a task selection screen from which a technician may invoke the Automated Test and have the ability to see a snapshot of the status of tasks scheduled to run as well as a means of navigating quickly to each task result screen. A cell site tool may also provide a "Limits" screen where the technician can choose to configure thresholds for determining Pass/Fail status. A cell site tool may also provide an Automated Test Framework that is compatible with a Job Manager (embedded in the cell site tool or embedded on a workstation) and is compatible with a server, such as a StrataSync server, set forth in this disclosure.

Figures 6E, 6F:
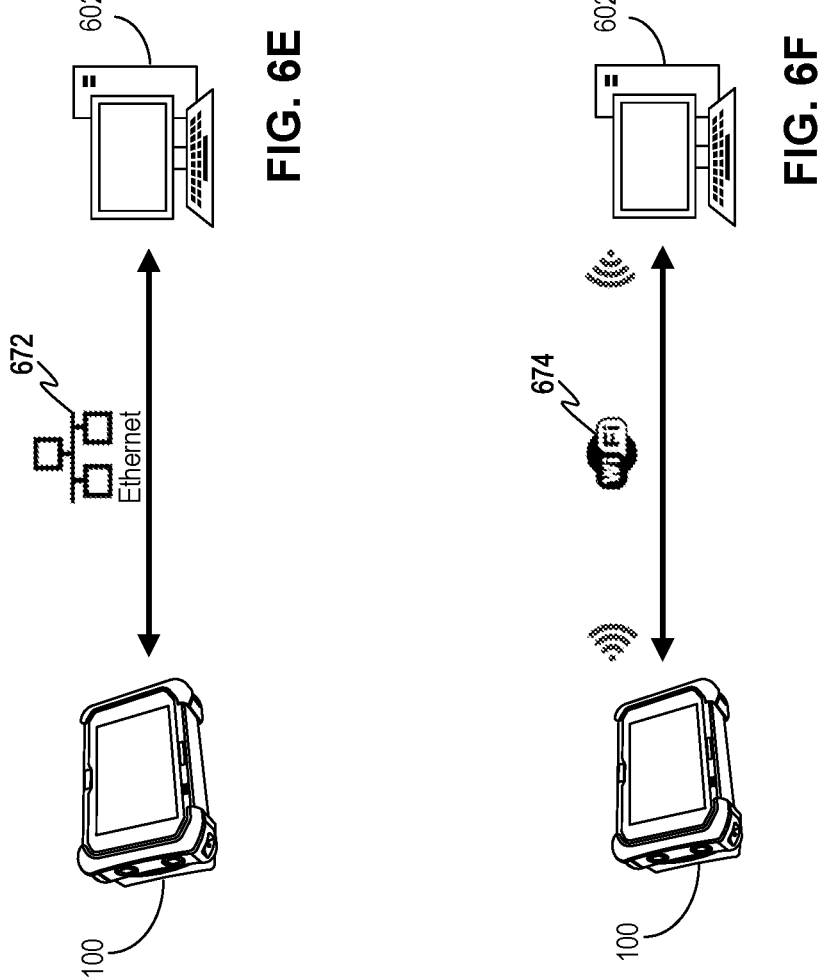
FIG. 6E illustrates a system diagram of a cell site tool connected to a workstation by an Ethernet connection for remote access and control, according to an example of the present disclosure.
FIG. 6F illustrates a system diagram of a cell site tool connected to a workstation by a wireless network connection for remote access and control, according to an example of the present disclosure.

FIG. 6E illustrates a system diagram of cell site tool 100 connected to workstation 602 by an Ethernet connection 672 for remote access and control, according to an example of the present disclosure. Remote access allows permits viewing and control of I/O device 102 of cell site tool 100 from a remote location using workstation 602. In addition to configuring cell site tool 100 and performing tests, remote access permits file transfer to and from cell site tool 100 using the tool's file manager utility. A technician with remote access can rename and delete files, or create, rename, and delete directories. A remote access utility is downloaded and extracted onto workstation 602. According to the example illustrated in FIG. 6E, remote access may be established using a wired Ethernet connection 672.

According to an example, a remote access utility may also be launched on cell site tool 100 by interacting with a GUI via I/O device 102. For example, to launch the utility, on a System page, select Remote, and press Connect next to a remote access icon. The remote access connection is then automatically initiated. 3 After a connection is established to the server, the tool displays a message with a required code to access to the tool remotely. 4. To access tool 100 from workstation 602, the code is input into the workstation utility to access tool 100.

To test the connection between workstation 602 and cell site tool 100 the steps are: 1. On workstation 602, launch the remote access utility. 2. In the workstation utility, a test connection button is selected, and a connection test automatically launches. 3. To display connection log details in real time, a full logs button is selected on the workstation. The connection log then appears, and provides the following information: Upload and Download speed (in Kbyte/s) from Device to server; and Latency between Device and server. 4. After analyzing the results, from the workstation: Select a Clear test results button to delete the current table, and retest the connection if desired. If the connection is deemed to be valid, the access code is then entered and a remote access connection is established.

Single files can be transferred one by one from workstation 602 to cell site tool 100, or from the tool 100 to workstation 602, under control of the remote workstation. To transfer a file to or from the workstation or tool: 1. On the Introduction page of the workstation, click File Transfer. A two-pane window appears, showing the PC or mobile device directories (or storage devices) in one pane, and the instrument directories (or storage devices) in the other pane. 2. In the "source" pane (the pane that has the file that you want to transfer), double click on the directory or storage device, then select the file to be transferred. 3. In the "destination" pane (the pane with the directory that you want to transfer the file to, select the destination directory for the file. 4. Do one of the following: To transfer a file from the workstation to the tool, click Upload. To transfer a file from the instrument to the workstation, click Download. A dialog box appears asking to verify the destination selected for the transferred file. If the destination is correct, click OK. 5. Click Save to transfer the file. A message will appear at the bottom of the screen providing details concerning the status of the file transfer. After the transfer is complete, the message disappears and the transferred file is underlined in the workstation or instrument's file manager.

FIG. 6F illustrates a system diagram of cell site tool 100 connected to workstation 602 by a wireless network (e.g., WiFi) connection 674 for remote access and control, according to an example of the present disclosure. According to the example illustrated in FIG. 6F, remote access may be established using wireless network connection 674 by enabling a wireless network module internal to ALE base module 106.

Figures 6G, 6H:
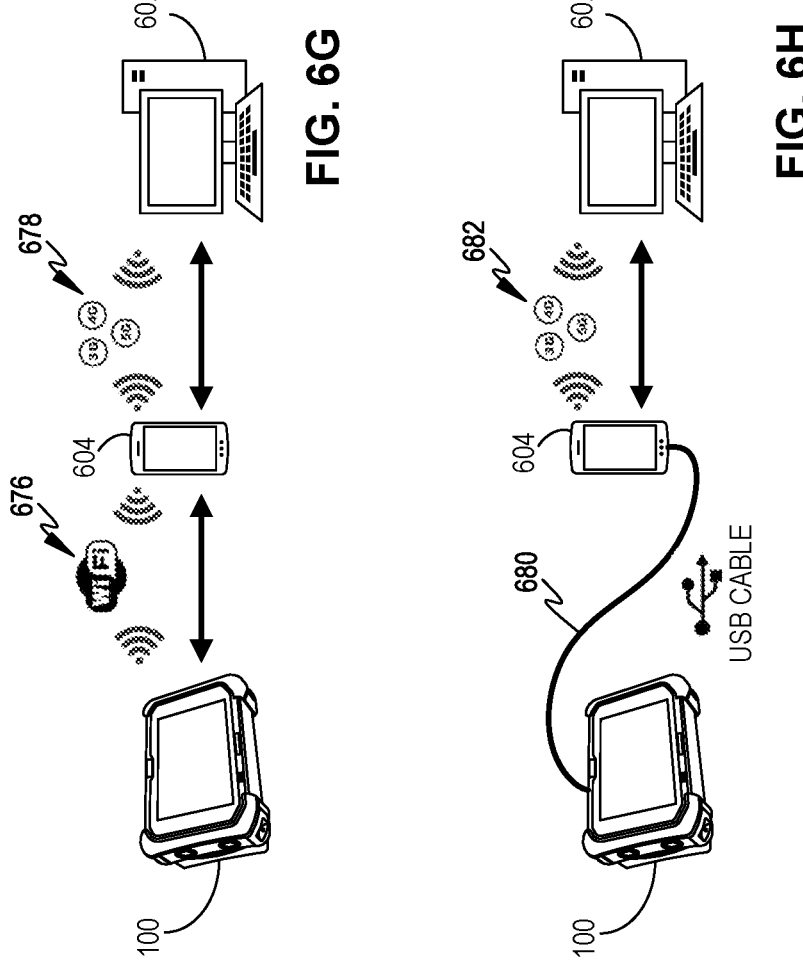
FIG. 6G illustrates a system diagram of a cell site tool connected to a workstation by a wireless network tethered mobile device and a wireless wide area network (WWAN) connection for remote access and control, according to an example of the present disclosure.
FIG. 6H illustrates a system diagram of a cell site tool connected to a workstation by a universal serial bus (USB) tethered mobile device and a WWAN connection for remote access and control, according to an example of the present disclosure.

FIG. 6G illustrates a system diagram of cell site tool 100 connected to workstation 602 by a wireless network tethered mobile device 604 and a WWAN connection for remote access and control, according to an example of the present disclosure. According to the example illustrated in FIG. 6G, remote access may be established by tethering mobile device 604 to cell site tool 100 using wireless network connection 676. Mobile device 604 then uses wireless WWAN connection 678 to connect to workstation 602. The WWAN connection may be various mobile telecommunication cellular network technologies available to mobile device 604 such as 3G, 4G LTE, and 5G.

FIG. 6H illustrates a system diagram of cell site tool 100 connected to workstation 602 by a USB tethered mobile device 604 and a WWAN connection for remote access and control, according to an example of the present disclosure. According to an example, a USB cable may be connected between a USB port on cell site tool 100, such as USB-A ports 136a and 136b, and mobile device 604. Mobile device 604 then uses WWAN connection 682 to connect to workstation 602.

Figure 7A:
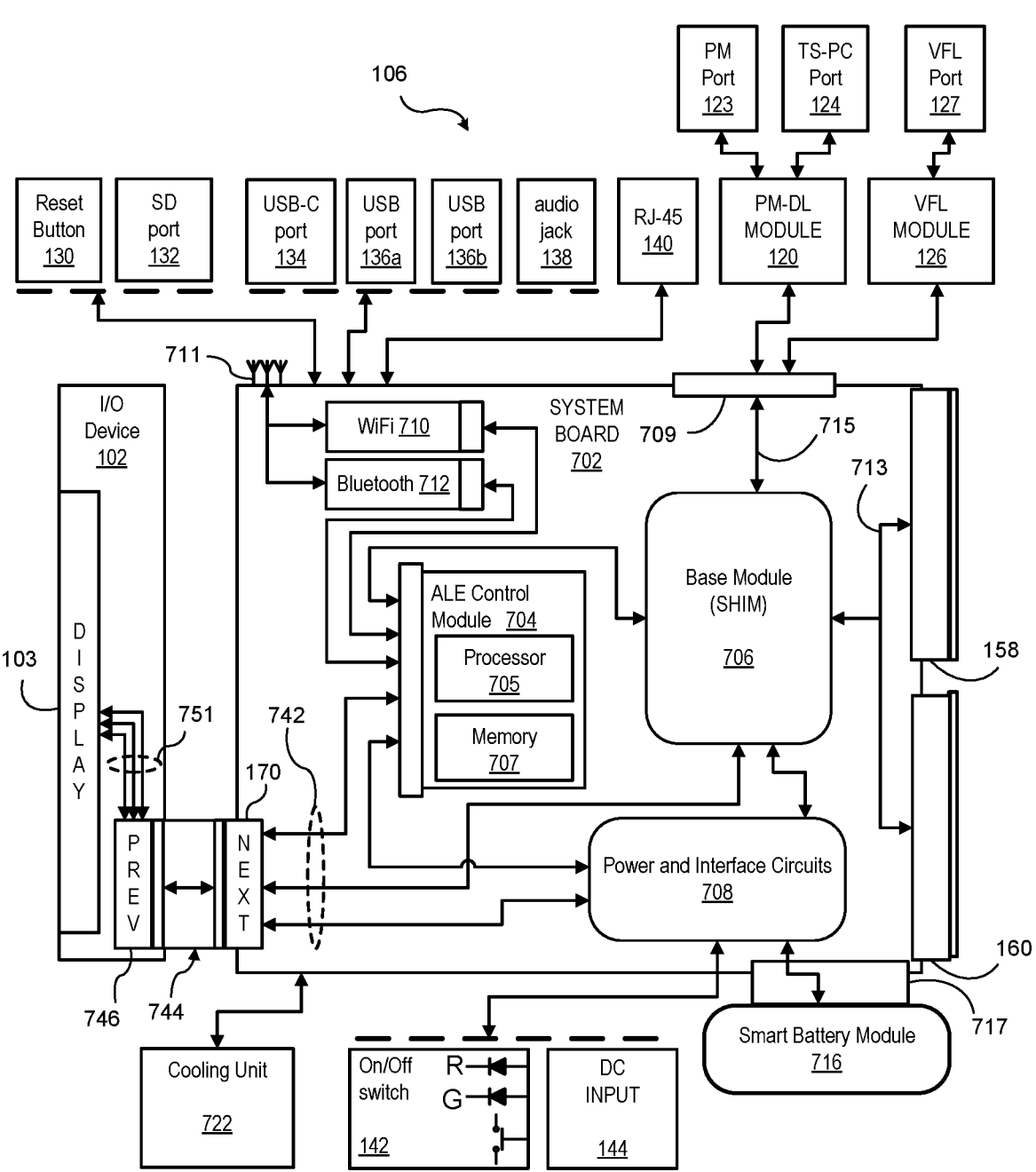
FIG. 7A illustrates a high level system diagram of a base module and an I/O device, according to an example of the present disclosure.

FIG. 7A illustrates a high level system diagram of ALE base module 106 and I/O device 102, according to an example of the present disclosure. ALE base module 106 includes system board 702 with interfaces to removably connect to various Solution Modules and Expansion Modules to form cell site tool 100. System board 702 removably connects to I/O device 102, which houses and supports display 103. According to an example, I/O device 102 is embodied in a modular housing, which is removably connectable to ALE base module 106. According to an example, display 103 is disposed within I/O device 102 and a GUI may be generated on the display 103 to provide user control of cell site tool 100 for testing and measurement. The modular housing of I/O device 102 permits both field replaceability and connection of various additional Solution Modules. According to an example, ALE base module 106 is on the order of 10" wide to permit hand carry by a field technician.

System board 702 includes an ALE control module 704. According to an example, ALE control module 704 includes processor 705 and memory 707. In an example, ALE control module 704 may be a Smart Mobility ARChitecture (SMARC) module, which is a versatile small form factor computer module definition. Processor 705 may be a SMARC compatible processor. According to an example, processor 705 may include a programmable and replaceable processor module/card used in a cell site tool system where pluggable/upgradable/flexible processor selection is desired. According to an example, processor 705 may be a multi-core, programmable, processor. According to an example memory 707 may be a 12CV EEPROM. Processor 705 processes software instructions stored in memory 707.

According to an example, ALE control module 704 facilitates a flexible processor choice for processor 705 such as an iMX6 or iMX8 processor from NXP semiconductor or other processor. ALE control module 704 may be a SMARC control module based on SMARC Version 2.0, and capable of supplying up to 15 W (5V/3 A) to processor 705. SMARC is a versatile small form factor computer Module definition. SMARC is essentially a replaceable processor module/card used in a system where pluggable/upgradable/flexible processor selection is desired. SMARC is a specification published by the Standardization Group for Embedded Technologies for computer-on-modules (i.e. COMs). SMARC Computer-on-Modules are specifically designed for the development of extremely compact low-power systems. SMARC modules can also be fitted with other low-power System-on-Chip (SoC) architectures, like, for example, ones based on x86 SoCs.

System board 702 includes base module SHIM 706, which is a Software/Hardware Interface for Multi-Many-core (SHIM) interface, such as set forth in 2804-2019—IEEE Standard for Software-Hardware Interface for Multi-Many-Core. Base module SHIM 706 provides an architecture to support connection to a plurality of additional modules. Base module SHIM 706 connects to PM-DL module 120 and VFL module 126 with base module bus 715 through with base module interface 709. Base module SHIM 706 connects to expansion interfaces 158 and 160 with expansion bus 713. Base module SHIM 706 connects to base module backplane interface 170 through base module backplane 742. According to an example, expansion interfaces 158 and 160 are 140 pin connectors having 0.8 mm pitch Gold-Fingers to electrically mate with a plurality of different modules. Base module SHIM 706 connects to power and interface circuits 708 to distribute power to connected modules through base module bus 715 and expansion bus 713.

According to an example, I/O device 102 is removably connectable to ALE base module 106. I/O device 102 includes a display 103 that provides user control and user information, a listing of predetermined tests to be executed (i.e. a predetermined test plan), a listing of reports to be compiled, a compilation of executed test results in test reports, and interface control for communication with a work station or server. I/O device 102 includes an I/O backplane 751 that connects to base module backplane 742 of ALE base module 106 at backplane interface junction 744. I/O backplane interface 746 forms part of I/O device 102 and base module backplane interface 170 forms part of ALE base module 106. Together, I/O backplane interface 746 and base module backplane interface 170 form junction backplane interface junction 744. The designation of PREV and NEXT provide a reference for connectivity of various modules in various configurations to base module backplane 742 in the various figures.

According to an example, I/O device 102 is contained in a removable modular housing. In other words, display 103 functions as a special Solution Module. This permits both field replaceability and access within the platform to insert additional Solution Modules. According to an embodiment, display 103 supports a 1280×800 resolution with multi-touch capacitive interface capability. According to an example, a screen size on the order of 10" diagonal size is provided. According to another example, a screen size on the order of 8" diagonal size is provided. According to an example, display 103 is backlit to provide readable brightness in an outdoor environment.

According to an example, power and interface circuits 708 receive power from internal smart battery module 716 by way of smart battery interface 717. According to an example, smart battery module 716 includes a dedicated battery internal to the structure of the ALE base module 106. The dedicated internal battery is field replaceable and is also rechargeable via power and interface circuits 708. The power and interface circuits 708 may also receive power by way of DC input 144. Power and interface circuits 708 may also receive power by way of an Expansion Module containing a smart battery. Operation of ALE base module 106 is initiated or turned off by way of On/Off switch 142. Accordingly, the internal battery within smart battery module 716 may be recharged when DC power is supplied by way of DC input 144. The internal circuitry of ALE base module 106 is cooled by cooling unit 722, which may include a fan, a heat sink, a temperature senor and/or combination thereof. According to an example, control of a fan within cooling unit 722 is provided by way of a temperature sensor that provides a temperature indication signal to ALE control module 704, which in turn controls operation of the fan.

Reset button 130 provides a hard reset of ALE base module 106. Reset button 130 may be depressed with a small object, such as an extended paperclip. SD port 132 provides removable storage to ALE base module 106 by receiving a removable micro-SD card. The micro-SD card may provide memory for storing customer data, setup configurations, reports, and test results. A pair of USB ports 136a and 136b provides support for connection of USB 2.0/3.0 peripherals. USB-C port 134 provides a debug-serial-port to support testing and trouble-shooting of ALE base module 106, and an external audio interface (and/or headset). The external headset may be multiplexed with USB-C port 134 by way of an external adapter, such as a USB-C to 3 mm adapter. Audio jack 138 may provide a direct audio interface by accepting a 3 mm male plug. Ethernet port 140 is an RJ-45 jack to provide 10/100/1000-BaseT Ethernet management.

Wireless network module 710 provides a wireless network interface to ALE base module 106 by way of communication between antenna 711 and ALE control module 704. Bluetooth module 712 provides a Bluetooth interface to ALE base module 106 by way of communication between antenna 711 and ALE control module 704. According to an example, wireless network module 710 and Bluetooth module 712 form the same module. According to an example, several wireless options, such as Wi-Fi and Bluetooth configuration choices, are supported. Various wireless options include:

Option 1: 1×1 Dual Band, 802.11.a/b/g/n (no ac), Single Antenna, Half-Mini-Card (30×30), Integrated Bluetooth, Single USB Interface for Bluetooth and Wi-Fi.

Option 2: 2×2 Dual Band, 802.11.a/b/g/n/ac, Two Antenna, Half-Mini-Card (30×30), Integrated Bluetooth, USB Interface for Bluetooth, PCIe Interface for Wi-Fi, and two Spatial Streams MU-MIMO.

Option 3: 3×3 Dual Band (No Bluetooth), 802.11.a/b/g/n/ac, Three Antenna, Mini-Card (30×50), No-Integrated Bluetooth (or with Integrated Bluetooth), PCIe Interface for Wi-Fi, three Spatial Streams MU-MIMO.

According to an example, wireless network module 710 or Bluetooth module 712 may be accessed separately after ALE base module 106 is fully assembled and enclosed. This permits a factory-option of wireless network or Bluetooth to meet varying end user requirements. Although not shown, a Wireless-Module access 'door' may be provided with a special fastener, different from the connection members set forth above, to discourage access without a special-tool. According to an example, three internal Wi-Fi antennas of antennas 711 may be mounted within ALE base module 106, and optionally one internal Bluetooth antenna.

According to an example, ALE base module 106 includes optional PM-DL module 120, also known as a power meter/datalink optical sub module. According to an example, the PM-DL 120 connects to base module SHIM 706 through base module bus 715 and base module interface 709 and is factory installed into the ALE base module 106. PM-DL 120 includes power meter port 123 and Talkset-Datalink (TS-PC) port 124. TS-PC port 124 is an optical connector that is UPP, which is compatible with all diameter 2.5 mm connectors (FC, SC, ST, DIN, E2000, etc.). According to an example, ALE base module 106 also includes VFL module 126 to provide visual fault location. VFL module 126 connects to base module SHIM 706 through base module bus 715 and base module interface 709. VFL module 126 includes a VFL optical port 127. According to an example, the VFL optical port is an optical connector that is UPP, which is compatible with all diameter 2.5 mm connectors (FC, SC, ST, DIN, E2000, etc.). According to an example, optional VFL module 126 is factory installed into the ALE base module 106. According to examples, various combinations of power meter module 300 (included in PM-DL module 120), talkset datalink module 320 (included in PM-DL module 120), and visual fault locator module 126 are available to support: 1. Power Meter only; 2. Talkset and Datalink only; 3. Talkset and Datalink & Power Meter; 4. VFL only; and 5. VFL & Power Meter. According to an example, ALE base module 106 also includes factory installed internal modules, supporting the following options: Talkset & Power Meter; Power Meter & VFL; VFL only; and Power Meter only.

According to an example, cooling unit 722 includes an integrated fan with a speed control to manage internal temperature of the system board 702, ALE control module 704, wireless network module 710, and smart battery module 716. ALE base module 106 power consumption may be affected by choice of processor module (i.e. SMARC), contained within ALE control module 704. According to an example, ALE base module 106 has a power budget on the order of 15 W including display 103 at full brightness (exclusive of extra power required for battery charging). According to an example, system power supplied to ALE base module 106 from DC input 144 is a maximum of 15 A*26V (390 W). According to an example, ALE base module 106 includes "Apple-MFI" circuitry for compatibility with "Apple" products, and all USB ports are capable of supplying 0.5 A DC at 5V to external USB Load. According to an example, an Audio/Headset may be muxed with USB-C port and accommodated using an adapter (i.e. USB-C to 3 mm). According to an example, a platform loudspeaker (not shown) is provided within ALE base module 106 or I/O device 102 to provide audio without requirement for connection of an audio headset. According to an example, DC power may be applied to DC input 144 by way of a 160 W AC-DC Power Brick.

According to an example, internal smart battery module 716 includes a single battery, which is field replaceable. Battery access is provided without need to disassemble/remove any of its Modules. According to an example, the battery compartment of ALE base module 106 may be compatible with Inspired-Energy NH2054VV34. According to an example the primary battery may be 14.4V, 6.8 A-hr, 98 Wh, 8 A capable NH2054VV34, having a run time on the order of four hours. According to another example, dual battery support may be provided by connection of another smart battery to expansion interface 158 or expansion interface 160. An additional smart battery may provide additional power to support module scalability. Examples include: a Dual-Occupancy Full-Size ALE Solution Module that contains Spectrum-Analyzer and CPRI Testing; a CAA Expansion Module for Cable Antenna Analysis; an OTDR Expansion Module for OTDR Testing, and an OSA Expansion Module for optical spectrum analyzer testing.

Figure 13:
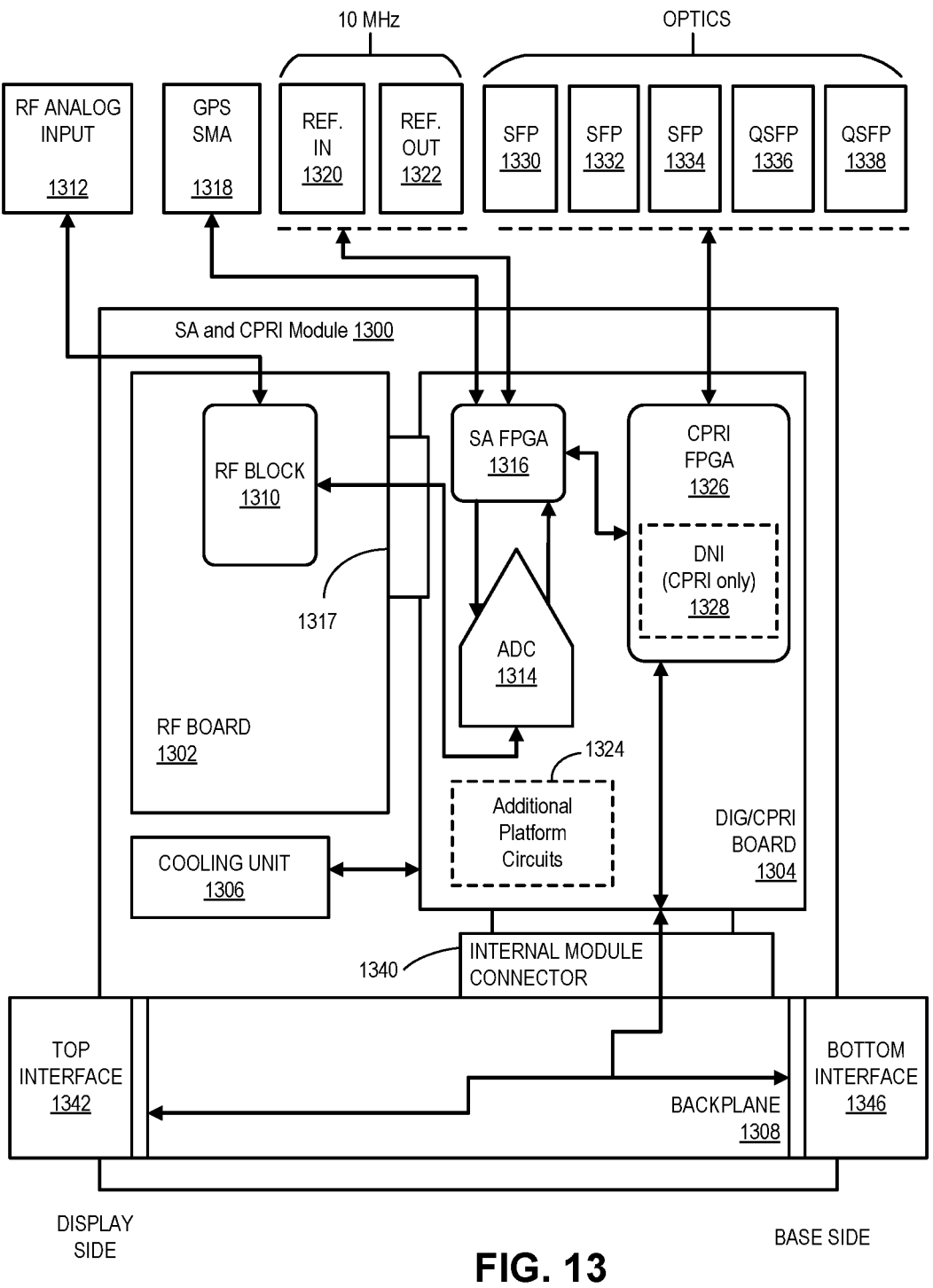
FIG. 13 illustrates a system diagram of a Spectrum Analyzer and Common Public Radio Interface (SA/CPRI) module, according to an example of the present disclosure.

According to an example, ALE base module 106 supports expansion modules 110 and 111 (e.g. OTDR, CAA, etc.) for connection at expansion interfaces 158 and 160, and full size Solution Modules (e.g. Spectrum Analyzer and Common Public Radio Interface ALE solution module 1300 of FIG. 13) for connection at base module backplane interface 170. According to an example, ALE base module 106 may support up to four removably connectable modules, namely two removably connectable Expansion Modules by way of expansion interfaces 158 and 160, and two full-size removably connectable ALE Solution Modules by way of base module backplane interface 170.

Figure 7B:
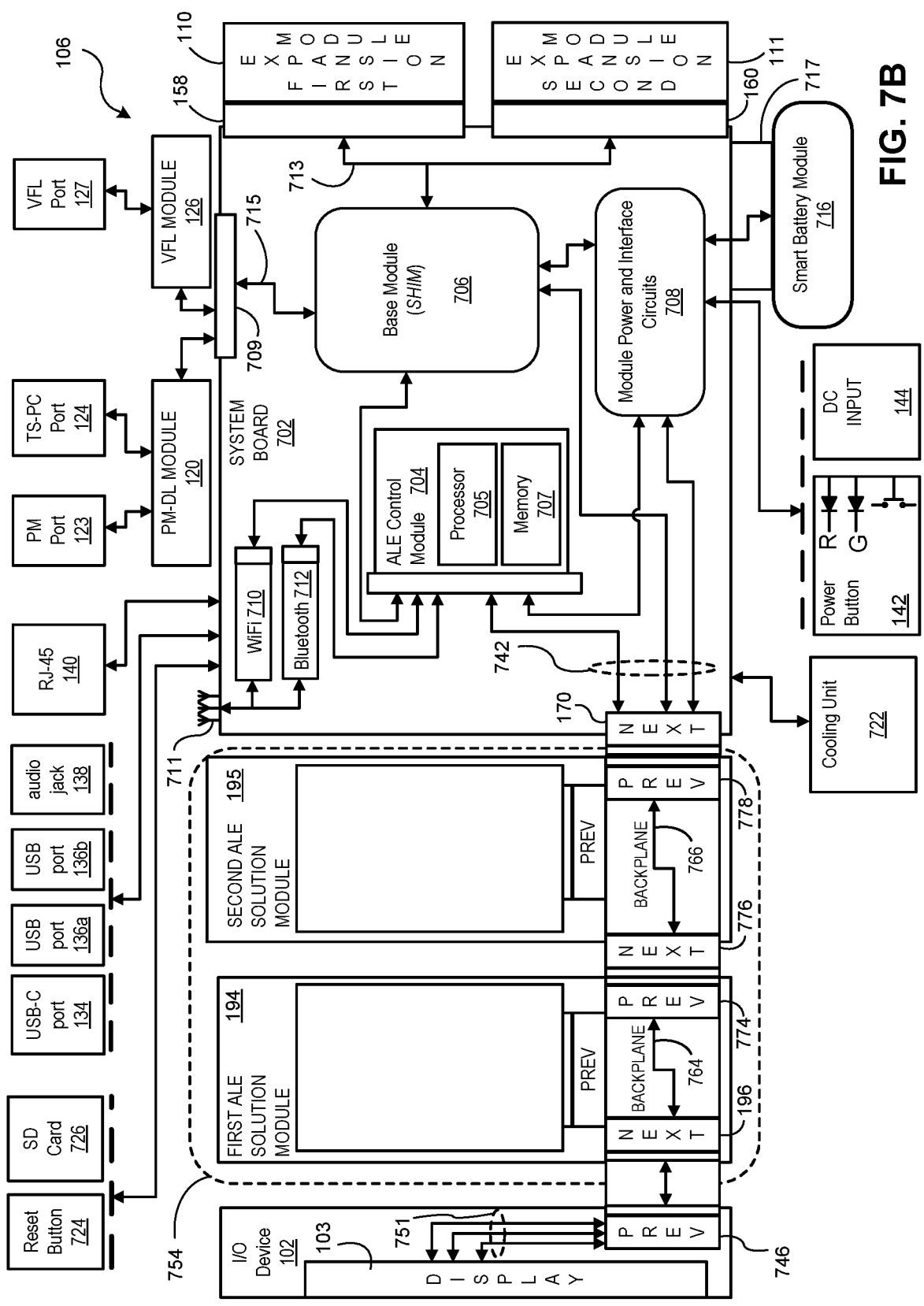
FIG. 7B illustrates a high level system diagram of a base module a removably connected to a first solution module, a second solution module, and an I/O device, according to an example of the present disclosure.

FIG. 7B illustrates a high level system architectural diagram of ALE base module 106 removably connected to first ALE solution module 194, second ALE solution module 195, and I/O device 102, according to an example of the present disclosure. ALE solution Modules 194 and 195 are removably connectable between I/O device 102 and ALE base module 106 to form an integrated cell site tool 100. According to an example, either of ALE solution modules 194 or 195 may be a Spectrum Analyzer and Common Public Radio Interface Module. ALE base module 106 connects to expansion module 110 at first expansion interface 158 and second expansion module 111 at second expansion interface 160. According to an example, ALE base module 106 maintains a small to mid-range, hand held form factor.

According to the illustrated example of FIG. 7B, first ALE solution module 194 includes a backplane 764 connected to top solution interface 196, designated as NEXT, and a bottom solution interface 774, designated as PREV. Top solution interface 196 is disposed on a top side of first ALE solution module 194 for connection to an interface disposed on the bottom side of an adjacent Solution Module, such as I/O backplane interface 746 of I/O device 102. Bottom solution interface 774 is disposed on a bottom side of first ALE solution module 194 for connection to an interface disposed on a top side of an adjacent Solution Module, such as top solution interface 776 of second ALE solution module 195. According to an example of the cell site tool 100 with first ALE solution module 194 included as a single solution module (i.e. without second ALE solution module 195), bottom solution interface 774 connects to base module backplane interface 170.

Second ALE solution module 195 includes a backplane 766 connected to top solution interface 776, designated as NEXT, and a bottom solution interface 778, designated as PREV. Top solution interface 776 is disposed on a top side of second ALE solution module 195 for connection to an interface disposed on the bottom side of an adjacent Solution Module, such as bottom solution interface 774 of first ALE solution module 194. Bottom solution interface 778 is disposed on a bottom side of second ALE solution module 195 for connection to an interface disposed on a top side of an adjacent Solution Module, such as backplane interface 170 of ALE base module 106. According to an example of the cell site tool 100 with first ALE solution module 194 and second ALE solution module 195, base module backplane 742 is connected to backplane 766 of second ALE solution module 195, backplane 764 of first ALE solution module 194, and backplane 751 of I/O device 102.

According to FIG. 7B, first ALE solution module 194 and second ALE solution module 195 include backplanes. Either first ALE solution module 194 or second ALE solution module 195 may support a single internal module configuration or a dual internal module configuration.

Figure 8:
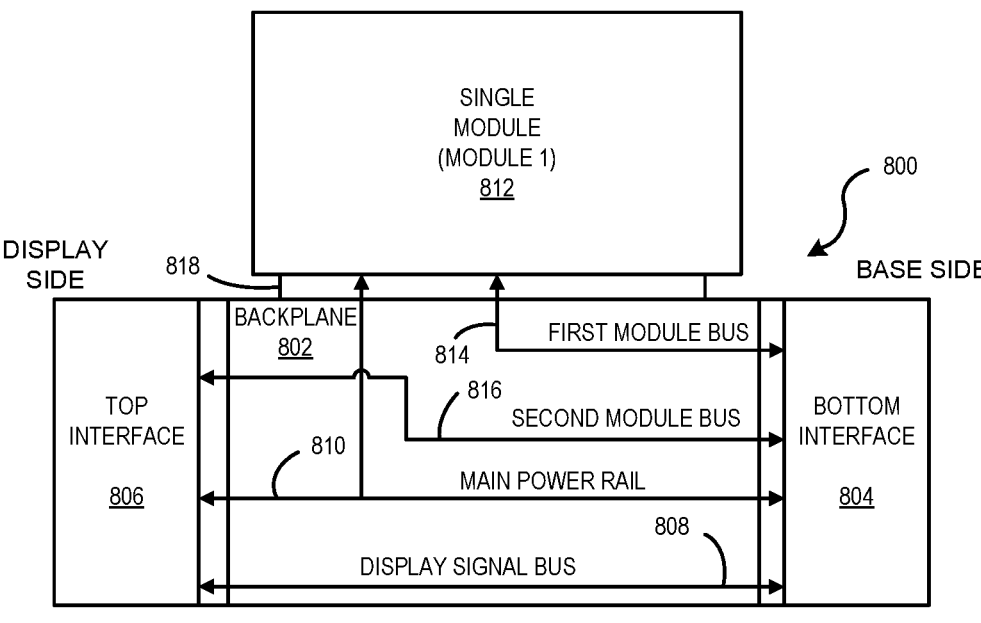
FIG. 8 illustrates an architectural diagram of a single-occupancy solution module including a single internal module and an internal backplane, according to an example of the present disclosure.

FIG. 8 illustrates an architectural diagram of single-occupancy ALE solution module 800 including single module 812 and internal backplane 802, according to an example of the present disclosure. According to an example, all Solution Modules incorporate an internal backplane within its housing. A specific Solution Module having a Single-occupancy module is illustrated in FIG. 8. Each Solution Module will follow rules for routing/passing through unused/bused resources and adhere to a Backplane pinout.

Single-occupancy ALE solution module 800 consumes resources of ALE base module 106 corresponding to a single module.

ALE Solution Module 800 includes a backplane 802 connected to top solution interface 806, bottom solution interface 804, and internal module interface 818. Top solution interface 806 connects to I/O backplane interface 746 of I/O device 102 either directly or through a backplane of another Solution Module. Bottom solution interface 804 connects to base module backplane interface 170 either directly or through a backplane of another Solution Module. Display signal bus 808 passes display signals directly from bottom solution interface 804 to top solution interface 806 because the display signals are output from ALE base module 106 to display 103 of I/O device 102. Main power rail 810 is connected to bottom solution interface 804, top solution interface 806 and internal module interface 818. Main power rail 810 receives power from ALE base module 106 either directly or through a backplane of another Solution Module and is supplied by bottom solution interface 804. Likewise, main power rail 810 transmits power to I/O device 102 either directly or through a backplane of another Solution Module.

ALE solution module 800 includes a single module 812 connected to internal module interface 818, which communicates control and information signals through first module signal bus 814 to bottom solution interface 804. Bottom solution interface 804 communicates the control and information signals to ALE base module 106 either directly or through a backplane of another Solution Module. Second module signal bus 816 passes control and information signals for another Solution Module from bottom solution interface 804 to top solution interface 806.

According to an example, backplane 802 passes unused resources to another Solution Module disposed between single ALE solution module 800 and I/O device 102 connected to top solution interface 806 while jogging connectivity as required by a Backplane-Pinout and having zero vias on highest speed signals. According to an example, internal module interface 818 is a 100 pin, 0.8 mm pitch HSEC-8 connector to mate to single module 812 via goldfingers. Bottom solution interface 804 and top solution interface 806 are 140p 0.8 mm pitch HSEC-connector interfaces rated at a minimum of 100-cycles.

According to an example, each single-occupancy ALE Solution Module has application circuitry, including a processor, an EEPROM to hold module information; a General-Purpose Input/Output device for module power off/on control; and a temperature sensor to precipitate platform forced shut down of ALE solution module 800 in the event a module unsafe character has occurred. According to an example, ALE solution module 800 has a Peripheral Component Interconnect express (PCIe) endpoint to minimize power consumption. According to an example, ALE base module 106 gates off main power rail 810 unless I/O device 102 is present.

Figure 9:
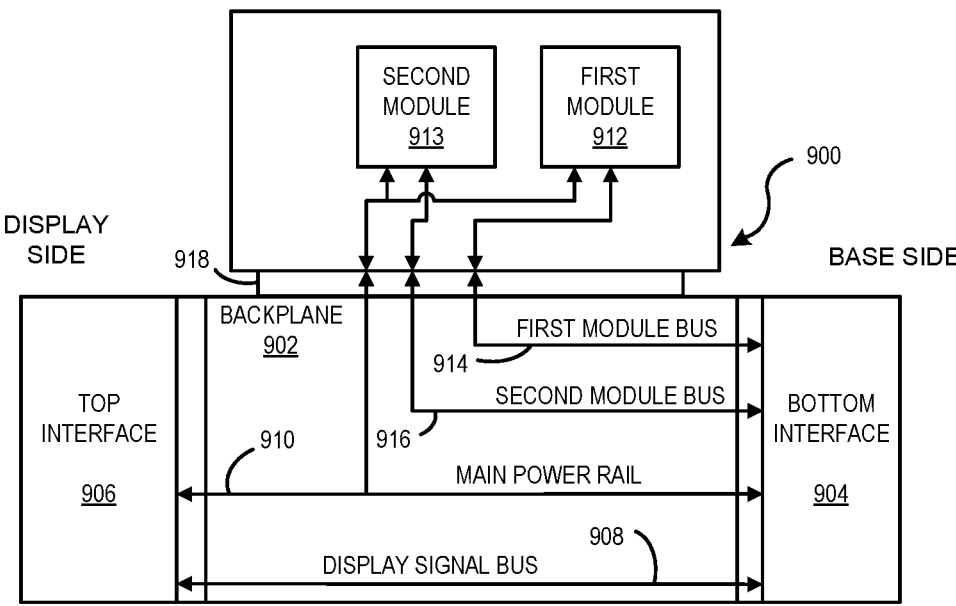
FIG. 9 illustrates an architectural diagram of a dual-occupancy solution module including a first internal module, a second internal module, and an internal backplane, according to an example of the present disclosure.

FIG. 9 illustrates an architectural diagram of a dual-occupancy ALE solution module 900 including first module 912, second module 913, and internal backplane 902, according to an example of the present disclosure. Dual-occupancy ALE solution module 900 consumes dual resources of ALE base module 106 corresponding to two modules. Dual-occupancy ALE solution module 900 includes a backplane 902 connected to top solution interface 906, bottom solution interface 904, and internal module interface 918. Top solution interface 906 connects to I/O backplane interface 746 of I/O device 102 directly. Bottom solution interface 904 connects to base module backplane interface 170 of ALE base module 106 directly. Display signal bus 908 passes display signals directly from bottom solution interface 904 to top solution interface 906 because the display signals are output from ALE base module 106 to display 103 of I/O device 102. Main power rail 910 is connected to bottom interface 904, top solution interface 906 and internal module interface 918. Main power rail 910 receives power from ALE base module directly. Likewise, main power rail 910 transmits power to I/O device 102 directly.

Dual-occupancy ALE solution module 900 includes first module 912, which communicates control and information signals through first module signal bus 914 to bottom solution interface 904, which communicates the control and information signals to ALE base module 106 directly. Second module 913 communicates control and information signals through second module signal bus 916 to bottom solution interface 904, which communicates the control and information signals to ALE base module 106 directly.

Figure 10:
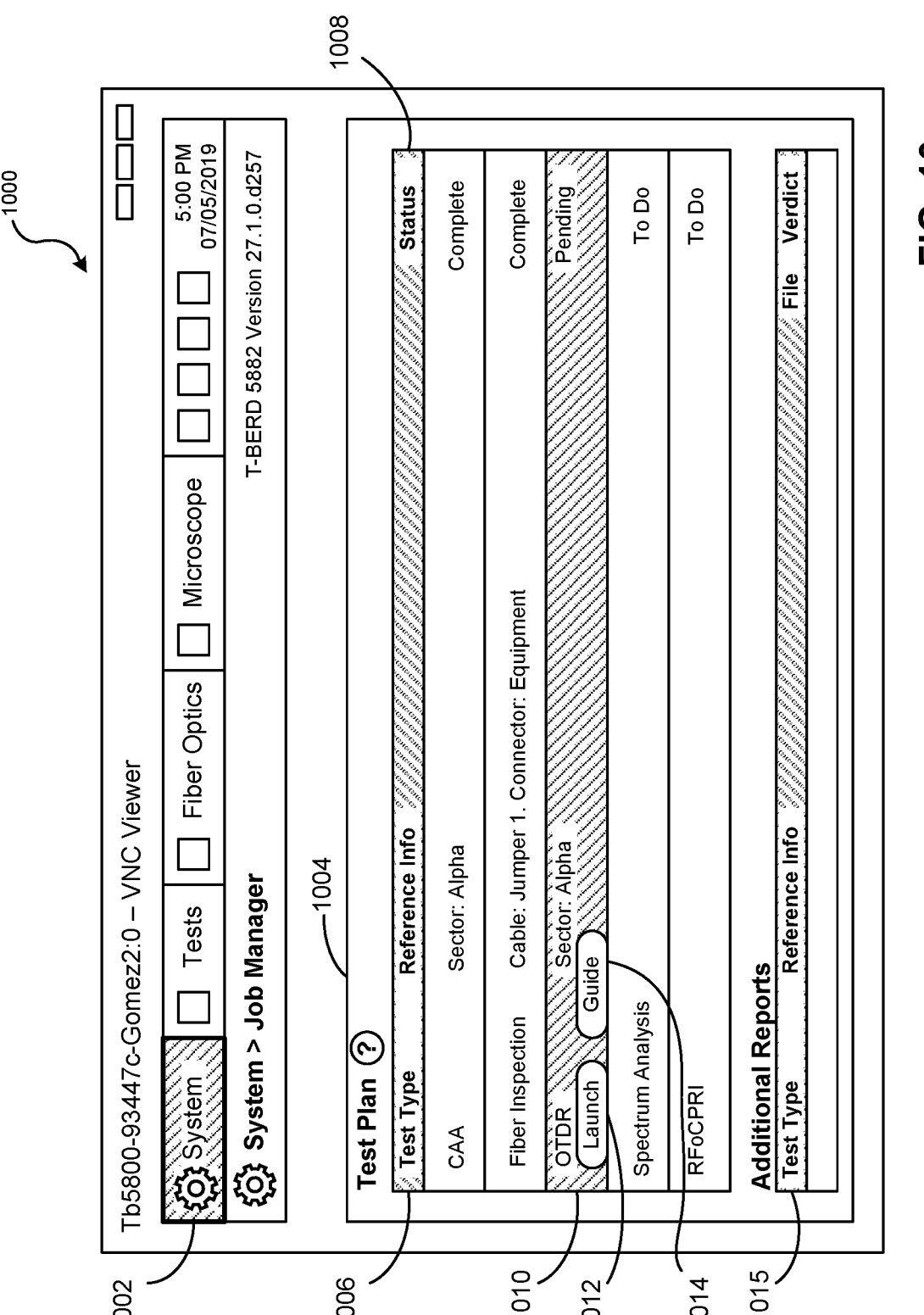
FIG. 10 illustrates a GUI of a cell site tool including a base module and I/O device, according to an example of the present disclosure.

FIG. 10 illustrates a GUI 1000 of cell site tool 100 including ALE base module 106 and I/O device 102, according to an example of the present disclosure. ALE base module 106 and I/O device 102 work together under control of software to provide GUI 1000 and thereby form an ALE Platform. According to an example, the ALE base module 106 and software may initiate GPS functionality from an external GPS module. According to another example, ALE base module 106 and software integrate GPS functionality into cell site tool 100. According to an example, ALE base module 106 and software call clock service functionality from a clock module. According to another example, the ALE base module 106 and software integrate a platform clock service into cell site tool 100. According to an example, ALE base module 106 and software support either a filesystem or ALE-Module EEPROM for retaining options. According to an example, ALE base module 106 utilizes software to control Solution Modules, Expansion Modules, internal modules, and various options.

According to an example, ALE base module 106 and software provide a Job Manager workflow. The Job Manager may provide a launch button to respond to a user input to launch tests in a predetermined sequence as specified in a job. The Job Manager may load configurations for the tests, corresponding to a job, from a job configuration file. The job configuration file may be stored in memory or another storage device. The Job Manager may allow a technician to create a consolidated report which may include individual reports for each of the automated tests that were run. According to an example, ALE base module 106 and software support a Common Data Model (CDM) for interfacing between a network server running centralized management software and the Job Manager. The CDM is a common json schema for exchanging configurations and results between the cell site tool and the server.

The GUI 1000 provides a Job Manager function in accordance with a system setting 1002. The Job Manager function may be selected by a technician by way of a user interface module, which includes I/O device 102. According to an example, after Job Manager is selected, GUI 1000 illustrates a Test Plan 1004 to be executed by the cell site tool. The Test Plan 1004 includes the tests to be performed under a Test Type heading 1006, such as CAA, Fiber Inspection, OTDR, CPRI, and Spectrum Analysis. A status indicator 1008 provides a visual indication to a technician of tests that are completed (Completed), pending (Pending), or awaiting completion (To Do). According to an example, an OTDR test is currently pending for the technician, as indicated by way of the status indication of "Pending". According to an example, tests are automatically cycled as indicated in Test Plan 1004, which is an example of a job. According to an example, after Fiber Inspection has been completed by the technician, the next test, i.e. OTDR test 1010, is automatically populated onto Test Plan 1004 of GUI 1000, and a visual indication is provided to the technician that the OTDR test 1010 is now in Pending status. According to an example, OTDR test 1010 may be initiated by the technician by selecting Launch button 1012 or Guide button 1014. Launch button 1012 immediately launches the test, whereas Guide button 1014 provides step-by-step guided instructions to thereby direct testing by the technician. According to an example, the next test to be performed, i.e. OTDR test 1010, may be automatically initiated by the cell site tool upon successful completion of the preceding test, i.e. Fiber Inspection. According to another example, guided instructions of the next test to be performed, i.e. OTDR test 1010, may be automatically presented to the technician upon successful completion of the preceding test, i.e. Fiber Inspection. According to an example, an Additional Reports indicator 1015 provides a visual indication of additional reports that may be executed according to a predetermined test plan. According to an example, the predetermined test plan may be stored as a configuration file in memory of an ALE Base Module. The results of all tests, including status and results are saved into memory of the ALE Base Module for communication with a workstation or server. According to an example, the results of all tests are automatically compiled and saved in a test results report according to a predetermined format.

Figure 11:
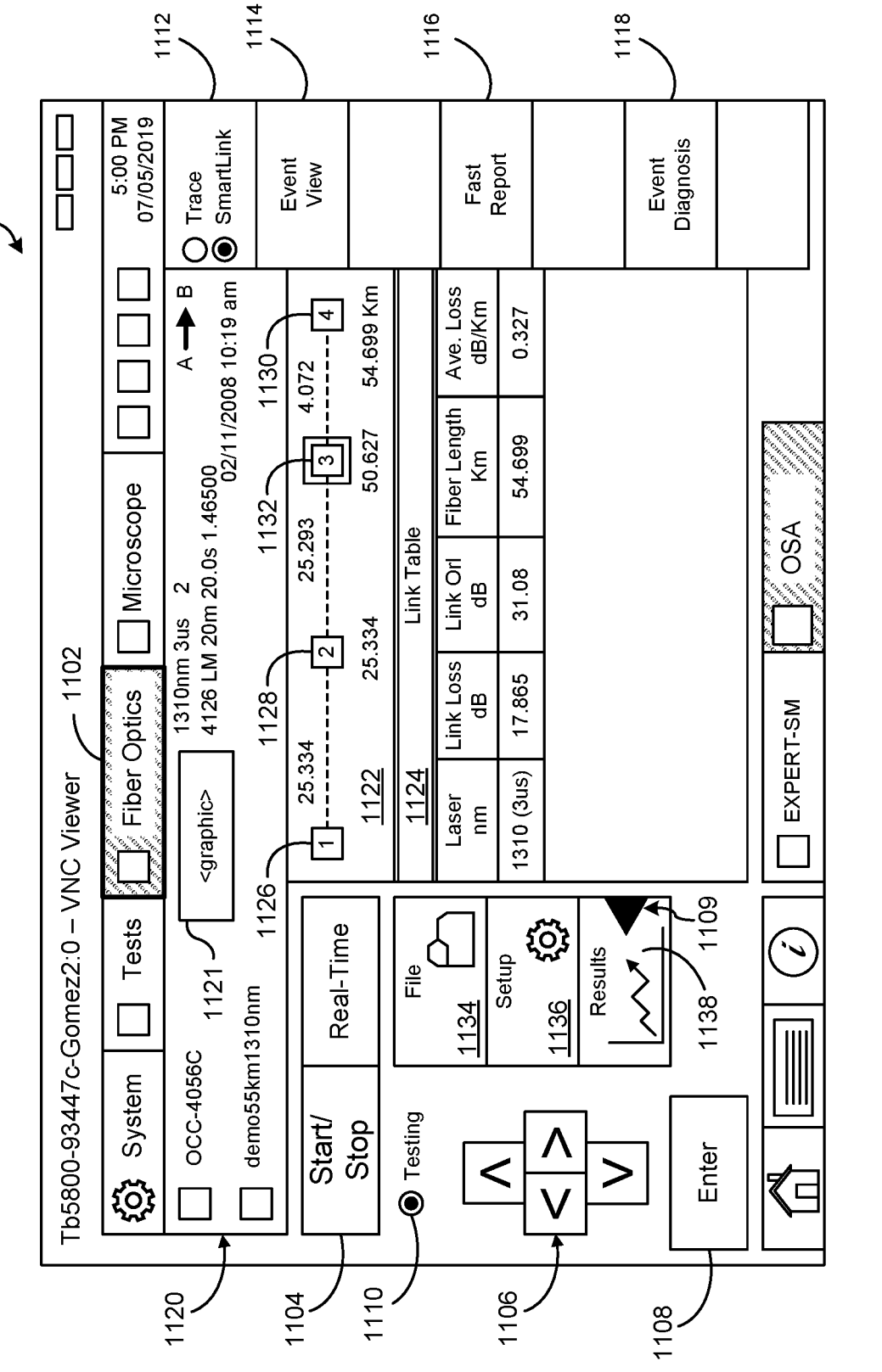
FIG. 11 illustrates a GUI generated by a base module, according to an example of the present disclosure.

FIG. 11 illustrates GUI 1100, generated by ALE base module 106, according to an example of the present disclosure. GUI 1100 provides a visual indication that Fiber Optics testing has been selected by way of Fiber Optics indicator 1102. According to an example, Fiber Optics testing may be selected by a technician by way of a user interface module, such as I/O device 102. According to another example, Fiber Optics testing may be automatically selected by the cell site tool according to a predetermined test plan. According to an example, Fiber Optics testing is an OTDR test. According to an example, a technician may manually start and stop testing by way of Start/Stop button 1104. The technician may then navigate functionality of GUI 1100 by way of navigation buttons 1106 and Enter button 1108. A Testing status indicator 1110 provides a visual indication to the technician that Testing is currently being performed.

According to an example, GUI 1100 provides different screens and/or status indicators to a technician in accordance with cell site tool status and the testing that is being performed. According to the illustrated example, GUI 1100 indicates that Fiber Optics testing is selected by way of Fiber Optics indicator 1102. GUI 1100 permits different information screens to be displayed including a File information screen by selecting File button 1134, and a Setup information screen by selecting Setup button 1136. As illustrated, the Results information screen is displayed in accordance with selection of Results button 1138. As illustrated, screen display status indicator 1109 provides a visual confirmation that the "Results" information screen is being displayed. According to an example, each screen corresponding to selection of File button 1134, Setup button 1136 or Results button 1138 provides added functionality, control, and information by the cell site tool for use by a technician. For example, the Results information screen provides a Trace/SmartLink status indicator 1112 indicating that a SmartLink test of Fiber Optics is being conducted. According to an example, a technician may select Trace testing or SmartLink testing by way of navigation buttons 1106. Likewise, a technician may: select an event view by way of Event View indicator; generate a fast report by way of Fast Report indicator 1116; and perform event diagnosis by way of Even Diagnosis indicator 1118.

By way of example, GUI 1100, in accordance with Fiber Optics testing indicated by Fiber Optics indicator 1102, includes Parameter status information indicator 1120. Parameter status information indicator 1120 may also include a graphical element 1121 to provide a visual indication to the technician about the event under test. Parameter status information indicator 1120 provides immediate information to the technician regarding the testing event currently being performed, along with date and time information which will be included in a report stored in the ALE Base Module 106.

According to the illustrated example, GUI 1100 displays Fiber Optic path indicator 1122 and Link Table 1124. According to an example, Fiber Optic path indicator 1122 may include a plurality of icons 1126, 1128, and 1130, each representing nodes along the signal path under test. By way of example, icon 1132 represents an icon corresponding to a node under test. Accordingly, a visual indication (such as highlighting, different color, or both) is provided to the technician for immediate verification of the node under test. As indicated by way of the visual example, Fiber Optic path indicator 1122 provides distance information to the technician of the fiber under test. As illustrated, 25.334 Km is the distance between nodes 1 and 2 (i.e. icons 1126 and 1128), 25.293 Km is the distance between nodes 2 and 3 (i.e. icons 1128 and 1132), and 4.072 Km is the distance between nodes 3 and 4 (i.e. icons 1132 and 1130). The total distance between nodes 1 and 2 (i.e. icons 1126 and 1128) is 25.334 Km; the total distance between nodes 1 and 3 (i.e. icons 1126 and 1132) is 50.627 Km; and the total distance between nodes 1 and 4 (i.e. icons 1126 and 1130) is 54.699 Km. Link table 1124 provides a table of over-all status information to the technician regarding the fiber under test including: Laser nm; Link Loss dB; Link ORL (Optical Return Loss) dB; Fiber Length Km; and Average Loss (Ave. Loss) dB/Km.

Figure 12:
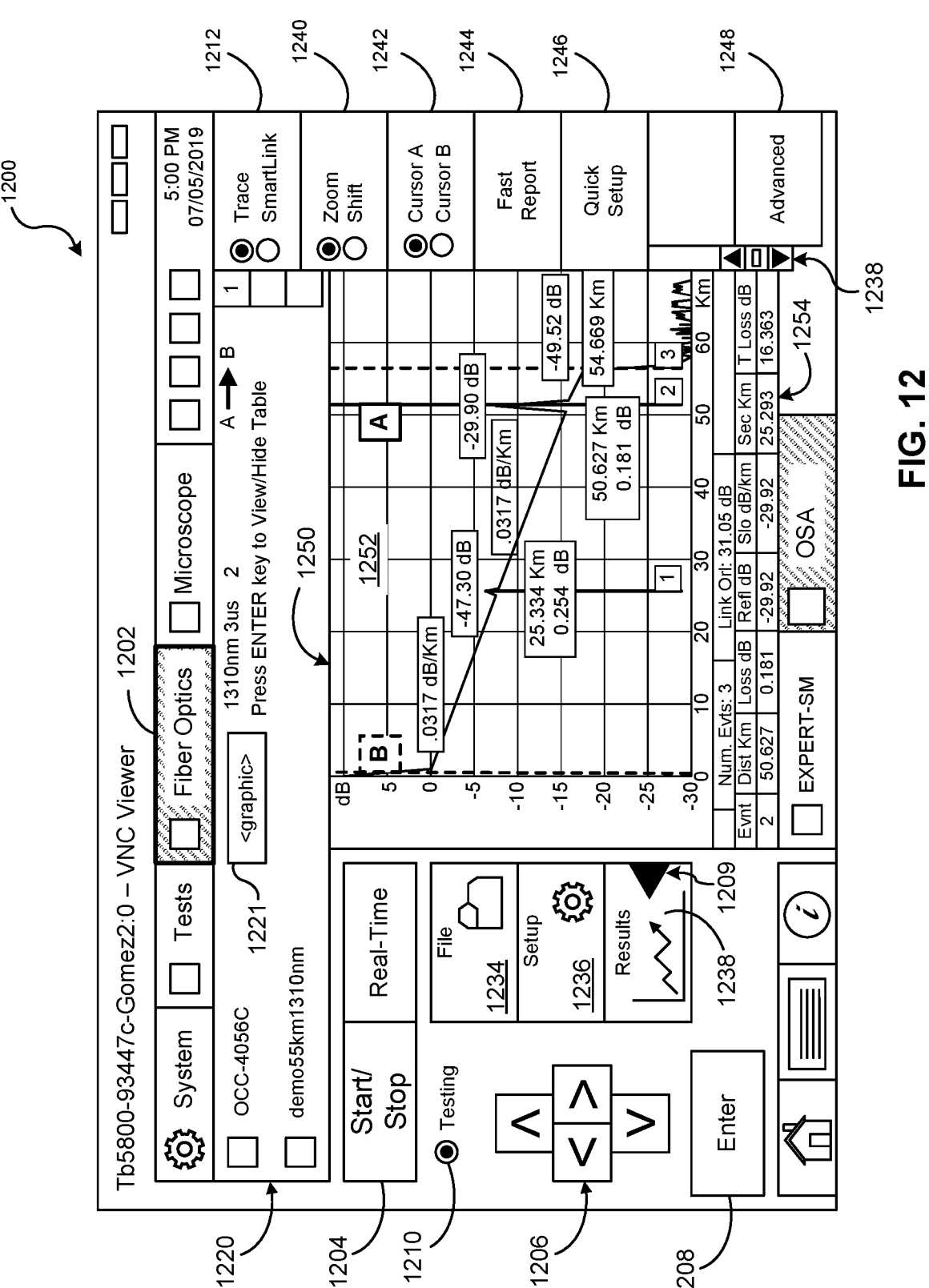
FIG. 12 illustrates a GUI of a base module, according to an example of the present disclosure.

FIG. 12 illustrates GUI 1200, generated by ALE base module 106, according to an example of the present disclosure. According to an example, GUI 1200 provides a visual indication that Fiber Optics testing has been selected by way of Fiber Optics indicator 1202. GUI 1200 presents different information screens to be displayed including a File information screen by selecting File button 1234, and a Setup information screen by selecting Setup button 1236. As illustrated, the Results Information Screen 1250 is displayed in accordance with selection of Results button 1238. As illustrated, screen display status indicator 1209 provides a visual confirmation that the Results Information Screen 1250 is being displayed. According to an example, each screen corresponding to selection of File button 1234, Setup button 1236 or Results button 1238 provides added functionality, control, and information by the cell site tool for use by a technician. Fiber Optics testing may be selected by a technician by way of a user interface module, such as I/O device 102. According to another example, Fiber Optics testing may be automatically selected by the cell site tool according to a predetermined test plan. According to an example, Fiber Optics testing is an OTDR test. According to an example, a technician may manually start and stop testing by way of Start/Stop button 1204. The technician may then navigate functionality of GUI 1200 by way of navigation buttons 1206 and Enter button 1208. A Testing status indicator 1210 provides a visual indication to the technician that Testing is currently being performed.

By way of example, GUI 1200, in accordance with Fiber Optics testing indicated by Fiber Optics indicator 1202, includes Parameter status information indicator 1220. Parameter status information indicator 1220 may also include a graphical element 1221 to provide a visual indication to the technician about the event under test. Parameter status information indicator 1220 provides immediate information to the technician regarding the testing event currently being performed, along with date and time information (which will be included in a report stored in ALE base module 106 of cell site tool 100).

According to an example, different screens and/or status indicators are displayed in accordance with cell site tool status and the testing that is being performed. According to the illustrated example for Fiber Optics testing, different screen displays may be provided including: a File screen display by selecting File button 1234, a Setup screen display by selecting Setup button 1236, and a Results screen display by selecting Results button 1238. As illustrated, screen display status indicator 1209 provides a visual indication that the "Results" screen is being displayed. According to an example, each screen display provides added functionality and control by the technician. For example, the Results screen display provides a Trace/SmartLink status indicator 1212 indicating that a Trace test of Fiber Optics is being conducted. According to an example, a technician may select Trace testing or SmartLink by way of navigation buttons 1206 and Enter button 1208. The Trace test of the Results screen display provides a Zoom/Shift status indicator 1240 indicating that a Zoom screen is being displayed. According to an example, a technician may select Cursor A or Cursor B by manipulating navigation buttons 1206 and Enter button 1208. Results of the selection are indicated by way of cursor selection indicator 1242. By way of example, a fast report may be generated by selecting Fast Report button 1244; a quick setup according to a predetermined configuration may be entered by selecting Quick Setup button 1246; and advanced settings may be configured by way of Advanced functions button 1248.

According to an example, Results Information Screen 1250 includes graphical display 1252 and trace testing table 1254. Trace testing table 1254 includes information regarding the current trace test and previous trace tests. Trace testing table 1254 may be scrolled to display previous results by manipulating table control buttons 1256. According to an example, GUI 1200 displays Results Information Screen 1250 in accordance with OTDR testing.

FIG. 13 illustrates a system diagram of Spectrum Analyzer and Common Public Radio Interface (SA/CPRI) module 1300, according to an example of the present disclosure. According to an example, SA/CPRI module 1300 provides RF Spectrum Analysis testing and CPRI testing. Examples of the RF Spectrum Analysis testing performed by SA/CPRI module 1300 may include channel power, occupied bandwidth, SEM, ACP, spurious emissions, field strength, route map, PIM detection; and dual spectrum measurements. Additional examples of the RF Spectrum Analysis testing are shown in tables 13-1, 13-2, 14-3, 14-4, and 14-5.

Examples of the CPRI testing performed by SA/CPRI module 1300 may include CPRI fronthaul installation testing which includes testing RRH links before connecting them to a BBU for service activation. Fronthaul is the fiber link between the BBU and RRH. The CPRI protocol enables the RRH and BBU to interact with each other over distances of several miles. When installing RRHs on towers, rooftops, or other remote locations, the RRH links can be tested before connecting them to the BBU for service activation. If not tested, incorrect SFPs and misconfiguration/faulty RRHs will disrupt the service, and necessitate the costly return of tower crews, delaying service introduction. The CPRI fronthaul installation testing may include a CPRI check, a BBU emulation test, and a bit error rate test. The CPRI check verifies the correct SFP is being used on the test set and confirms that the RRH is responding to the test. For this test, it is recommended that the SFP that will be used in the BBU is used to confirm that it is functioning properly. When the test establishes communication to the RRH by emulating a BBU, it confirms that the RRH has been properly installed and is responsive. The BBU emulation test establishes communication with the RRH by issuing commands to the RRH. The purpose of BBU emulation test is to confirm that the RRH has the correct SFP installed, that it has the correct firmware loaded, that fibers have not been swapped, that the RRH supports the expected sectors and frequencies. For example, a CPRI module may emulate the BBU and send a command to an SFP in the RRH to determine an ID of the SFP, the current version of firmware and fiber that it is connected to. The CPRI module may determine from the ID whether the SFP is the SFP that is supposed to be installed in the RRH, whether the firmware is current firmware, and whether the SFP is connected to the proper fiber. The CPRI module may also measure a bit error rate of the fiber link between the RRH and the BBU. The bit error rate test confirms that any active components in the fiber network, including dark fiber, are not creating CPRI frame loss that could impact service.

The CPRI testing performed by SA/CPRI module 1300 may also include RFoCPRI testing. The RFoCPRI testing verifies CPRI control signals and extracts user plane traffic or RF (IQ) data transmitted between the BBU and RRH, permitting the monitoring and analysis of interference signals on mobile devices (uplink) as well as the performance of a radio's signal (downlink).

The RF Spectrum Analysis testing and CPRI testing may be performed by a single module or multiple modules. In an example, the RF Spectrum Analysis testing and CPRI testing may be performed by the SA/CPRI module 1300, such as a single dual mode solutions module, or by multiple separate modules, each including their own processing circuit, e.g., FPGA.

According to an example, SA/CPRI module 1300 has various configurations and capabilities supporting both RF and Digital/Fiber optic testing. According to an example, SA/CPRI module 1300 is a Dual-Occupancy full-size ALE Solution Module that performs RF Spectrum Analysis as well as providing full CPRI analysis over several types of Optical Interfaces. In other words, the Dual-Occupancy full-size ALE Solution Module is a dual module, such as dual-occupancy ALE solution module 900 illustrated in FIG. 9. According to an alternate example, module 1300 is a Single-Occupancy full-size Solution Module that supports only either RF Spectrum Analyzer testing or CPRI testing. In other words, the Single-Occupancy full-size ALE Solution Module is a single module, such as Single ALE solution module 800 illustrated in FIG. 8. According to an example, SA/CPRI module 1300 in the form of a Dual-Occupancy full-size ALE Solution Module may be included in the cell site tool along with ALE base module 106, a CAA Expansion Module and an OTDR Expansion Module.

According to an example, SA/CPRI module 1300 includes RF board 1302, digital (DIG)/CPRI board 1304, cooling unit 1306, and backplane 1308 within a predefined housing. Cooling unit 1306 provides cooling to the internal circuitry of SA/CPRI module 1300, and obtains power by way of connection to backplane 1308. According to an example, RF board 1302 includes an RF block 1310 that connects to RF connector 1312. RF connector 1312 receives an external transistor-transistor logic (TTL) periodic signal for edge triggering and a high/low TTL signal for level triggering of a time gate of an RF signal.

According to an example, DIG/CPRI board 1304 includes ADC 1314, also known as an analog to digital converter, which provides communication between SA FPGA 1316, also known as a Spectrum Analyzer Field Programmable Gate Array, and RF block 1310 of RF board 1302. The SA FPGA is an example of a processing circuit that may be used in the SA/CPRI module 1300 to perform measurements and analyze test results. Other types of processing circuits may be used. ADC 1314 is an analog to digital converter to convert and communicate digital signals of SA FPGA 1316 and analog signals of RF block 1310. DIG/CPRI board 1304 and RF board 1302 are electrically connected by way of board connector 1317. Accordingly, communication between ADC 1314 and RF block 1310 passes through board connector 1317. According to an example, SA FPGA 1316 communicates with GPS SMA unit 1318 to provide GPS communication. SA FPGA 1316 also communicates with REF IN connector 1320 and REF OUT connector 1322. REF IN connector 1320 is a Bayonet Neill-Concelman (BNC) female miniature quick connect/disconnect RF connector for coaxial cable that accepts an external timebase with a frequency of 10 MHz and an amplitude of −5 to +10 dBm. REF OUT connector 1322 is a BNC female connector that provides a frequency of 10 MHz and amplitude of −10 dBm as a reference output.

According to an example of the disclosure, a spectrum analyzer falls into two basic categories, real-time and swept. A real-time spectrum analyzer is derived from that of the oscilloscope. SA FPGA 1316 instrument first gathers data in the time domain and then translates it into the frequency domain by way of a Fast Fourier Transform (FFT). The noise floor is lower than in an oscilloscope, but higher than in a swept spectrum analyzer. A real-time spectrum analyzer can capture transient and fast signals more quickly than a swept spectrum analyzer but is generally more expensive. According to an example, DIG/CPRI board 1304 may include additional platform circuits 1324 to support Spectrum Analyzer testing and Common Public Radio Interface testing.

According to an example, SA/CPRI module 1300 provides a Spectrum Analyzer Module that supports an RF Frequency Range of 9 kHz to 6 GHz and provides a Trace Update of 10 traces per second (minimum). According to an example, Trace Updates may be 15 traces per second. According to an example, Real-time Spectrum Analysis is provided at PoI of 125 us (RBW: 100 kHz), and an IF bandwidth of 40 MHz (minimum). According to an example, IF bandwidth of 100 MHz is provided. The Spectrum Analyzer Module provides an Input spurious <=−70 dBc; a Residual response <=−90 dBm; a LO Feedthrough to input <=−75 dBm; a Maximum operating power 25 dBm; a Maximum RF input power without damaging the instrument of 33 dBm; a Displayed dynamic range 100 dB (with 1 kHz RBW); a DANL: (with preamp ON) of −155 dBm/Hz; a RBW: from 10 Hz to 30 kHz; an Input level accuracy: +/−2 dB (20 to 30 degrees C.); and a Phase noise of −84 dBc/Hz (at 10 kHz). According to an example, an audible alarm is provided in the cell site tool including SA/CPRI module 1300 to indicate parameters that are out of range. According to an example, the cell site tool with a Spectrum Analyzer Module includes: a Sweep Tuned Spectrum; RF Analysis including; Channel Power, OCC BW, SEM, ACLR, Multi-ACLR; RF Analysis including: Spurious Emission, Total Harmonic Distortion, Field Strength; Gated Sweep; and a Route Map. Likewise, according to an example, the cell site tool may provide an Interference Analyzer including inter-ference analysis of: Spectrum; Spectrogram; Received Sig-nal Strength Indicator (RSSI); Interference Finder; Radar Chart; Spectrum Replayer; PIM, Detection Single Carrier; and PIM Detection Multi Carrier. According to an example, the cell site tool with a Real-time Spectrum Analyzer Module includes: Persistent Spectrum; Persistent Spectro-gram; Persistent RSSI; Persistent Interference Finder; Per-sistent Radar Chart; and a Realtime Spectrum Replayer.

According to an example, GPS SMA unit 1318 is a SubMiniature version A (SMA) coaxial RF connector with a screw-type coupling mechanism for connection to an external GPS antenna. In general, SMA connectors may have a 50Ω impedance. An SMA connector is often used for providing RF connectivity between boards, and many microwave components including filters, attenuators, mixers and oscillators, use SMA connectors. The connectors gen-erally have a threaded outer coupling interface that has a hexagonal shape, allowing it to be tightened with a spanner. SA FPGA 1316 provides a gated sweep with RF EXT TRG 1312 as a trigger source. According to an example, the trigger source may be programmable to 1 pps and 1 pulse every two seconds (pp2s). According to an example, SA FPGA 1316 provides for GPS, a 10 MHz frequency refer-ence; 1 pps for a timing reference, and Geolocation for: Data Save, Route map and IA.

According to an example, SA FPGA 1316 communicates with REF IN connector 1320 and REF OUT connector 1322 to provide spectrum analyzer testing. According to an example, an input frequency minimum limit is 9 kHz and a maximum frequency limit is 6000 MHz, with a step size of, at most, 1 Hz, and delivering an accuracy of 1 ppm. According to an example, a frequency span is from 0 Hz to 6 GHz with a resolution of 1 Hz. According to an example, SA FPGA 1316 may provide a resolution bandwidth (RBW) minimum of 1 Hz and a maximum of 3 MHz and an RBW sequence may be 1/3/10. According to an example, SA FPGA 1316 may provide a video bandwidth (VBW) mini-mum of 1 Hz and a maximum of 3 MHz with a VBW sequence of 1/3/10 based upon CA5G. According to an example, REF IN connector 1320 and SA FPGA 1316 have a reference level maximum of 100 dBm and a reference level minimum of −120 dBM, with a reference level step of 0.1 dB and a level accuracy (+10 dB from noise floor) at most +/−2 dB. According to an example, level typical accuracy (+10 dB from noise floor) up to <4 GHz is at most +/−1.25 dB. Likewise, a level typical accuracy (+10 dB from noise floor) from 4 to 6 GHz is +/−1.5 dB. According to an example, SA FPGA provides a spectrum analyzer sweep time for a 10 MHz span (1 kHz RBW/VBW) no longer than 125 ms, and a spectrum analyzer sweep time for a 10 MHz span (3 kHz RBW) no longer than 67 ms. According to an example, additional platform circuits 1324 may be provided on DIG/CPRI board 1304 to support spectrum analysis testing and CPRI testing.

According to an example, DIG/CPRI board 1304 includes CPRI FPGA 1326 in the form of a field programmable gate array to provide communication and control to support Common Public Radio Interface testing. According to an example related to CPRI only functionality, a DNI option may be provided by way of DNI unit 1328. According to an example, CPRI FPGA 1326 supports various applications running on ALE control module, such as a monitoring application and a terminate application. CPRI FPGA 1326 may support CPRI rates 1 to 10, a CPRI internal clock, and a CPRI recovered clock mode. CPRI FPGA 1326 commu-nicates with and controls SFP units 1330, 1332, and 1334 as set forth below. CPRI FPGA 1326 communicates with and controls QSFP units 1336 and 1338 as set forth below.

According to an example, CPRI FPGA 1326 provides communication and control to SFP units 1330, 1332, and 1334, which are Small Form-factor Pluggable units. SFP units 1330, 1332, and 1334 are compact, hot-pluggable transceivers used for data communication applications. According to an example, SFP units 1330, 1332, and 1334 are small metal devices that plug into a special switch slot and support communication over a fiber optic networking cable. The SFP units 1330, 1332, and 1334 can be deployed in "mix-use" environment of single-mode/multi-mode SFPs and a variety of hardware providing a flexible and customi-zable solution. According to an example, the SFP units 1330, 1332, and 1334 support 2×SFP+interfaces up to 12.2 Gbps, support CPRI protocol up to 12.2 Gbps, support CPRI protocol 24 Gbps, support eCPRI protocol 10G, and support eCPRI protocol 25GE. According to an example, SFP units 1330 and 1332 are both transmit (Tx) and receive (Rx), and SFP unit 1334 is receive (Rx) only.

According to an example, CPRI FPGA 1326 provides communication and control to QSFP unit 1336, also known as a Quad Small Form-factor Pluggable unit, and QSFP unit 1338 to support optics functionality. QSFP unit 1336 and QSFP unit 1338 may support SR-4 or LR-4 optics. QSFP unit 1336 and QSFP unit 1338 may support 2×SFP+inter-faces up to 12.2 Gbps, support CPRI protocol up to 12.2 Gbps, support CPRI protocol 24 Gbps, support eCPRI protocol 10G, and support eCPRI protocol 25GE.

According to an example, DIG/CPRI board 1304 com-municates with ALE base module 106 by way of backplane 1308. Backplane 1308 connects to DIG/CPRI board 1304 by way of internal module connector 1340. According to an example, internal module connector 1340 is a 100 pin, 0.8 mm pitch HSEC-8 Gold-Fingers connector to mate between DIG/CPRI board 1304, as a dual module, and backplane 1308. Backplane 1308 also connects to top interface 1342 and bottom interface 1346. According to an example, top interface 1342 and bottom interface 1346 are 140p 0.8 mm pitch HSEC-Gold Fingers connector interfaces rated at a minimum of 100-cycles. According to an example, indica-tions of DISPLAY SIDE and BASE SIDE are provided to orient the illustration with respect to placement of SA/CPRI module 1300 between I/O device 102 and ALE base module 106.

According to an example, the following tests set forth in Table 13-1 may be provided by the cell site tool including a Spectrum Analyzer Application/Mode utilizing SA/CPRI module 1300 of FIG. 13.

TABLE 13-1

| Example Tests by Cell Site Tool including Spectrum Analyzer Application/Mode | | |
| --- | --- | --- |
| Test # | Test Type | Test |
| 1 | Spectrum Analysis | Sweep Tuned Spectrum Measurement |
| 2 | RF Analysis | Channel Power Measurement |
| 3 | RF Analysis | Occupied Bandwidth Measurement |
| 4 | RF Analysis | Spectrum Emission Mask Measurement |
| 5 | RF Analysis | Adjacent Channel Power Measurement |

TABLE 13-1-continued

Example Tests by Cell Site Tool including
Spectrum Analyzer Application/Mode

| Test # | Test Type | Test |
|---|---|---|
| 6 | RF Analysis | Multi Adjacent Channel Power Measurement |
| 7 | RF Analysis | Spurious Emissions Measurement |
| 8 | RF Analysis | Total Harmonic Distortion Measurement |
| 9 | RF Analysis | Field Strength Measurement |
| 10 | Utility | Gated Sweep Measurement |
| 11 | Utility | Route Map Measurement |
| . . . | . . . | . . . |

According to an example, the following tests set forth in Table 13-2 may be provided by the cell site tool including an Interference Analyzer Application/Mode utilizing SA/CPRI module 1300 of FIG. 13.

TABLE 13-2

Example Tests by Cell Site Tool including
Interference Analyzer Application/Mode

| Test # | Test Type | Test |
|---|---|---|
| 1 | Spectrum Analysis | Spectrum Measurement |
| 2 | Spectrum Analysis | Spectrogram Measurement |
| 3 | Interference Analysis | RSSI Measurement |
| 4 | Interference Analysis | Interference Finder Measurement |
| 5 | Interference Analysis | Radar Chart Measurement |
| 6 | Utility | Spectrum Replayer Measurement |
| 7 | Utility | PIM Detection Single Carrier Measurement |
| 8 | Utility | PIM Detection Multi Carrier Measurement |
| . . . | . . . | . . . |

FIG. 13 illustrates a system diagram of SA/CPRI module 1300 is a Dual-Occupancy full-size ALE Solution Module that performs RF Spectrum Analysis as well as providing full CPRI analysis over several types of Optical Interfaces. However, for a Single-Occupancy full-size ALE Solution module that only performs CPRI analysis, the system diagram of FIG. 13 is modified to replace SA FPGA 1316 with another CPRI FPGA, and REF IN connector 1320 and REF OUT connector 1322 are removed. In other words, a Single-Occupancy full-size ALE Solution module that only performs CPRI analysis does not contain SA FPGA 1316.

Figure 14A:
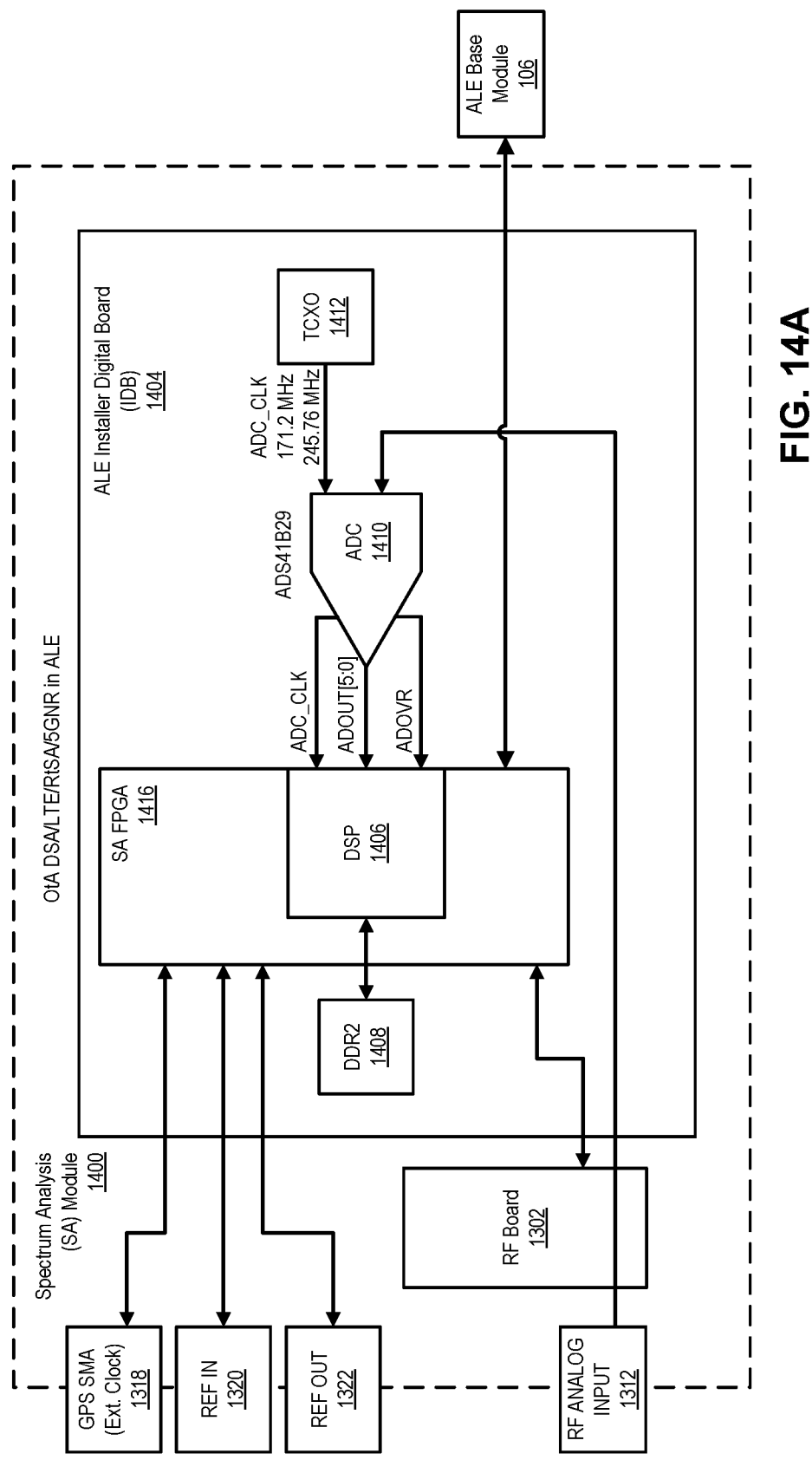
FIG. 14A illustrates a system diagram of an installer digital board (IDB) providing Over the Air (OtA) Spectrum Analysis (SA) testing, according to an example of the present disclosure.

FIG. 14A illustrates a system diagram of an ALE installer digital board (IDB) 1404 providing Over the Air (OtA) Spectrum Analysis (SA) testing, according to an example of the present disclosure. According to an example, IDB 1404 may replace DIG/CPRI BOARD 1304 in FIG. 13. When IDB 1404 replaces DIG/CPRI BOARD 1304, the combination forms OtA SA module 1400, which is a Single-Occupancy full-size ALE Solution module. OtA SA module 1400 performs Digital Services Activation testing (DSA); LTE Standard testing; Real-Time Spectrum Analysis (RtSA) testing; and 5GNR testing according to the 5GNR (New Radio) access technology as specified in the 3GPP standards. According to an example, OtA SA module 1400 may provide signal analyzer functions for 3GPP/3GPP2/ IEEE802.16-standard RF compliance testing for power and spectrum as well as modulation analysis. According to an example, OtA SA module 1400 performs standards-based measurements with a single-button push, indicating Pass/ Fail based on standards, user-defined limits, or in accordance with a predetermined test plan stored in memory of ALE base module 106. According to an example, OtA SA module 1400 provides an auto measure capability that lets a technician easily set up test scenarios with programmed measurement schedules such as start time, test duration, test cycles, and test metrics. Based on the user defined conditions, OtA SA module 1400 tests up to 10 different carriers and automatically saves the corresponding results. According to an example, OtA SA module 1400 provides OtA measurements to quickly perform base station characterization. This measurement capability is useful for testing cell sites without interrupting service and for testing of cell sites that are not easily accessible.

According to an example, the following tests set forth in Table 14-1 may be provided by the cell site tool 100 with respect to various radio technologies utilizing OtA SA module 1400 of FIG. 14A.

TABLE 14-1

Example Tests by Cell Site Tool for OtA Radio Technologies

| Test # | Test Name | Test Description |
|---|---|---|
| 1 | cdmaOne/cdma2000 | Over the Air testing of cdmaOne/ cdma2000 |
| 2 | EV-DO | Over the Air testing of EV-DO |
| 3 | GSM/GPRS/EDGE | Over the Air testing of GSM/GPRS/EDGE |
| 4 | WCDMA/HSPA+ | Over the Air testing of WCDMAZHSPA+ |
| 5 | TD-SCDMA | Over the Air testing of TD-SCDMA |
| 6 | Mobile WiMAX | Over the Air testing of Mobile WiMAX |
| 7 | LTE-FDD | Over the Air testing of LTE-FDD |
| 8 | LTE-TDD | Over the Air testing of LTE-TDD |
| 9 | 5GNR | Over the Air testing of 5GNR |
| . . . | . . . | . . . |

According to an example, OtA SA Module 1400 may provide a plurality of different types of OtA tests. Examples of the types of testing provided by OtA SA Module 1400 are set forth in Table 14-2.

TABLE 14-2

Example OtA Tests performed by a Cell Site Tool

| Test # | Test Name | Test Description |
|---|---|---|
| 1 | ID (Channel Scanner) | Measures the strongest of six received cell identifiers, providing all relevant information such as PCI, RSRP, and RSRQ. |
| 2 | Multipath profile (OtA Control Channel) | OtA Control Channel with LTE and MBMS provides signal performance metrics for locations served by the base station, including multipath profile indicating reflected signal strength. |
| 3 | Datagram | Measures, with LTE, the power level for all the resource blocks across time and shows data utilization over time. |
| 4 | Route map Measurement | Measures the OtA performance of a cell site in a defined service area by plotting the corresponding OtA metric in a map, which is then tracked with the instrument's GPS. |
| 5 | JDMapCreator | Creates a desired map of interest from a picture file for indoor coverage, or geo-coded maps for outdoor coverage that can then be loaded to the analyzer using a USB memory device |
| 6 | Beam Analyzer | Provides beam analyzer measurement. |
| 7 | Carrier Scanner | Provides carrier scanner measurement. |
| . . . | . . . | . . . |

According to an example, OtA SA Module 1400 includes IDB 1404, which supports a Spectrum Analyzer Field Programmable Gate Array (SA FPGA) 1416, to provide communication and control. SA FPGA 1402 communicates with GPS SMA unit 1318, which provides an external GPS clock to improve accuracy of TCXO clock 1412. A clock signal input from GPS SMA 1418 works with TCXO clock 1412 to provide a GPS disciplined oscillator (GPSDO). According to an example, SA FPGA 1402 includes DSP 1406, which is a digital signal processor that communicates with and responds to instructions stored in DDR2 memory 1408. DSP 1406 also responds to signals received from ADC 1410, which is an analog to digital converter. ADC 1410 receives analog signals from TCXO clock 1412 and analog signals from RF analog input 1312 in RF board 1302. ADC 1410 converts received analog signals to digital signals for processing by DSP 1406. Likewise, SA FPGA 1402 includes circuitry that communicates status and control information with the RF Board.

According to an example, the following tests set forth in Table 14-3 may be provided by the cell site tool including a 5G NR Signal Analyzer Application/Mode utilizing an OtA SA Module 1400 of FIG. 14A.

TABLE 14-3

Example Tests by Cell Site Tool including
a 5G NR Signal Analyzer Application/Mode

| Test # | Test Type | Test |
|---|---|---|
| 1 | Spectrum Analysis | Trigger Spectrum Measurement |
| 2 | RF Analysis | Channel Power Measurement |
| 3 | RF Analysis | Occupied Bandwidth Measurement |
| 4 | RF Analysis | Spectrum Emission Mask Measurement |
| 5 | RF Analysis | ACLR Measurement |
| 6 | RF Analysis | Multi ACLR Measurement |
| 7 | RF Analysis | Spurious Emissions Measurement |
| 8 | OtA Analysis | Beam Analyzer Measurement |
| 9 | OtA Analysis | Carrier Scanner Measurement |
| 10 | OtA Analysis | Route Map Measurement |
| 11 | Power vs Time | Power vs Time (Symbol) Measurement |
| 12 | Power vs Time | Power vs Time (Frame) Measurement |
| . . . | . . . | . . . |

According to an example, the following tests set forth in Table 14-4 may be provided by the cell site tool including an LTE-FDD Application/Mode utilizing an OtA SA Module 1400 of FIG. 14A.

TABLE 14-4

Example Tests by Cell Site Tool for LTE-FDD Application/Mode

| Test # | Test Type | Test |
|---|---|---|
| 1 | Spectrum Analysis | Spectrum Measurement |
| 2 | RF Analysis | Channel Power Measurement |
| 3 | RF Analysis | Occupied Bandwidth Measurement |
| 4 | RF Analysis | Spectrum Emission Mask Measurement |
| 5 | RF Analysis | ACLR Measurement |
| 6 | RF Analysis | Multi ACLR Measurement |
| 7 | RF Analysis | Spurious Emissions Measurement |
| 8 | Power vs Time | Power vs Time (Frame) Measurement |
| 9 | Power Statistics CCDF | Power Statistics CCDF Measurement |
| 10 | OtA | Channel Scanner Measurement |
| 11 | OtA | ID Scanner Measurement |
| 12 | OtA | Multipath Profile Measurement |
| 13 | OtA | Datagram Measurement |
| 14 | OtA | Route Map Measurement |
| 15 | Carrier Aggregation | Carrier Aggregation Measurement |

According to an example, the following tests set forth in Table 14-5 may be provided by the cell site tool including an LTE-TDD Application/Mode utilizing an OtA SA Module 1400 of FIG. 14A.

TABLE 14-5

Example Tests by Cell Site Tool including
an LTE-TDD Application/Mode

| Test # | Test Type | Test |
|---|---|---|
| 1 | Spectrum Analysis | Spectrum Measurement |
| 2 | RF Analysis | Channel Power Measurement |
| 3 | RF Analysis | Occupied Bandwidth Measurement |
| 4 | RF Analysis | Spectrum Emission Mask Measurement |
| 5 | RF Analysis | ACLR Measurement |
| 6 | RF Analysis | Multi ACLR Measurement |
| 7 | RF Analysis | Spurious Emissions Measurement |
| 8 | Power vs Time | Power vs Time (Slot) Measurement |
| 9 | Power vs Time | Power vs Time (Frame) Measurement |
| 10 | Power Statistics CCDF | Power Statistics CCDF Measurement |
| 11 | OtA | Channel Scanner Measurement |
| 12 | OtA | ID Scanner Measurement |
| 13 | OtA | Multipath Profile Measurement |
| 14 | OtA | Datagram Measurement |
| 15 | OtA | Route Map Measurement |
| 16 | Carrier Aggregation | Carrier Aggregation Measurement |

Figure 14B:
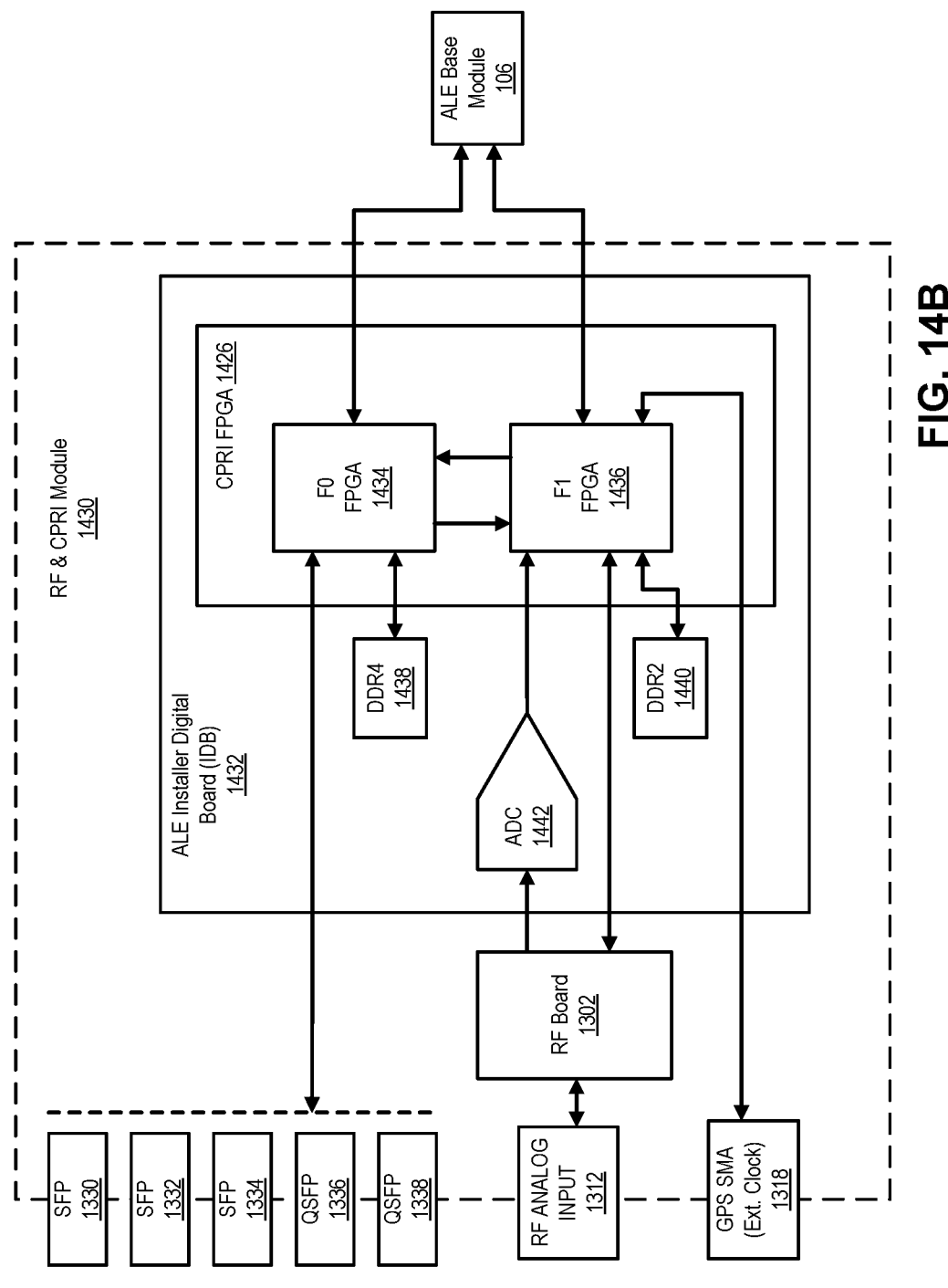
FIG. 14B illustrates a system diagram of an installer digital board (IDB) providing Common Public Radio Interface (CPRI) testing, according to an example of the present disclosure.

FIG. 14B illustrates a system diagram of an ALE installer digital board (IDB) 1432 providing Common Public Radio Interface (CPRI) testing, according to an example of the present disclosure. According to an example, IDB 1432 may replace DIG/CPRI BOARD 1304 in FIG. 13. When IDB 1432 replaces DIG/CPRI BOARD 1304, the combination forms RF & CPRI module 1430, which is a Single-Occupancy full-size ALE Solution module. RF & CPRI module 1430 performs CPRI testing.

According to an example, IDB 1432 includes CPRI FPGA 1426, which is the same as CPRI FPGA 1326 of FIG. 13. CPRI FPGA 1426 includes first CPRI FPGA 1434 and second CPRI FPGA 1436, which communicate with each other and ALE base module 106. According to an example, FPGA 1434 includes a processor that communicates with and responds to instructions stored in DDR4 memory 1438. FPGA 1436 includes a processor that communicates with and responds to instructions stored in DDR2 memory 1440. FPGA 1434 communicates with and controls SFP units 1330, 1332, and 1334 and QSFP units 1336 and 1338, as set forth above with reference to FIG. 13. FPGA 1436 communicates with GPS SMA unit 1318, which provides an external GPS clock to improve accuracy of an internal clock. A clock signal input from GPS SMA 1318 works with the internal clock to provide a GPS disciplined oscillator (GPSDO). According to an example, an analog input from RF analog input 1312 may be received by RF board 1302, converted from an analog signal into a digital signal by ADC 1442, and received by FPGA 1436.

Radio Frequency Over Common Public Radio Interface (RFoCPRI) Testing

Figure 15:
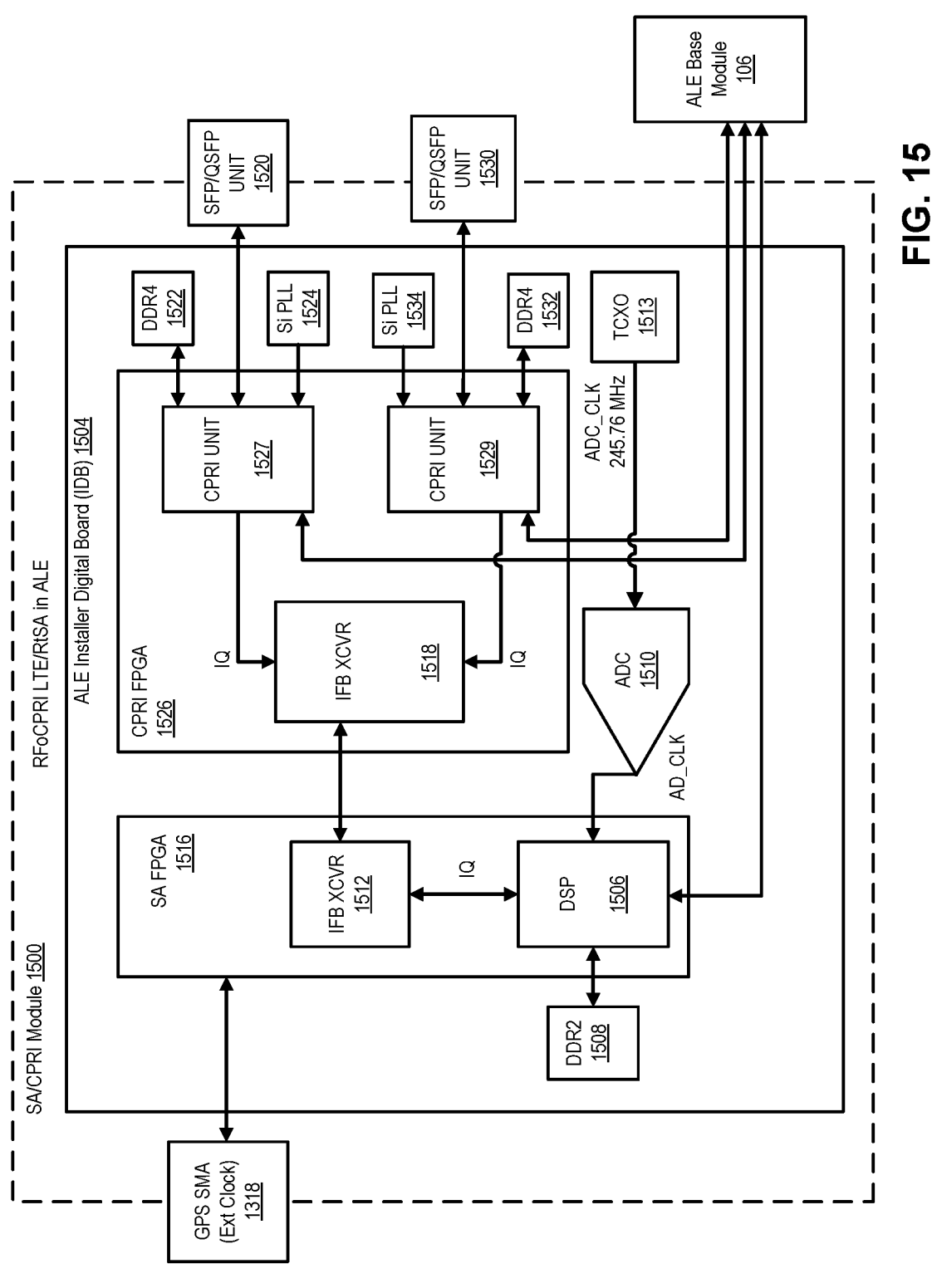
FIG. 15 illustrates a system diagram of SA/CPRI module to support Radio Frequency over Common Public Radio Interface (RFoCPRI) testing, according to an example of the present disclosure.

FIG. 15 illustrates a system diagram of SA/CPRI module 1500 to support Radio Frequency over Common Public Radio Interface (RFoCPRI) testing, according to an example of the present disclosure. According to an example, ALE installer digital board (IDB) 1504 may replace DIG/CPRI BOARD 1304 in FIG. 13. When IDB 1504 replaces DIG/CPRI BOARD 1304, the combination forms SA/CPRI module 1500, which is a Dual-Occupancy full-size ALE Solution module.

SA/CPRI module 1500 provides LTE Standard testing; Real-Time Spectrum Analysis (RtSA) testing, RFoCPRI testing, and PIM testing. RFoCPRI testing may involve the combination of emulating a BBU and simultaneously analyzing the uplink signals. This combination enables a technician to turn on an RRH RF port and observe the uplink signal for irregularities, such as presence of PIM or existence of external interferers. This application typically requires one optical interface to the RRH. Recent deployment of new services (such as Public Safety) in bands (such as band 14) in close proximity to existing services (such as PCS) has promoted operation of up to three RRHs at the same time. The tester is expected to emulate two BBU's (in downlink), and observe any unwanted PIM products at a third RRH. RFoCPRI testing may also be passive, and involves testing the uplink spectrum for presence of any unwanted signals. This test is advantageous because traditional testing has been met by observing one optical signal at one time.

According to an example, SA/CPRI module 1500 includes IDB 1504, that includes an SA FPGA 1516, also known as a Spectrum Analyzer Field Programmable Gate Array, and CPRI FPGA 1526, also known as a Common Public Radio Interface Field Programmable Gate Array, to provide communication and control thereof.

According to an example, SA FPGA 1516 includes DSP 1506, which is a digital signal processor that communicates with and responds to instructions stored in DDR2 memory unit 1508. DSP 1506 also communicates with IFB XCVR unit 1512, also known as an IFB XCVR unit or IFB transceiver unit, in support of spectrum analyzer functionality. SA FPGA 1516 communicates with GPS SMA unit 1318, which including an external clock function for GPS testing. DSP 1506 responds to signals received from ADC 1510, which is an analog to digital converter. ADC 1510 receives analog signals from TCXO clock 1513 and converts same into digital signals for processing by DSP 1506. According to an example, TXCO clock 1513 outputs a clock signal at 245.76 MHz.

According to an example, CPRI FPGA 1526 includes a first CPRI unit 1527 and a second CPRI unit 1529 that each respectively communicates IQ information with IFB XCVR unit 1518, also known as an IFB XCVR unit or IFB transceiver unit. According to an example CPRI units 1527 and 1529 are each FPGAs. According to another example, CPRI units 1527 and 1529 are each FPGAs including a processor. According to an example, first CPRI unit 1527 communicates information with SFP/QSFP unit 1520 and communicates information and instructions with DDR4 memory 1522. According to an example, SFP/QSFP unit 1520 may be one or a plurality of SFPs or QSFPs. First CPRI unit 1527 also receives information from Si PLL 1524. According to an example, second CPRI unit 1529 communicates information with SFP/QSFP unit 1530 and communicates information and instructions with DDR4 memory 1532. According to an example, SFP/QSFP unit 1530 may be one or a plurality of SFPs or QSFPs. Second CPRI unit 1529 also receives information from Si PLL 1534. SA/CPRI module 1500 provides Spectrum testing; Spectrogram testing; Spectrum Replayer testing; Persistent Spectrum testing; Persistent Spectrogram testing; Persistent Received Signal Strength Indicator (RSSI) testing; PIM Detection for Single Carrier; and PIM Detection for Multi Carrier. SA/CPRI module 1500 stores IQ data up to 15 seconds for 4 AxC (20 MHz each) and supports a refresh rate for up to four traces of 20 times/second. SA/CPRI module 1500 provides a signal bandwidth of 20 MHz (minimum). According to an alternate example, SA/CPRI module 1500 provides a signal bandwidth of 100 MHz.

According to an example, GPS SMA unit 1318 is an SMA connector for connection to an external GPS antenna. According to an example, SA FPGA 1516 provides a gated sweep in response to a trigger source. According to an example, the trigger source may be programmable to 1 pps and 1 pulse every two seconds (pp2s). According to an example, SA FPGA 1516 provides for GPS, a 10 MHz frequency reference; 1 pps for a timing reference, and Geolocation for: Data Save, Route map and IA.

According to an example, CPRI FPGA 1505 includes first CPRI unit 1514, second CPRI unit 1516, and IFB XCVR unit 1518, also known as an IFB transceiver unit. First CPRI unit 1514 communicates with SFP QSFP 1520 and DDR4 memory 1522. First CPRI unit 1514 receives communication from Si PLL 1524, also known as a phased locked loop. Si PLL 1524 generates an output signal having an associated phase that is related to the phase of an input signal from SFP QSFP 1520. Likewise, CPRI FPGA 1505 includes second CPRI unit 1516 communicates with SFP QSFP 1530 and DDR4 memory 1532. Second CPRI unit 1516 receives communication from Si PLL 1534, also known as a phased locked loop. Si PLL 1534 generates an output signal having an associated phase that is related to the phase of an input signal from SFP QSFP 1530.

According to an example, the following tests set forth in Table 15-1 may be provided by the cell site tool including an RFoCPRI Interference Analyzer Application/Mode utilizing SA/CPRI module 1500 of FIG. 15.

TABLE 15-1

Example Tests by Cell Site Tool including an RFoCPRI
Interference Analyzer Application/Mode

| Test # | Test Type | Test |
|--------|-----------|------|
| 1 | Spectrum Analysis | Spectrum Measurement |
| 2 | Spectrum Analysis | Spectrogram Measurement |
| 3 | Spectrum Analysis | Spectrum Replayer Utility (to replay a recorded spectrum trace) |
| 4 | Persistence Spectrum Analysis | Persistent Spectrum Measurement |
| 5 | Persistence Spectrum Analysis | Persistent Spectrum Replayer Utility (to replay a recorded persistent spectrum) |
| . . . | . . . | . . . |

According to an example, the following tests set forth in Table 15-2 may be provided by the cell site tool including an RFoCPRI LTE-FDD Signal Analyzer Application/Mode utilizing SA/CPRI module 1500 of FIG. 15.

TABLE 15-2

Example Tests by Cell Site Tool including an RFoCPRI
LTE-FDD Signal Analyzer Application/Mode

| Test # | Test Type | Test |
|--------|-----------|------|
| 1 | Spectrum Analysis | Channel Power Measurement |
| 2 | Spectrum Analysis | Occupied Bandwidth Measurement |
| 4 | Power vs Time | P vs T (Frame) Measurement |
| . . . | . . . | . . . |

According to an example, the following tests set forth in Table 15-3 may be provided by the cell site tool including an RFoCPRI LTE-TDD Signal Analyzer Application/Mode utilizing SA/CPRI module 1500 of FIG. 15.

TABLE 15-3

Example Tests by Cell Site Tool including an RFoCPRI
LTE-TDD Signal Analyzer Application/Mode

| Test # | Test Type | Test |
|--------|-----------|------|
| 1 | Spectrum Analysis | Channel Power Measurement |

TABLE 15-3-continued

Example Tests by Cell Site Tool including an RFoCPRI
LTE-TDD Signal Analyzer Application/Mode

| Test # | Test Type | Test |
|--------|-----------|------|
| 2 | Spectrum Analysis | Occupied Bandwidth Measurement |
| 4 | Power vs Time | P vs T (Frame) Measurement |
| . . . | . . . | . . . |

According to an example of the disclosure, the cell site tool may include predetermined settings. According to an example, one preamp may be set during operation of the cell site tool. According to an alternate example, one preamp may be set for each module to be used during operation of the cell site tool. According to an example, an Attenuation setting may be provided that allows a range of 0-30 in increments of 5 dB. According to an example, the an Auto and Couple setting behavior of the Attenuation Setting may be updated as needed to be consistent with a new Attenuation range.

Figure 16:
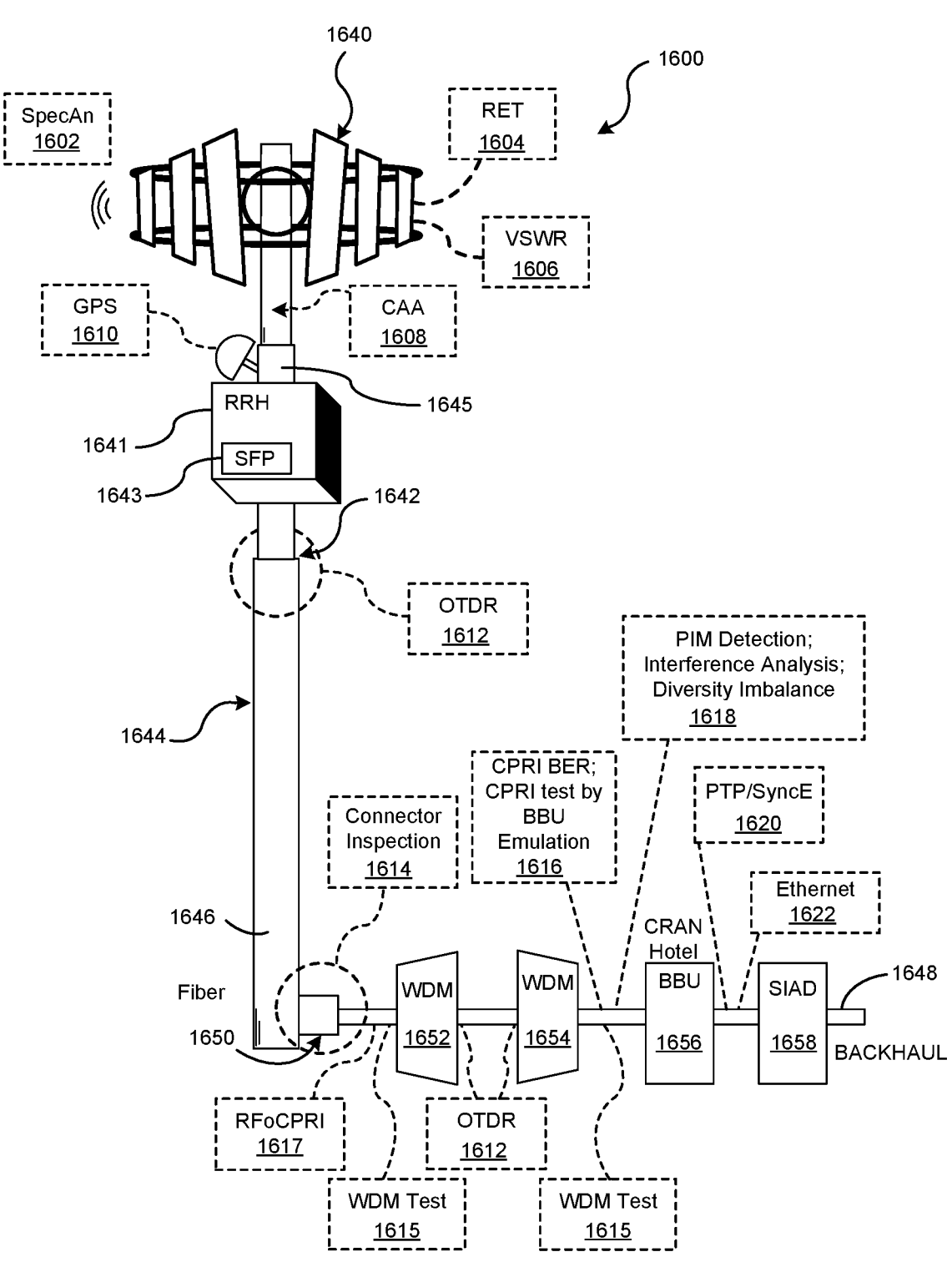
FIG. 16 illustrates a system diagram of various testing operations that may be performed with respect to a cell site by a cell site tool, according to an example of the present disclosure.

FIG. 16 illustrates a system diagram of various testing operations that may be performed with respect to a cell site 1600 by the cell site tool, according to an example of the present disclosure. Cell site 1600 includes a tower 1644 having an upper section 1645 and a lower section 1646. The upper section 1645 supports an antenna array 1640 and an RRH 1641, also known as a Remote Radio Head. The RRH 1641 includes at least one SFP 1643, also known as a Small Form-factor Pluggable transceiver. It is common for RRH 1641 to include a plurality of SFPs.

As illustrated, Spectrum Analyzer testing 1602 (also referred to as spectrum analysis testing), RET testing 1604, also known as Remote Electrical Tilt testing, and VSWR testing 1606, also known as Voltage Standing Wave Radio testing, may be performed with respect to antenna array 1640 of cell site 1600. VSWR is also a measure of how efficiently RF power is being transmitted through the transmission line and into an end-load. VSWR is an indicator of reflected signal on the entire feed line. A VSWR test indicates how well the cable and antenna system is matched. As illustrated, GPS testing 1610 and CAA testing 1608, also known as Cable Antenna Analysis testing, may be performed with respect to an upper section of cell site 1600.

As illustrated, OTDR testing 1612, also known as Optical Time-Domain Reflectometer testing, is performed with respect to an optical fiber junction, such as junction 1642, in cell site 1600. Cell site tower 1644 includes a lower section 1646 that includes optical fiber that is connected from junction 1642 to transmission line 1648. As illustrated, Connector Inspection testing 1614 may be performed with respect to junction 1650 at the base of tower 1644. As illustrated, the optical fiber signal transmission path communicates from junction 1650 to first WDM 1652, also known as a wave division multiplexor, and then to second WDM 1654. The signal then communicates through BBU 1656, also known as a Base Band Unit, and then to SIAD unit 1658, also known as a Smart Integrated Access Device. SIAD unit 1658 is an Ethernet interface device, such as that manufactured and sold by Tellabs Operations, Inc. of Naperville, Ill., used to convert the communication traffic into Ethernet 1622 traffic. In addition, SIAD unit 1658 can be connected to more than one cell site as an Ethernet interface for multiple cell sites. The signal may then communicate through transmission line 1648.

According to an example, WDM testing 1615 may be performed before or after the signal travels between WDM

1652 and WDM 1654. Likewise, CPRI BER (Bit Error Rate) testing and CPRI by BBU emulation testing 1616 may be performed between WDM 1654 and BBU 1656. RFoCPRI testing 1617 is conducted at the base of tower 1644. PIM Detection testing, Interference Analysis testing, and Diversity Imbalance testing 1618 may be performed between WDM 1654 and BBU 1656. PTP testing and SyncE testing may be generally performed at the same location. PTP is a standard for a precision clock synchronization protocol set forth in IEEE1588, and SyncE 1620, also known as Synchronous Ethernet, is a physical layer (PHY) based technology delivering frequency synchronization in packet-based, Ethernet networks. The signal then communicates through transmission line 1648, and may be generally referred to as Backhaul. Said differently, cellular mobile devices communicating with a single cell tower generally constitute a local subnetwork, while the connection between the cell tower and the rest of the world may be referred to as a backhaul link or simply backhaul. A backhaul may include wired, fiber optic and wireless components, such as microwave transmission equipment.

According to an example, the following tests set forth in Table 16-1 may be provided by the cell site tool with respect to cell site 1600 of FIG. 16.

TABLE 16-1

Example Tests by Cell Site Tool with respect to a Cell Site

| Test # | Test Type | Test |
|--------|-----------|------|
| 1 | RRH | Verify RRH is up and running (CPRI sync) |
| 2 | BBU emulation | RRH SFP correct model |
| 3 | BBU emulation | RRH Serial number (correct RRH connected to the proper BBU port) |
| 4 | BBU emulation | PIM detection |
| 5 | BBU emulation | Interference detection |
| 6 | BBU emulation | Diversity Imbalance (MIMO issues) |
| 7 | BBU emulation | VSWR (proper match of antenna and cabling) |
| 8 | BBU emulation | RET (Remote electrical tilt working properly) |
| 9 | Fiber Inspection Probe | Ensure clean fiber end surface on optical connectors |
| 10 | Optical Power Meter | Basic optical power measurement |
| 11 | OTDR | Fiber discontinuities, macro/macro bend, etc. |
| 12 | VFL | Visual Fault Location |
| 13 | Optical Meter | Optical Power Measurement |
| 14 | Optical Talk set | Perform Audio Connection (i.e. talk over the attached fiber link to another tester that has the optical talk set option in a remote location) |
| 15 | RF parameters that require Over-the-Air Measurement | Verification of Transmitted Power and Frequency/Band |
| 16 | Coaxial Cabling Measurement | Check coaxial connections (between RRH and antenna) for integrity and Identify Distance to Fault |

According to an example, the cell site tool in accordance with the disclosure may be used by cell site installers, cell technicians, cell site interference technicians, and optical interface technicians. A cell site installer typically installs, erects, maintains, repairs, removes, or retrofits towers and antenna systems (e.g. antennas, microwave dishes, feed lines, ice shields, etc.), sometimes under adverse conditions (e.g., high towers, inclement weather, remote sites, etc.) using safety equipment and hand, power, and specialty tools (e.g. the cell site tool in accordance with the disclosure). A cell technician typically is responsible for proper operation of a large group of Network Elements. Such Network Elements may require preventative and remedial maintenance, installation, optimization, building and ground upkeep, and integration of network hardware and interconnect facilities. Other responsibilities of a cell technician may include maintaining and repairing all base station equipment and transmitters; maintaining site and test equipment inventories; testing and analyzing network coverage to ensure contiguous communication and network integrity and quality; updating critical databases with site-specific information; composing clear and concise reports for system documentation; and performing audits as required by local, regional, Corporate, or Regulatory agencies.

A cell site interference technician is typically involved with interference hunting, and has a broader knowledge of RF technology. An interference technician may be charged with identifying if a cell site has an internal or external interference source and locating the source. Interference may be partially caused by factors inside an operator's cell site, which may be PIM. If an interference source is internal, the interference source should be determined and a remedy applied. If the source is external, the source and location should also be identified. This task typically involves using a spectrum analyzer with a proper antenna, and the use of spectrum analysis info to move closer to the source. The spectrum analysis signal strength can be used as a metric to find a direction to the location of the interferer. The spectrum analysis and spectrogram can also provide valuable information about the nature of the interferer, and assist a technician categorize the type of source responsible for the problem. The presence of intermittent signals sometimes makes the identification or verification of interferer difficult. This problem drives the need for a real-time spectrum analyzer that can detect short intermittent signals.

Optical interface technicians diagnose and trouble-shoot problems arising with optical interfaces. Current fronthaul networks may be characterized by exclusive use of CPRI/OBSAI technologies. Mainstream markets often use CPRI protocols up to 9.8G CPRI. With 5G, higher rate CPRI and eCPRI protocols are often present. For example, a 10.137G CPRI (Rate 8) is already available in RRH/BBU, and is expected to be turned on in volumes with initial 5G deployments. eCPRI 10GE is also expected to be deployed, initially in applications such as massive MIMO projects. Some operators are also utilizing 25GE eCPRI, and higher rates. Higher rates rely upon optical interfaces that are free from artifacts and damage.

FIG. 17 illustrates fiber scope 1700, also known as a fiber microscope, used to test fiber by the cell site tool, according to an example of the present disclosure. Fiber scope 1700 is a digital handheld optical fiber microscope that automatically inspects and certifies the end faces of fiber connectors as a device under test according to industry standards and specifications. Fiber scope 1700 in conjunction with the cell site tool 100 may provide instant Pass/Fail results at the push of image capture button 1704, thereby eliminating subjective and time-consuming guesswork by a technician. In other words, fiber scope 1700 and together with the cell site tool may: inspect and certify fiber end-face quality; ensure physical-layer performance by testing that fiber connectivity meets industry standards; provide fast, easy, and perform objective testing in accordance with a predetermined protocol.

According to an example, fiber scope 1700 includes an inspection tip 1702 to inspect an end of an optical fiber. Commonly, the inspection tip 1702 is inserted into a bulkhead corresponding to a fiber under test. Alternatively, the optical fiber may terminate in a path cord ferrule, and the inspection tip 1702 may be inserted into the path cord ferrule. An image is captured from fiber scope 1700 and transmitted to the cell site tool by operation of image capture button 1704. Fiber scope 1700 includes a focus control wheel to change focus thereof. According to an example, a real-time display of an image of the fiber under test is displayed on the cell site tool. Magnification button 1708 adjusts a level of magnification provided by fiber scope 1700. According to an example, a magnification setting of 200× and 400× is selected by operation of magnification button 1708. Fiber scope 1700 may be connected to the cell site tool by way of electrical cable 1710 and USB connector 1712. According to an example, fiber scope 1700 operates in accordance with profiles stored in the cell site tool to provide repeating analysis and reporting. Likewise, corresponding reports may be generated and stored in the cell site tool to document results. According to an example, and automated fiber inspection and Pass/Fail analysis may be performed by way of fiber scope 1700 in combination with the cell site tool.

FIGS. 18A-D illustrate various inspection tips that may be attached to a fiber microscope during fiber testing, according to an example of the present disclosure. FIG. 18A is an illustration of standard fiber scope inspection tip 1800 used in most application to check a fiber condition. According to an example, use of standard fiber scope inspection tip 1800 and the corresponding output thereof is recorded in the cell site tool. According to an example, standard fiber scope inspection tip 1800 is the same as inspection tip 1702 of FIG. 17. FIG. 18B is an illustration of long reach fiber scope inspection tip 1810, which is useful to access fiber in a bulkhead array that is surrounded by a plurality of densely packed fibers. According to an example, use of long reach fiber scope inspection tip 1810 and the corresponding output thereof is recorded in the cell site tool. FIG. 18C is an illustration of ribbon fiber scope inspection tip 1820 useful to test fiber terminating in a in a ribbon connector, such as an MTB ribbon fiber connector. MTP is an acronym for Multi-fiber Termination Push-on and is a standardized terminating end of a multi-fiber cable that may support up to 24 fiber strands per connector. The MTP fiber connector is a proprietary version of the standard MPO (Multi-Fiber Push-On) connector in respect to attenuation and reflection, yet uses the same form-factor and multiplex push-pull coupling type (SNAP). According to an example, use of ribbon fiber scope inspection tip 1820 and the corresponding output thereof is recorded in the cell site tool. FIG. 18D is an illustration of 60-degree angled fiber scope inspection tip 1830 useful to test fiber useful to access fiber in a bulkhead array that is surrounded by a plurality of densely packed fibers. According to an example, use of 60-degree angled fiber scope inspection tip 1830 and the corresponding output thereof is recorded in the cell site tool.

Figure 19A:
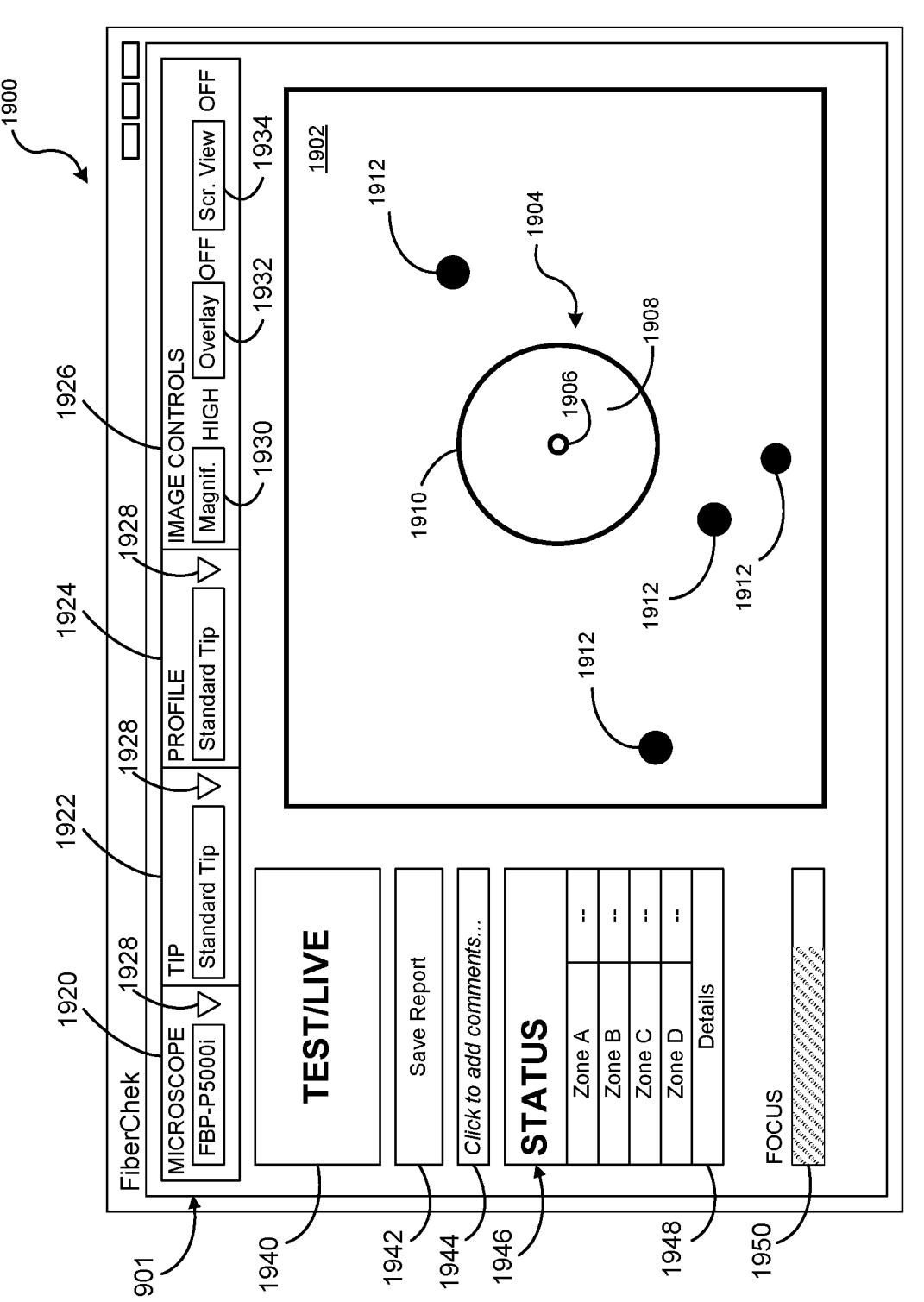
FIGS. 19A-B each illustrate a GUI corresponding to a fiber condition output by a fiber microscope and displayed on a cell site tool, according to an example of the present disclosure.

FIG. 19A illustrates GUI 1900 corresponding to a fiber condition output by fiber scope 1700 of FIG. 7 and displayed on a display of the cell site tool, according to an example of the present disclosure. GUI 1900 may be displayed on, for example, display 103 of cell site tool 100 illustrated in FIG. 1 and LCD touch screen 652 of I/O device 102 illustrated in FIG. 6. According to another example, GUI 1900 may also appear on a workstation attached to the cell site tool. GUI 1900 includes a user control and status console, hereinafter control console 1901, and a test results and status display, hereinafter test display 1902. For purposes of illustration, test display 1902 is greatly exaggerated and is monochromatically illustrated. According to an example, graphical elements appearing on control console 1901 and graphical elements appearing on test display 1902 may be colorized to improve communication of status and conditions to a technician.

According to an example, test display 1902 illustrates alive, real time image of a single-mode optical fiber under test, hereinafter fiber 1904. According to an alternate example, not shown, fiber 1904 may be a multimode fiber having a larger core. According to an illustrated example, fiber 1904 comprises three main components: a core 1906, which carries the light; a cladding 1908, which surrounds the core with a lower refractive index and also contains the light; and a coating 1910, which protects the relatively fragile fiber within. According to an example, a plurality of artifacts 1912 may appear on test display 1902. For example, every fiber break leaves some microscopic artifacts, located on the fiber break ends. Depending upon the timing of the damage, the artifacts may be found in jackets, the fiber coating and the glass. Artifacts 1912 have been exaggerated and are illustrated monochromatically. According to an example, test display 1902 may display artifacts 1912 with color to facilitate inspection. As illustrated, artifacts 1912 are not disposed within fiber 1904 but are present in an area surrounding fiber 1904.

According to an example, core 1906 is the smallest part of the optical fiber. According to an example, core 1906 is made of glass, although core 1906 may also be made of plastic. The glass used in core 1906 is extremely pure silicon dioxide (SiO2), such that viewing same for over five miles would appear as clear as a household window. In the manufacturing process, dopants such as germania, phosphorous pentoxide, or alumina are used to raise the refractive index of core 1906 under controlled conditions. According to an example, optical fiber cores are manufactured in different diameters for different applications. Typical glass cores range from as small as 3.7 um up to 200 um. Core sizes commonly used in telecommunications, such as core 1906 are 9 um, 50 um and 62.5 um. Plastic optical fiber cores can be much larger than glass. A popular plastic core size is 980 um.

According to an example, cladding 1908 surrounds core 1906 and provides a lower refractive index such that the light will be refracted away from the normal, i.e. towards core 1906. When glass cladding is used, the cladding and the core may be manufactured together from the same silicon dioxide-based material in a permanently fused state. The manufacturing process may add different amounts of dopants to the core and the cladding to maintain a difference in refractive indexes of about 1%. According to an example, core 1906 may have a refractive index of 1.49 at 1300 nm while cladding 1908 may have a refractive index of 1.47. These numbers are wavelength dependent such that core 1906 may have a different refractive index at a different wavelength. Commonly used diameters for cladding 1908 are 125 um and 140 um. The 125 um cladding typically supports core sizes of 9 um, 50 um, 62.5 um and 85 um. The 140 um cladding typically has a 100 um core.

According to an example, coating 1910 is a protective layer of optical fiber 1904. Coating 1910 absorbs shocks, nicks, scrapes, and moisture that could damage the cladding. Without coating 1910, optical fiber 1904 may be fragile such that a single microscopic nick in cladding 1908 could cause optical fiber 1904 to break or reduce transmission performance. In general, coating 1910 is protective and may not contribute to the light-carrying ability of optical fiber 1904. An outside diameter of coating 19610 may be typically 250 um or 500 um. In general, coating 1910 may be colorless. However, in some applications, coating 1910 is colored to identify individual optical fibers in a group. Due to the fragile nature of fiber 1904, initial and periodic testing of optical fiber 1904 is important to ensure reliable operation.

According to an example, control console 1901 displays conditions associated with testing by the cell site tool. The cell site tool itself records conditions displayed on control console 1901 for later report generation. According to an example, control console 1901 displays various indications and use parameters such as microscope indicator 1920, inspection tip indicator 1922, profile indicator 1924, and image control indicator 1926. The indications and use parameters may be auto-detected by the cell site tool and automatically populated or may be selected by a technician. According to the illustrated example, microscope indicator 1920 indicates microscope FBP-P5000i, inspection tip indicator 1922 indicates a standard tip, and profile indicator 1924 indicates use of the cell site tool profile associated with a standard tip. Each of these indicators may be selected and/or over-ridden by a technician according to drop down selection buttons 1928. According to an example, image control indicator 1926 displays magnification indicator 1930 indicating that a HIGH magnification is selected, overlay indicator 1932 indicating that an overlay on test display 1902 is OFF, and a scratch view indicator 1934 indicating that a scratch view on test display 1902 is OFF.

According to an example, control console 1901 also displays control and status indicators associated with testing by the cell site tool. TEST/LIVE button 1940 controls the cell site tool to perform a test or live view of an optical fiber. Save Report button 1942 controls the cell site tool to save a report associated with the fiber under test. Comment field 1944 is an active field that permits a technician to save comments associated with the fiber under test. Status indicator 1946 provides status information corresponding to Zone A, Zone B, Zone C, and Zone D associated with a fiber under test. Status details button 1948 provides additional details particularly associated with Zone A, Zone B, Zone C, and Zone D. For example, if status indicator 1946 indicates a FAIL condition associated with Zone C, then Zone C may be selected by a technician and status detail button 1948 may be pressed to view information associated with selected Zone C. Focus indicator 1950 displays a level of focus associated with a microscope used during an optical fiber test. According to an example, focus control wheel 1706 of fiber scope 1700 of FIG. 17 may be operated to control focus of fiber scope 1700 with the level of focus being presented by way of focus indicator 1950.

Figure 19B:
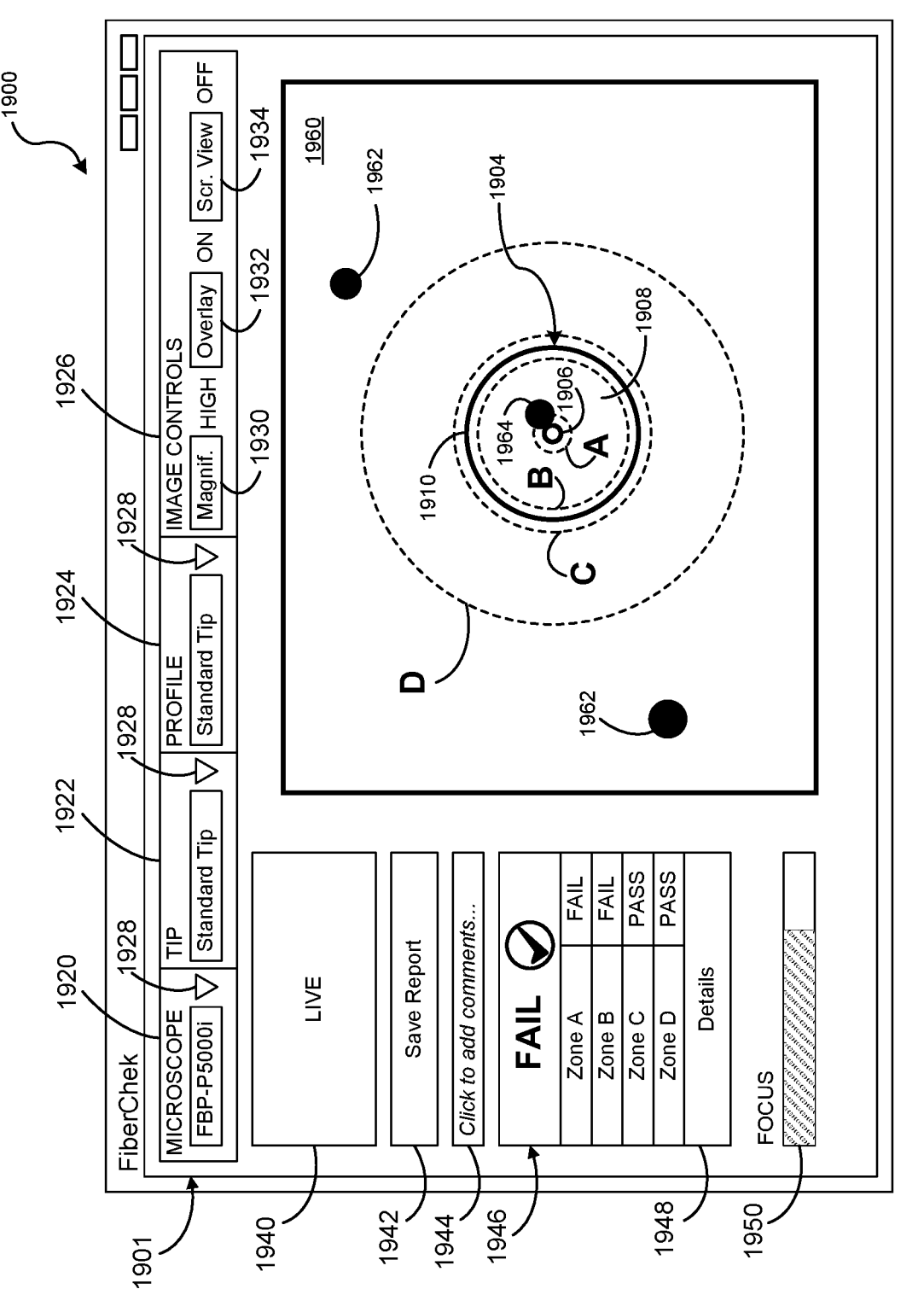

FIG. 19B illustrates the GUI 1900 of FIG. 19A with a different test display, namely test display 1960, wherein like numbers in FIGS. 19A and 19B refer to like elements. According to an illustrated example, test display 1960 includes a graphical overlay indicating different zones of a fiber under test, namely Zone A, Zone B, Zone C and Zone D. Zone A is a graphical overlay indicating and surrounding a core zone A. Zone B is a graphical overlay indicating and surrounding a cladding zone B. Zone C is a graphical overlay indicating and surrounding an adhesive/epoxy zone C. Zone D is a graphical overlay indicating and surrounding a contact/ferrule zone D. According to an alternate example, not shown, a multimode fiber has a larger core such that the graphical overlay of Zone A is larger to indicate and surround the larger multimode core. According to an example, Zone A, Zone B, Zone C and Zone D have been illustrated monochromatically with dashed lines to distinguish from fiber 1904. According to an example, Zone A, Zone B, Zone C and Zone D may be displayed with color to facilitate inspection.

According to an illustrated example of FIG. 19B, a plurality of artifacts 1962 may appear on test display 1960. Artifacts 1962 have been exaggerated and are illustrated monochromatically. According to an example, test display 1960 may display artifacts 1962 with color to facilitate inspection. As illustrated, artifacts 1962 are not disposed within fiber 1904 but are present in an area surrounding fiber 1904. By way of example, artifact 1964 is present within Zone A and Zone B. Artifacts 1964 is exaggerated and illustrated monochromatically. According to an example, test display 1960 may display artifacts 1964 with color to facilitate inspection. Accordingly, status indicator 1946 indicates a FAIL condition related to Zone A and Zone B. According to an example, GUI 1900 provides displayed conditions and artifacts corresponding to each zone of each fiber under test, and saves a report in response to action of Save Report button 1942. According to an example, the cell site tool including GUI 1900 and connected to a corresponding fiber microscope automatically detects connection of the fiber microscope to a fiber under test, automatically initiates testing of Zones A, B, C and D of the fiber under test in accordance with a predetermined protocol, automatically detects PASS/FAIL conditions associated with each of Zones A, B, C and D, and automatically stores the PASS/FAIL conditions and operating conditions in a report.

Figure 20:
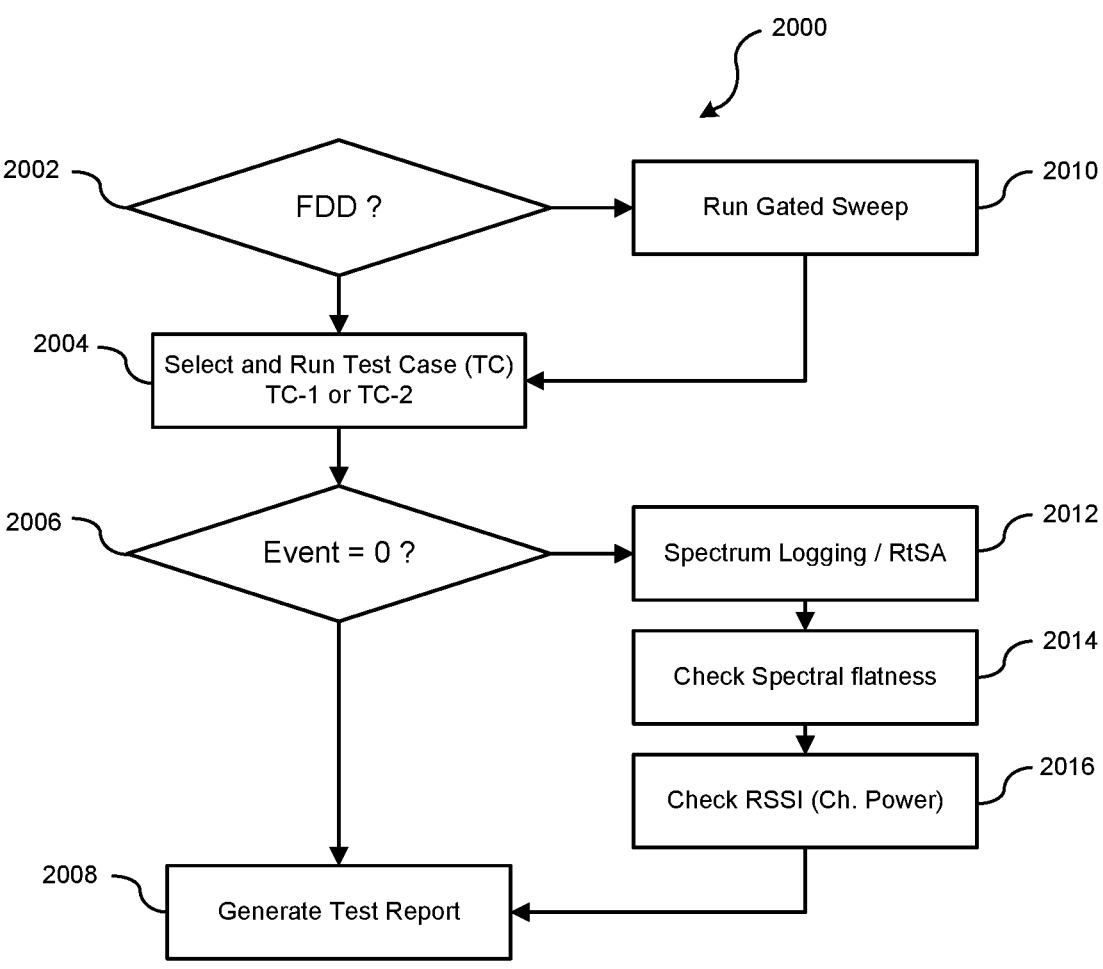
FIG. 20 illustrates an automated Interference Identification Workflow for RF Spectrum testing, according to an example of the present disclosure.

FIG. 20 illustrates an automated interference identification workflow 2000 for RF spectrum testing, according to an example of the present disclosure. This workflow and other workflows described below can be performed by the cell site tool 100. RF interference (RFI) can be defined as the effect of unwanted energy due to one or a combination of emissions, radiations, conductions, or inductions upon reception in a radio communication system. The physical layer of 5G New Radio (NR) uses orthogonal frequency division multiplexing (OFDM); however, the duplexing options supported in NR include frequency division duplex (FDD), time division duplex (TDD) with semi-statically configured uplink/downlink (UL/DL) configuration, and dynamic TDD.

FDD allows uplink and downlink transmission at the same time, but over different frequency bands. The bands are typically separated by a large margin to avoid leakage. FDD creates a channel that is always available and thus does not incur any delay. On the downside, the frequency bands are usually fixed by regulators, thus making FDD inflexible when uplink or downlink traffic requirements change. In addition, the nodes must be equipped with dedicated filters, which may be costly.

TDD allows uplink and downlink to use the entire frequency spectrum, but in different time slots. In TDD, time is divided up into short slots and some are designated for uplink while others are designated for downlink. This approach enables asymmetric traffic and time-varying uplink and downlink demands. In addition, channel state information estimated in the uplink can be used in the downlink, under an assumption of channel reciprocity. The main drawbacks of TDD are latency (as information can only be sent when a channel becomes available) and the need for uplink synchronization (to account for differences in propagation time).

In the TDD scheme, both DL and UL use the same frequency but are allocated different time slots for transmission and reception. In that scenario, identifying an interference signal is difficult when the base station is transmitting the signal in the DL. To overcome this challenge, a gated sweep functionality that only measures the signals during the UL transmission period is used. In other words, gated sweep is used to isolate interfering signals in the UL.

According to an example, the cell site tool 100 may execute job manager software which can present users with jobs, such as via a GUI on display 103. In an example, the jobs may have been created remotely and downloaded to the cell site tool 100. A user may select a job, and tests in the job are executed. The tests may be executed, such as responsive to a user launching the job via a selection on the GUI. In an example, a user, such as a field technician, may select a job, and the cell site tool 100 runs the tests in the job. Executing the tests may include displaying step-by-step instructions via display 103 of the cell site tool 100 for performing one or more of the tests for the selected job.

According to an example, the cell site tool 100 generates a GUI that displays stored jobs, and a user, such as a technician, selects a job to test for RFI in RF signals transmitted between a transmitter and receiver of a cell site. For example, the technician may be testing for interference in RF signals transmitted between RRH 1641 and BBU 1656 shown in FIG. 16. This may include testing for RFI in a channel comprised of a predetermined frequency band in the DL and/or UL between RRH 1641 and BBU 1656. In an example, RFI may be tested using RFoCPRI and the testing may include testing for the presence of PIM. The RRH 1641 may be located at the top of the cell tower, and if RFoCPRI is used, the cell site test tool 100 is connected to a fiber access point at the bottom of the cell tower to test for RFI.

At 2002, a determination is made whether communication of RF signals between the transmitter and receiver of the cell site uses FDD. In an example, a technician may enter whether FDD is used via the I/O device 102 of the cell site tool 100. If FDD is not used, then it is assumed that TDD is used.

At 2010, if FDD is not used, the cell site tool 100 automatically performs a gated sweep of an input RF signal, such as an RF signal transmitted on a communication link between the RRH 1641 and BBU 1656 shown in FIG. 16. The gated sweep of the input RF signal isolates a UL portion of the input RF signal to test the UL.

At 2004, a test, also referred to as a test case (TC), is automatically performed on the input RF signal received at the cell site tool 100. The test may be, for example, TC-1 for an RFoCPRI test (described with respect to FIG. 22) and/or TC-2 for a PIM test (described with respect to FIG. 23). The test may be selected or automatically executed. According to an example, to perform the test, the cell site tool 100 generates a CPRI signal to emulate BBU 1656, outputs the CPRI signal through SFP unit 1330 shown in FIG. 13, which is then received over fiber by the RRH 1641 to turn on the RRH 1641. The RRH 1641 then outputs a response CPRI signal, which is connected over fiber to SPF 1332 of cell site tool 100. The response CPRI signal is received by cell site tool 100, which is the input RF signal.

At 2006, the input RF signal is analyzed to determine whether an interference signal event is present. An interference signal event is the detection of RFI in the input RF signal, e.g., the detection of PIM in the input RF signal or the detection of interference of an RF signal received via an antenna of the cell site tool 100 through spectrum analysis. The interference signal event, if present, is designated as Event=0. If an interference signal event is not present in the input RF signal, no additional testing is required and a test report is generated at 2008, which may include measurements performed for TC-1 or TC-2.

At 2012, for an interference signal event Event=0 identified at 2006, Spectrum Logging/Real-time Spectrum Analysis (RtSA) is executed. For Spectrum Logging, the spectrum associated with the interference signal event is logged in cell site tool 100. For RtSA, the cell site tool gathers data from the input RF signal in the time domain and then translates the data into the frequency domain by FFT to create an RtSA associated with the interference signal event. The RtSA is then logged in cell site tool 100 and may be also displayed on the display 103 of the cell site tool 100. The RtSA may include continuously capturing input RF signals and displaying metrics associated with the input RF signals, such as frequency, power, etc. Also, detection of interference events may be indicated in the display.

At 2014, spectral flatness of the logged spectrum associated with the interference signal event is automatically determined for the interference signal event. The spectral flatness, also called Wiener entropy, is defined as the ratio of the geometric mean (gmean) of a spectrum to its arithmetic mean (mean). Hence, if spectrum=abs (FFT(signal)), then spectral flatness is calculated as follows.

$$\text{spectral flatness=gmean(spectrum}^2\text{)/mean(spectrum}^2\text{)}$$

At 2016, a channel associated with the interference signal event is determined. A determination is also made for a received signal strength indicator (RSSI) for the determined channel. RSSI indicates the power level being received after any possible loss at the antenna and physical cable level.

At 2008, a test report is generated. The test report includes identification of the first test, the determination if the FDD was present, the logged spectrum, the RtSA, the spectral flatness, the channel power, and the RSSI. In 2006, if an Event ≠0, that is if no interference signal event is present, then a test report is automatically generated in 2008 to record that no interference signal event was present.

The report and the RtSA can be used by a technician to identify the source and location of the interference. The RSSI can be used as a metric to find the direction to the location of interferer. The spectrum analysis and a spectrogram can also provide valuable information about the nature of the interference, and help the technician categorize the type of source responsible for the problem.

Figure 21:
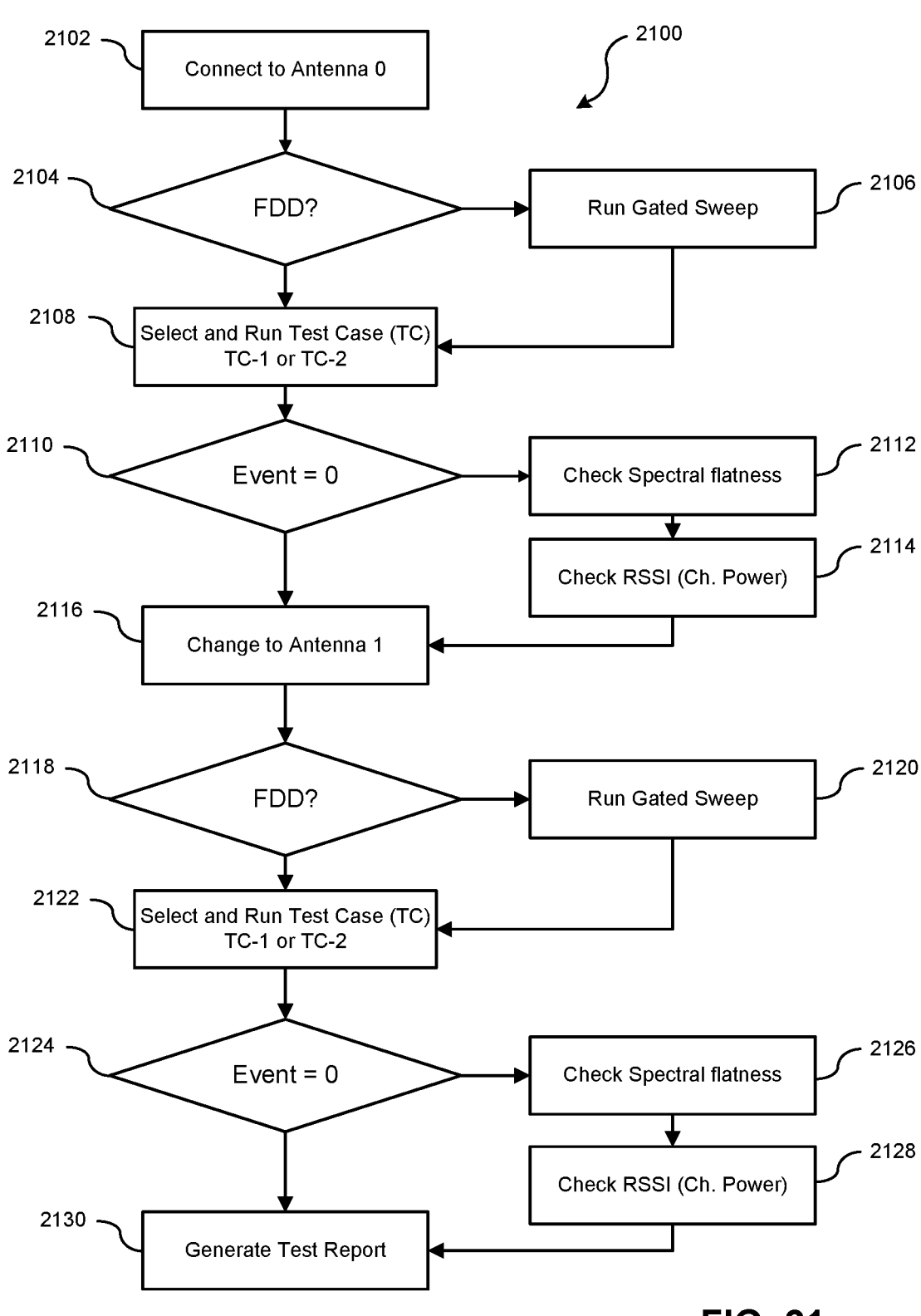
FIG. 21 illustrates an automated workflow to check Antenna Imbalance for an RF Spectrum, according to an example of the present disclosure.

FIG. 21 illustrates an automated workflow 2100 to check antenna imbalance, according to an example of the present disclosure. The cell site tool 100 can measure power differences or imbalance from each transmitting antenna (MIMO imbalances) to ensure adequate coverage through diversity and sufficient capacity through spatial multiplexing. LTE with MIMO significantly enhances coverage (diversity) and capacity (spatial multiplexing) but its operation relies on transmitting power balanced from multiple antennas; otherwise, mobile users cannot acquire the data of multiple transmitters, eliminated the benefits that MIMO brings. The cell site tool 100 can measure power of RF signals received from different antennas, such as different antennas from antenna array 1640 shown in FIG. 16, to detect antenna imbalances. In a side-by-side display, the cell site tool 100 can display a spectrogram of the RF signals received from each antenna and the power of the received RF signals. This side-by-side display enables a technician to quickly identify imbalances between two antennas.

At 2102, the cell site tool 100 connects to a first antenna (Antenna 0) of the antenna array 1640 to receive RF signals from antenna 0.

At 2104, a determination is made whether the RF signals use FDD is present in the first RF signal by a technician, and this information is input into the I/O device 102 of cell site tool 100. If FDD is not present in the first antenna (Antenna 0), then TDD is present.

At 2106, if FDD is not present, cell site tool 100 automatically performs a gated sweep of the first input RF signal when performing the first test at 2108. The gated sweep isolates an uplink (UL) portion of the first input RF signal as the first input RF signal.

At 2108, the first test directed to the first antenna (Antenna 0) is selected by the technician. The first test, also known as a test case (TC), is automatically performed by receiving a first input RF signal from the first antenna. The first test may be, for example, TC-1 for a RFoCPRI test or TC-2 for a PIM test. According to an example, to perform the selected first test, cell site tool 100 generates a CPRI signal to emulate a BBU, outputs the CPRI signal through SFP 1330, which is then received over fiber by the RRH to turn the RRH on. The RRH then outputs a response CPRI signal, which is connected over fiber to SPF 1332 of cell site tool 100. The response CPRI signal is then converted into the first input RF signal by cell site tool 100 corresponding to operation of the RRH.

At 2110, the input first RF signal is analyzed to identify the presence of a first interference signal event. The first interference signal event, if present, is designated as Event=0. If the first interference signal event is not present in the first input RF signal, no additional testing is required and the DUT is changed to antenna 1 at 2116.

At 2112, for a first interference signal event Event=0 identified at 2110, a first spectrum associated with the first interference signal event is logged, and a first spectral flatness of the first spectrum is automatically determined.

At 2114, a first channel power of a first channel associated with the first interference signal event is determined. At 2114, a determination is also made for a first received signal strength indicator (RSSI) for the determined first channel power.

At 2116, a connection of the cell site tool 100 is made to the second antenna (Antenna 1) by the technician to receive a second input RF signal.

At 2118, a determination is made whether FDD is present in the second RF signal by the technician, and this information is input into the I/O device 102 of cell site tool 100. If FDD is not present in the second antenna (Antenna 1), then TDD is present.

At 2120, if FDD is not present, cell site tool 100 automatically performs a gated sweep of the second input RF signal when performing the selected second test at 2122. The gated sweep isolates an uplink (UL) portion of the second input RF signal as the second input RF signal.

At 2122, the second test directed to the second antenna (Antenna 1) is selected by the technician. The second test, also known as a test case (TC), is automatically performed by receiving the second input second RF signal from the second antenna. The second test may be, for example, TC-1 for a RFoCPRI test or TC-2 for a PIM test. According to an example, to perform the selected second test, cell site tool 100 generates a CPRI signal to emulate a BBU, outputs the CPRI signal through SFP unit 1330, which is then received over fiber by the RRH to turn the RRH on. The RRH then outputs a response CPRI signal, which is connected over fiber to SPF 1332 of cell site tool 100. The response CPRI signal is then converted into an input RF signal by cell site tool 100 corresponding to operation of the RRH.

At 2124, a second interference signal event is identified, if present, and designated as Event=0. However, if an Event ≠0, indicating that a second interference signal is not present, operation proceeds directly to 2130 and a test report is generated.

At 2126, if Event=0, a second spectrum associated with the second interference signal event is logged, and a second spectral flatness of the second spectrum is automatically determined.

At 2128, a second channel power of a second channel associated with the second interference signal event is automatically determined. At 2128, a determination is also made for a second RSSI for the determined channel power.

At 2130, a test report is automatically generated including, identification of the first and second test, the determination whether FDD was present for the first and second test, the first and second spectrum if present, first and second spectral flatness if present, first and second channel power if present, and first and second RSSI if present.

Figure 22:
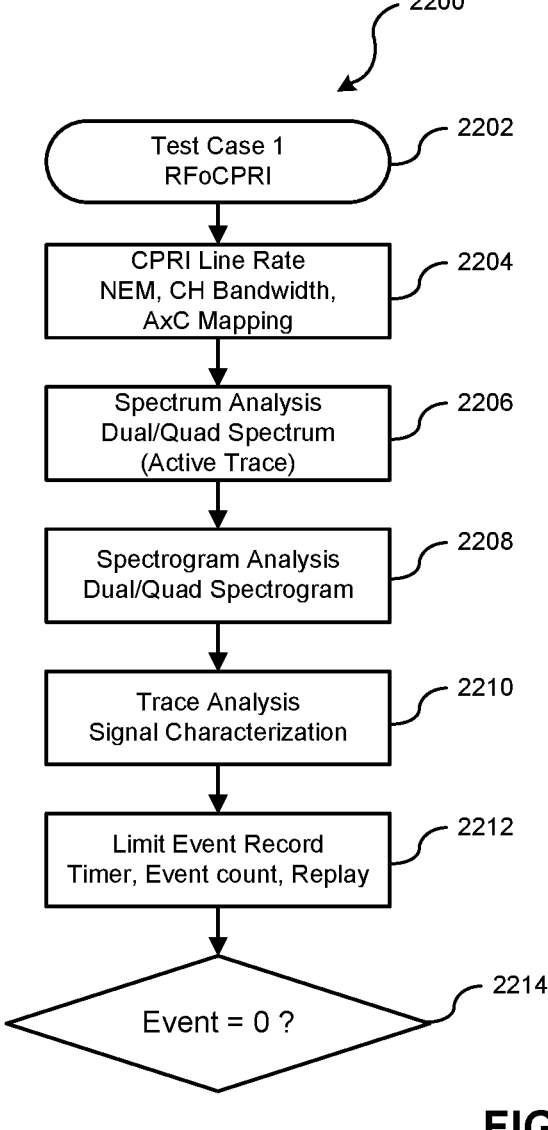
FIG. 22 illustrates test case 1 (TC-1) of an automated Interference Identification Workflow for Radio Frequency over RFoCPRI testing, according to an example of the present disclosure.

FIG. 22 illustrates test case 1 (TC-1) of an automated Interference Identification Workflow 2200 for identifying interference using RFoCPRI, according to an example of the present disclosure. TC-1 may be executed at 2004 of FIG. 20.

CPRI is a popular standard to transport baseband I/Q data to a radio unit in a base station. CPRI transports I/Q data (quadrature signals) of a particular antenna and in particular carrier in units, known as an Antenna-Carrier units (AxC units). CPRI allows a flexible I/Q data interface for various wireless standards such as GSM, WCDMA, LTE, 5G, etc. CPRI uses one physical connection for user data, management and control signaling and synchronization. Example CPRI line rates and transport capacity are set forth in in Table 22-1.

TABLE 22-1

| Example CPRI line rates and transport capacity | | | | | |
|---|---|---|---|---|---|
| CPRI Line Rate | Line Bit Rate Gbps | Line Coding | Bits per word | Transport capacity (WCDMA AxC) | Transport capacity (20 MHz LTE AxC |
| Rate 1 | 0.6144 | 8B/10B | 8 | 4 | — |
| Rate 2 | 1.2288 | 8B/10B | 16 | 8 | 1 |
| Rate 3 | 2.4576 | 8B/10B | 32 | 16 | 2 |
| Rate 4 | 3.0720 | 8B/10B | 40 | 20 | 2 |
| Rate 5 | 4.9152 | 8B/10B | 64 | 32 | 4 |
| Rate 6 | 6.1440 | 8B/10B | 80 | 40 | 5 |
| Rate 7A | 8.1100 | 64B/66B | 128 | 64 | 8 |
| Rate 7 | 9.8304 | 8B/10B | 128 | 64 | 8 |
| Rate 8 | 10.1376 | 64B/66B | 160 | 80 | 10 |
| Rate 9 | 12.1651 | 64B/66B | 192 | 96 | 12 |
| Rate 10 | 24.3302 | 64B/66B | 384 | 192 | 24 |

At 2202, TC-1 for RFoCPRI is initiated.

At 2204, cell site tool 100 identifies a CPRI line rate, network equipment manufacturer (NEM), channel bandwidth, Antenna-Carrier unit (AxC unit) mapping, and dual or quad spectrum, which may be based on user input, and can display this information on the display 103 of the cell site tool 100.

The cell site tool 100 then generates a reference RF signal to emulate a BBU. According to an example, reference RF signal may be generated by RF board 1302 of FIG. 13. A reference CPRI signal is then generated from the reference RF signal, and output to an RRH. According to an example, the reference CPRI signal may be generated by CPRI FPGA 1326 and output by SFP 1330 of FIG. 6. SFP unit 1330 may be connected to a fiber connected to the RRH. According to an example, a response CPRI signal is output from the RRH along a fiber and received by SFP unit 1332 of FIG. 13. The response CPRI signal is then converted into a response RF signal, corresponding to RF operation of the RRH. The response RF signal is then compared to the reference RF signal to identify interference. According to an example, the interference is identified at 2006 in FIG. 20.

At 2206, spectrum analysis with the identified dual or quad spectrum is automatically performed on the response RF signal utilizing an active trace. According to an example, a reference spectrum corresponds to the reference RF signal and a response spectrum corresponds to the response RF signal. According to an example, a dual spectrogram is displayed including the reference spectrum and the response spectrum.

At 2208, a spectrogram analysis with the identified dual or quad spectrum is automatically performed. A visual representation of the spectrogram analysis is displayed showing RF activity through time of the response RF signal including the interference signal event. A spectrogram is a visual representation of the spectrum of frequencies of a signal as it varies with time. According to an example, a reference spectrogram corresponds to the reference RF signal and a response spectrogram corresponds to the response RF signal. According to an example, a dual spectrogram is displayed including the reference spectrogram and the response spectrogram. The spectrograms may be displayed on the display 103 of the cell site tool 100.

At 2210, a trace analysis for signal characterization of the interference signal event in the response RF signal is executed.

At 2212, an event record associated with the executed trace analysis is saved, wherein the event record includes a timer and event count of interference events. According to an example, a limit or visual limit line may be set in the event record by a technician to determine a pass or fail condition. According to another example, a predetermined limit may be set in the event record to automatically determine a pass or fail condition. The saved event record may be replayed if needed to fine tune the test case.

At 2214, if present, an interference signal event is identified, and designated as Event=0 for further testing and report generation.

A test report is then generated. According to an example, generation of a test report is set forth at 2008 of FIG. 20. According to an example, a test report for RFoCPRI may include the CPRI line rate, the NEM, the channel bandwidth, the AxC unit mapping, the identified dual or quad spectrum, the reference spectrum analysis, the response spectrum analysis, the reference spectrogram analysis, the response spectrogram analysis, the trace analysis, and the event record.

Figure 23:
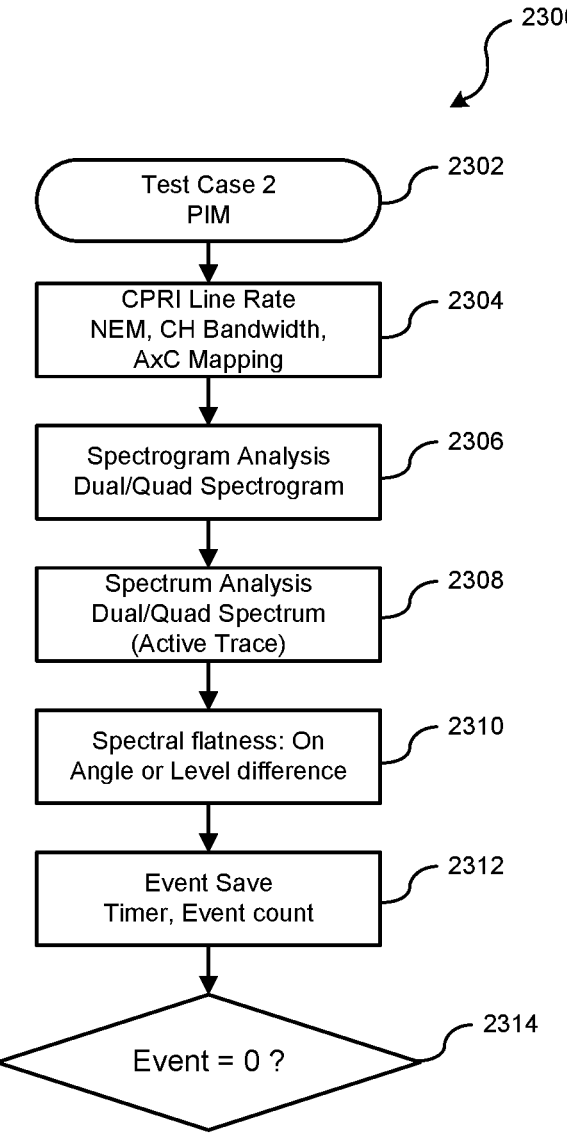
FIG. 23 illustrates test case 2 (TC-2) of an automated detection workflow for Passive InterModulation (PIM) testing, according to an example of the present disclosure.

FIG. 23 illustrates TC-2 of an automated detection workflow 2300 for PIM testing, according to an example of the present disclosure. At 2302 TC-2 for PIM is initiated.

At 2304, cell site tool 100 identifies a CPRI line rate, NEM, channel bandwidth, AxC unit mapping, and dual or quad spectrum, which may be based on user input, and can display this information on the display 103 of the cell site tool 100.

The cell site tool 100 then generates a reference RF signal to emulate a BBU. According to an example, reference RF signal may be generated by RF board 1302 of FIG. 13. A reference CPRI signal is then generated from the reference RF signal, and output to an RRH. According to an example, the reference CPRI signal may be generated by CPRI FPGA 1326 and output by SFP unit 1330 of FIG. 6. SFP unit 1330 may be connected to a fiber connected to the RRH. According to an example, a response CPRI signal is output from the RRH along a fiber and received by SFP unit 1332 of FIG. 13. The response CPRI signal is then converted into a response RF signal, corresponding to RF operation of the RRH. The response RF signal is then compared to the reference RF signal to identify interference. According to an example, the interference is identified at 2006 in FIG. 20.

At 2306, a spectrogram analysis for the identified dual or quad spectrogram is automatically performed, such as described with respect to 2208 of FIG. 22.

At 2308, spectrum analysis is performed on the reference RF signal such as described with respect to 2206 of FIG. 22.

At 2310, spectral flatness is determined for the response RF signal. Spectral flatness is determined indicating whether the spectral flatness is on angle or whether spectral flatness presents a level difference.

At 2312, an event record associated with the first interference signal event is saved, wherein the event record includes a timer and event count. According to an example, a limit or visual limit line may be set in the event record by a technician to determine a pass or fail condition. According to another example, a predetermined limit may be set in the event record to automatically determine a pass or fail condition. The saved event record may be replayed if needed to fine tune the test case.

At 2314, an interference signal event is identified, if present, and designated as Event=0 for further testing and report generation.

Figure 24:
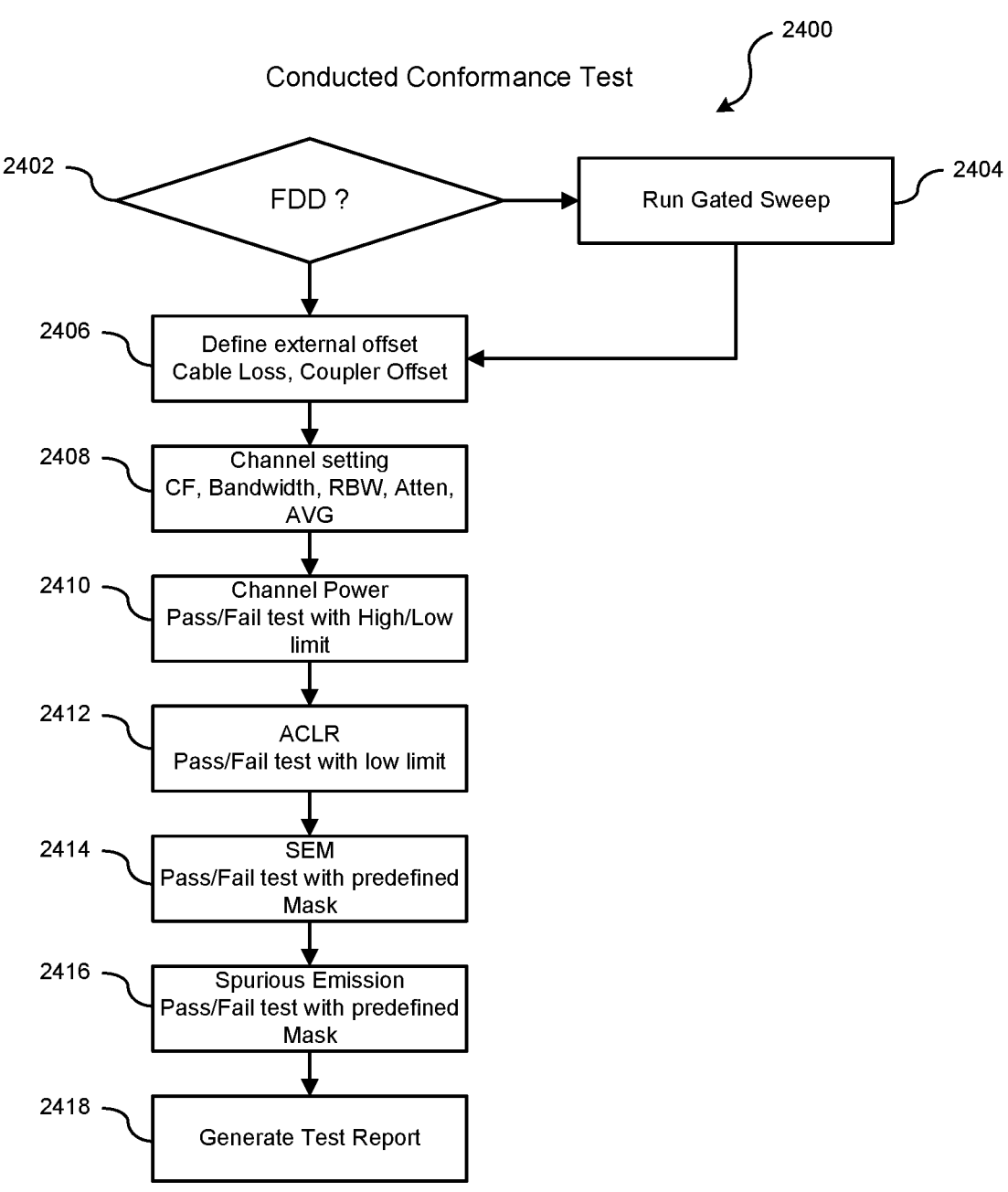
FIG. 24 illustrates an automated workflow for a Conducted Conformance Test, according to an example of the present disclosure.

FIG. 24 illustrates an automated workflow 2400 for a conducted conformance test, according to an example of the present disclosure. 3GPP TS 38.141-1 defines conducted conformance testing requirements for 5G NR base stations. Chapter 6 thereof defines conducted transmitter characteristics and chapter 7 defines conducted receiver characteristics. Conducted characteristics are defined at individual or groups of TAB connectors at the transceiver boundary, which is the conducted interface between the transceiver unit array and the composite antenna. The transceiver unit array is part of the composite transceiver functionality generating modulated transmit signal structures and performing receiver combining and demodulation. The transceiver unit array contains an implementation specific number of transmitter units and an implementation specific number of receiver units. Transmitter units and receiver units may be combined into transceiver units. The transmitter/receiver units have the ability to transmit/receive parallel independent modulated symbol streams. The composite antenna contains a radio distribution network (RDN) and an antenna array. The RDN is a linear passive network which distributes RF power generated by the transceiver unit array to the antenna array, and/or distributes RF signals collected by the antenna array to the transceiver unit array, in an implementation specific way. A cell site including a component based infrastructure is managed by a software system known as a core framework.

A base station (BS) type 1-C only has conducted requirements so it requires compliance to TS 38.141-1 only. A BS type 1-H has both conducted and radiated requirements so it requires compliance to TS 38.141-1 and TS 38.141-2. BS type 1-0 and BS type 2-0 have only radiated requirements so they require compliance to TS 38.141-2 only.

At 2402, a determination is made whether FDD is used for communicating RF signals.

At 2404, if FDD is not used, then TDD is used, and cell site tool 100 automatically performs a gated sweep of the input RF signal when performing tests set forth below.

At 2406, an external offset is defined including cable loss and coupler offset. Cell site tool 100 receives user input, e.g., from a technician, specifying the external offset. Cell site tool 100 is connected to a TAB connector at a transceiver array boundary, which is a conducted interface between a transceiver unit array and a composite antenna, to receive a conducted RF signal.

At 2408, cell site tool 100 determines channel setting information including: a CF designation, bandwidth, resolution bandwidth (RBW), attenuation, and an average value. RBW indicates how well closely spaced signals can be separated for display on display 103 of cell site tool 100. The narrower the RBW filter the more clearly two close signals can be seen as separate signals. Attenuation is a level of attenuation applied to an input signal for proper measurement by cell site tool 100. The average value is a root-mean-square calculation of all measurement points in the display, and is particularly useful in displaying the average value of noise.

At 2410, the conducted RF signal is received by cell site tool 100. Channel power of the conducted RF signal is analyzed with respect to a predetermined high limit and a predetermined low limit to determine a Pass or Fail condition.

At 2412, an Adjacent Channel Leakage Ratio (ACLR) is determined for the conducted RF signal with respect to a predetermined low limit to determine a Pass or Fail condition. ACLR is defined the ratio of transmitted power on an assigned channel to power received in an adjacent radio channel after a receive filter. Each wireless standard has the adjacent channels located at different frequency offsets. Accordingly, ACLR is different for each wireless standard.

At 2414, a spectrum emission mask (SEM) measurement is made for the conducted RF signal by comparing out-of-channel emissions of the conducted RF signal with respect to in-channel power of the conducted RF signal to determine a Pass or Fail condition. A spectrum emission mask (SEM), as defined in 3GPP TS 34.122, is a relative measurement, for an RF signal, of out-of-channel emissions to in-channel power. The SEM measurement is used to measure the excess emissions that may interfere with other channels or systems.

At 2416, a spurious emission measurement is made for the conducted RF signal with respect to a predefined mask to determine a spurious emission Pass or Fail condition.

At 2418, a test report is generated, which may include measurements and indications of Pass or Fail conditions.

FIG. 25 illustrates a workflow 2500 for a radiated conformance test, according to an example of the present disclosure. 3GPP TS38.141-2 defines radiated conformance testing requirements for 5G NR base stations. Chapter 6 thereof defines radiated transmitter characteristics and chapter 7 defines radiated receiver characteristics.

At 2502, a determination is made whether FDD is used for communicating RF signals. If FDD is not used, cell site tool 100 automatically performs a gated sweep at 2504 before proceeding to 2506. If FDD is not present at 2502, operation proceeds directly to 2506.

At 2506, an external offset is determined, including cable loss, coupler offset, distance to antenna, and antenna gain, for example, based on user input.

At 2508 channel setting information is determined, including CF designation, bandwidth, RBW, attenuation, and an average value.

At 2510, channel power in the form of Effective Isotropic Radiated Power (EIRP), is analyzed with respect to a high limit and a low limit to determine a channel power EIRP Pass or Fail condition. EIRP is a measurement of radiated output power from an ideal isotropic antenna in a single direction. An isotropic antenna is meant to distribute power equally in all directions and therefore has a gain of 0 dB. When the power is channeled into a single direction and calculated, the power it is known as EIRP. In other words, EIRP will be the maximum power emitted by the antenna in the direction with highest antenna gain. EIRP, is the total radiated power from a transmitter antenna times the numerical directivity of the antenna in the direction of the receiver, or the power delivered to the antenna times the antenna numerical gain. The numerical path loss is the ratio of EIRP to the power available at the receiver, which is the output of an isotropic antenna substituted for the receiver antenna. When calculating EIRP, losses in the transmission line and the loss of power due to connectors are included.

At 2512, ACLR EIRP is determined with respect to a predetermined low limit to determine an ACLR EIRP Pass or Fail condition.

At 2514, an SEM EIRP measurement is made by comparing out-of-channel emission of the radiated RF signal with respect to in-channel power of the radiated RF signal to determine an SEM Pass or Fail condition.

At 2516, a spurious emission EIRP measurement is made for the radiated RF signal with respect to a predefined mask to determine a spurious emission EIRP Pass or Fail condition.

At 2518, a test report is generated. The test report includes the determination if FDD was present at the radiated DUT, the external offset, the identified channel setting information, the channel power EIRP Pass or Fail condition, the ACLR EIRP Pass or Fail condition, the SEM EIRP Pass or Fail condition, and the spurious emissions EIRP Pass or Fail condition.

Figure 26:
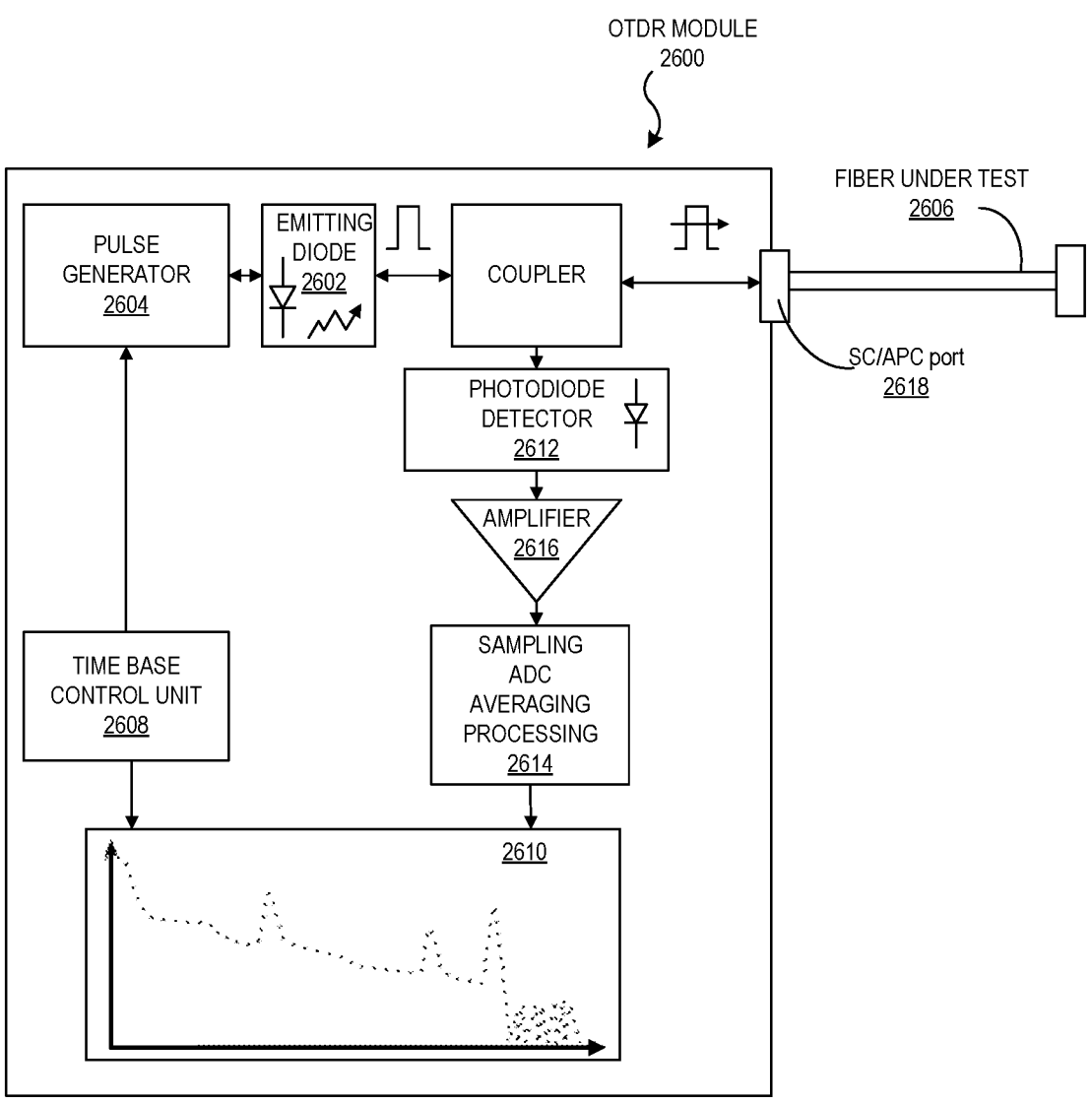
FIG. 26 illustrates a system diagram of an Optical Time-Domain Reflectometer (OTDR) module, according to an example of the present disclosure.

FIG. 26 illustrates a system diagram of OTDR module 2600, according to an example of the present disclosure. OTDR module 2600 may have a form factor similar to expansion module 110 of FIG. 1. OTDR testing generally relates to attenuation, backscatter, reflectance, and refraction. Attenuation relates to a reduction in optical power of the light signal as it is transmitted. The degradation in signal may be due to splices, connectors/connections, or inherent loss within the optical fiber itself. Backscatter is used to describe the diffuse reflection of light waves back in the direction from which the light waves originated. The amount of backscatter is one indicator of total attenuation, because light traveling back to the source represents a loss in downstream signal intensity. In OTDR testing, the amount of backscattered light is only about one-millionth of the test pulse. Reflectance is a measure of the proportion of light striking a surface which is reflected off of it. Unlike backscattered light, reflected light is returned more directly to the light source rather than being diffused in many directions. Connectors/connections and splices may reflect back to the source, allowing OTDR testing to determine the position, changes in condition, and signal loss from these elements. Refraction is the bending of light waves as they pass from one material type to another. The amount of light refracted is determined by the differences in the index of refraction of two fibers joined through splicing, impurities in the glass fiber, material changes in a connector, or any other material change contained within the cable run.

OTDR module 2600 may optimize testing parameters for resolution and accuracy. OTDR testing parameter settings may include Range, Pulse Width, Acquisition Time, and Refractive Index. A Range sets an appropriate range (distance) based on overall fiber length. A Pulse Width is the duration of each laser pulse emitted. An Acquisition Time sets the time duration for averaging the measurements of reflected light. A Refractive Index matches the index of the cable material being tested. In general, the length of the cable run will govern the level of resolution that can be achieved through equipment settings. Testing a longer run may require compromising the sensitivity. Longer averaging times can also contribute to better resolution by increasing the signal-to-noise ratio, thereby "smoothing" the data presented in the test curve. A cell site tool that may optimize testing parameters for resolution and accuracy with uniform setup and reporting may be useful for evaluating the potential for cable degradation.

OTDR module 2600 includes an emitting laser diode (or a plurality of emitting laser diodes) 2602 to generate light by an electrical current. The emitting laser diode 2602 may include a semiconductor. A pulse generator 2604 may control a laser diode which sends light pulses into an optical fiber 2606 under test, which may be the DUT, by connection to a SC/APC port 2618, also known as a Singlemode Core/Angle-polished Physical Contact port. The optical fiber 2606 may be connected to SC/APC port 2618 by a launch cable. A time base control unit 2608 may control operations of the OTDR module 2600. A sensor display 2610 may display measured characteristics of the optical fiber 2606, for example, in the form of traces and other attributes as disclosed herein. A photodiode detector 2612 may analyze the return signal from the optical fiber 2606 under test to generate a signal proportional to the intensity of an optical field. A sampling ADC averaging block at 2614 may be analyze the amplified return signal from amplifier 2616 to generate the display at the sensor display 2610. According to examples, the emitting laser diode 2602 may emit a plurality of laser beams. Each laser beam may include a different pulse width. For example, each laser beam may include pulse widths of 1 μs, 300 ns, 100 ns, 30 ns, and 10 ns.

The time base control unit 2608 may analyze, for each laser beam, a backscattered signal from the DUT, such as an optical fiber being tested. For example, the DUT may include the optical fiber 2606. The time base control unit 2608 may generate, for each backscattered signal, a trace along the DUT. Further, the time base control unit 2608 may generate, based on an analysis of each trace along the DUT, a combined trace that identifies optical events detected along the DUT. In this regard, the combined trace may be formed of different trace sections, where the trace sections may be selected from any of the traces obtained for each pulse width and/or each pulse width and wavelength used during the acquisition. Alternatively or additionally, the trace sections may be generated based on specific algorithms as disclosed herein. Further, the acquisitions may be based on several pulse widths and several wavelengths to provide as many combined traces as the number of wavelengths used. Moreover, for a given trace (following an acquisition for a given pulse width) a single trace section or a plurality of non-adjacent trace sections may be determined.

According to examples, the time base control unit 2608 may generate, based on the analysis of each trace along the DUT, the combined trace that identifies optical events detected along the DUT by determining, for each analyzed trace along the DUT, whether a respective trace section of an analyzed trace may be included in the combined trace. Based on a determination that the respective trace section of the analyzed trace is to be included in the combined trace, the time base control unit 2608 may include the respective trace section in the combined trace. Further, based on a determination that the respective trace section of the analyzed trace is to not be included in the combined trace, the time base control unit 2608 may exclude the respective trace section from the combined trace.

According to examples, the time base control unit 2608 may determine, for each analyzed trace along the DUT, whether the respective trace section of the analyzed trace is to be included in the combined trace by determining, for each analyzed trace along the DUT, whether the respective trace section of the analyzed trace includes an optical event. Further, based on a determination that the respective trace section of the analyzed trace includes the optical event, the time base control unit 2608 may include the respective trace section in the combined trace. Thus, for a given pulse width, a trace section may be retained as soon as at least one optical event has been detected on the trace corresponding to this pulse width.

According to examples, the time base control unit 2608 may determine, for a respective trace section included in the combined trace, whether a further trace section is adjacent to an optical event for the respective trace section included in the combined trace. Further, based on a determination that the further trace section is adjacent to the optical event for the respective trace section included in the combined trace, the time base control unit 2608 may determine, for the combined trace, a single point that accounts for the further trace section and the optical event for the respective trace section included in the combined trace. Thus, in order to avoid any overlapping trace sections at a given point, various algorithms may be applied to determine a single point at a given position. According to various criteria (e.g., quality criteria) and for a given position, a single acquisition point may be selected on a trace section Sn and displayed to provide a single combined trace. The criteria in this regard may be derived, for example, from optical event position, event dead zone, attenuation dead zone, splitter attenuation dead zone, noise level or peak to peak noise (local noise), pulse width dynamics, etc. Further, on the overlapping area, according to quality criteria, several sub sections that are derived from initial trace sections may be generated. For a defined trace section, dedicated algorithms may be used when two trace sections are discontinuous (e.g., to join two different trace sections from two different pulse widths), or no trace section of an overlapping area meets a quality criteria. In this regard, the quality criteria may be derived, for example, from event dead zone, attenuation dead zone, splitter attenuation dead zone, noise level or peak to peak noise (local noise), optical event parameter (attenuation, reflectance, distance . . . ), pulse width dynamics, etc.

According to examples, the time base control unit 2608 may determine, for each analyzed trace along the DUT, whether the respective trace section of the analyzed trace is to be included in the combined trace by determining, for each analyzed trace along the DUT, whether the respective trace section of the analyzed trace includes a plurality of optical events. Based on a determination that the respective trace section of the analyzed trace includes the plurality of optical events, the time base control unit 2608 may include the respective trace section in the combined trace. Thus, for a given pulse width, a trace section may encompass the position(s) of the different events identified on the trace corresponding to the pulse width.

According to examples, the time base control unit 2608 may determine, for each analyzed trace along the DUT, whether the respective trace section of the analyzed trace is to be included in the combined trace by determining, for each analyzed trace along the DUT, whether the respective trace section of the analyzed trace meets a quality criterion. Based on a determination that the respective trace section of the analyzed trace does not meet the quality criterion, the time base control unit 2608 may exclude the respective trace section from the combined trace. Thus, the traces without any relevant information related to optical events may not be displayed.

According to examples, the time base control unit 2608 may generate, based on the analysis of each trace along the DUT, the combined trace that identifies optical events detected along the DUT by interpolating a combined trace section between two non-adjacent combined trace sections of the combined trace to form the combined trace. According to examples, the pulse width of one of the two non-adjacent combined trace sections may be different from the pulse width of another one of the two non-adjacent combined trace sections. According to examples, the time base control unit 2608 may reduce a length of the interpolated combined trace section by including, from an analyzed trace, an intermediate section that does not include an optical event.

According to examples, the time base control unit 2608 may generate, based on the analysis of each trace along the DUT, the combined trace that identifies optical events detected along the DUT by determining, for each analyzed trace along the DUT, whether a respective trace section of an analyzed trace is to be included in the combined trace. Based on a determination that no respective trace section of the analyzed trace meets a quality criteria, the time base control unit 2608 may interpolate a combined trace section where no respective trace section is included in the combined trace.

According to examples, the time base control unit 2608 may generate, based on the analysis of each trace along the DUT, the combined trace that identifies optical events detected along the DUT by selecting, based on the analysis of each trace along the DUT, a plurality of trace sections from the analyzed traces. Further, the time base control unit 2608 may connect the selected plurality of trace sections to generate the combined trace.

According to examples, the laser source (e.g., the emitting laser diode 2602) may emit a further laser beam including a further different pulse width. The time base control unit 2608 may analyze, for the further laser beam, a further backscattered signal from the DUT. Further, the time base control unit 2608 may generate, for the further backscattered signal, a further trace along the DUT. The time base control unit 2608 may update, based on a further analysis of the further trace along the DUT, the combined trace that identifies the optical events detected along the DUT. Thus, the combined trace may be updated after each new acquisition using a different pulse width.

According to examples, the emitting laser diode 2602 may emit a first set of a plurality of laser beams, with each laser beam of the first set including a different pulse width and a first specified wavelength (e.g., 1550 nm). Further, the emitting laser diode 2602 may emit a second set of a plurality of laser beams, with each laser beam of the second set including a different pulse width and a second specified wavelength (e.g., 1310 nm). In this regard, the time base control unit 2608 may analyze, for each laser beam of the first set and the second set, a backscattered signal from the DUT. The time base control unit 2608 may generate, for each backscattered signal for the first set and the second set, a trace along the DUT. The time base control unit 2608 may generate, based on an analysis of each trace along the DUT, a first combined trace that identifies optical events detected along the DUT for the first set, and a second combined trace that identifies optical events detected along the DUT for the second set.

Figure 27:
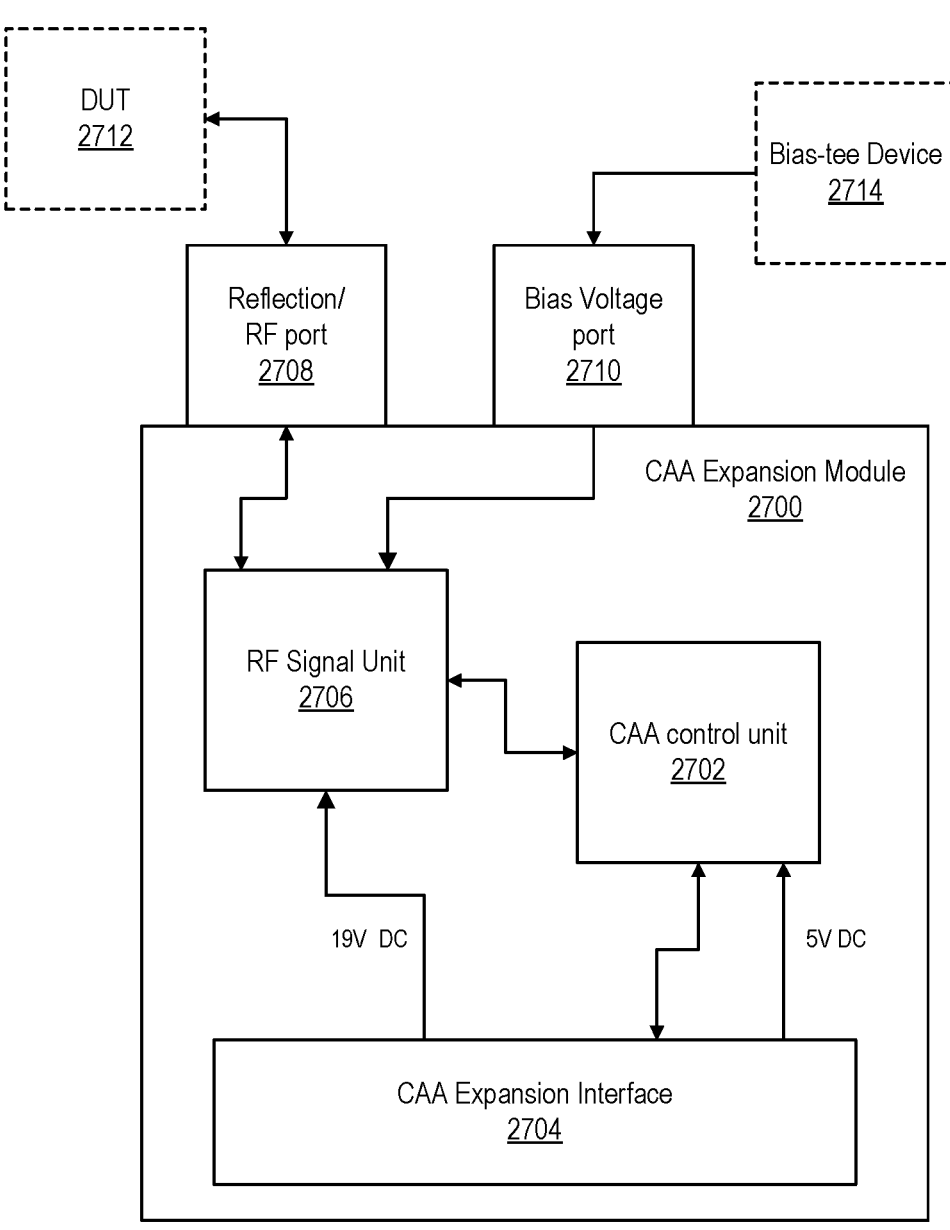
FIG. 27 illustrates a system diagram of a Cable Antenna Analyzer (CAA) module, according to an example of the disclosure.

FIG. 27 illustrates a system diagram of CAA module 2700, according to an example of the disclosure. CAA module 2700 may have a form factor similar to expansion module 110 of FIG. 1. CAA module 2700 is controlled by CAA control unit 2702, which includes a hardware processor and communicates control and CAA analysis information by way of CAA expansion interface 2704. According to an example, CAA expansion interface 2704 is a 140 pin connector having 0.8 mm pitch Gold-Fingers to electrically mate with a corresponding ALE base module Expansion Interface. CAA control unit (processor) 2702 controls RF Signal Unit 2706 to generate a reference RF signal to be output by way of Reflection/RF port 2708. RF Signal Unit 2706 produces the reference RF by buffering a bias voltage received from bias voltage port 2710.

According to an example, Reflection/RF port 2708 may be a Type-N, female connector having an associated impedance of 50Ω nominal, a damage level of 30 dBm maximum nominal and ±50 V DC maximum nominal. The bias voltage port 2710 is provided for connecting to an external bias-tee device 2714. The bias voltage port 2710 may be a SMA, female connector having an associated impedance of 50Ω nominal. An SMA connector is a semi-precision coaxial RF connector for coaxial cable with a screw-type coupling mechanism. In general, SMA connectors may have a 50Ω impedance. An SMA connector is often used for providing RF connectivity between boards, and many microwave components including filters, attenuators, mixers and oscillators, use SMA connectors. The connectors generally have a threaded outer coupling interface that has a hexagonal shape, allowing it to be tightened with a spanner. Reflection/RF port 2708 is connected to device under test (DUT) 2712, applies a reference voltage thereto and measures a reflection therefrom.

According to an example, an CAA module 2700 may require a power input of 19 V DC, with a power consumption of 6.2 W without using the external bias-tee device 2714. Measurements by CAA module 2700 include: Return Loss or Voltage Standing Wave Ratio (VSWR), Distance to Fault (DTF), Insertion Loss or Gain Testing (including 1-Port or 2-Port devices like TMA's, filters, etc.), and RF power measurements. Both tests of Return Loss and VSWR indicate how well a cable and antenna system is matched for impedance. VSWR is also a measure of how efficiently RF power is being transmitted through a transmission line and into an end-load.

Voltage Standing Wave Ratio (VSWR) is an indicator of a reflected signal on the entire feed line. VSWR is defined as the ratio between the maximum and minimum voltage standing waves.

$$VSWR = \left(\frac{V_{MAX}}{V_{MIN}}\right)$$

Return Loss (RL) is the loss of signal power resulting from the reflection caused by a discontinuity in the transmission line.

$$RL = 10\log\left(\frac{Pi}{Pr}\right)$$

$$RL = 20\log\left(\frac{VSWR+1}{VSWR-1}\right)$$

VSWR and Return Loss may be provided for comparison in a dual-mode measurement by the cell site tool that provides a Cable and Antenna Analyzer (CAA) Module.

Distance to Fault (DTF) is provided by a product of velocity and time.

$$Distance = Velocity \times Time$$

While VSWR shows the entire reflecting on frequency domain, DTF instead shows the entire reflecting power on the time domain and performs Time to Distance conversion. VSWR and DTF may be provided for comparison in a dual-mode measurement by the cell site tool that provides a Cable and Antenna Analyzer (CAA) Module.

Insertion Loss or Gain Testing may be 1-Port or 2-Port. A 1-Port cable loss measures signal loss through a cable or other devices over a defined frequency range. A 2-Port attenuation loss measures signal loss (or gain) over a defined frequency range and for certain insertion devices like filters, attenuators or amplifiers (elements with an input and an output port). In other words, insertion measurements show information about the operating conditions (attenuation or gain) that certain 1-Port devices like a cable or other 2-Port devices like filters or amplifiers may have. 1-Port Phase also measures $S_{11}$ phase in order to tune antennas and phase match cables. $S_{11}$ phase is directly related to VSWR and represents how much power is reflected from an antenna, and hence is known as the reflection coefficient (sometimes written as gamma (Γ): or return loss). For example, if $S_{11}$=0 dB then all power is reflected from an antenna and nothing is radiated. For a 2-Port transmission measurement, an analyzer generates a high power signal (0 dBm) for insertion loss of a low power signal (−30 dBm) for insertion gain over the frequency of interest. A 2-Port transmission measurement measures the incoming signal from the device under test across the frequency of interest. The relative Gain/Loss is calculated and displayed against frequency.

CAA module 2700 is not an instant-on device. CAA module 2700 takes a period of time to warm up (on the order of 10 minutes or more), and must be calibrated. Measurements may be performed by a CAA Module after calibrating to open-short-load (OSL) standards, and within a valid calibration period. Calibration may be performed under an operating temperature of 20 to 30° C. for 15 minutes.

The DUT 2712 may be an RRH or an antenna. The primary measurement method involves a basic return loss measurement. Since a cabling system carries high frequency signals (typically >=700 MHz), the return loss measurement needs to characterize not only a single measurement at a random frequency, but be performed at the frequency band (s) that is (are) expected to be used for the particular antenna(s). Accordingly, a sweep test is needed. Another CAA use case is the characterization of an amplifier/attenuator that requires 2-port measurements. Another use case requires verifying Tower Mounted Amplifiers (TMAs) that require Bias-T components and a proper internal power supply.

What is claimed is:
1. A test tool for cell site testing, comprising:
a base module having a housing containing:
electrical components to provide common base testing, including signal power testing and datalink testing, of a cell site,
an internal battery compartment containing a battery, and
a power interface circuit to receive power from one of the internal battery compartment or a battery module external to the base module, and distribute the power to the electrical components inside the base module and external modules attached to the base module, wherein the housing of the base module includes a top surface and a bottom surface;

at least one expansion module removably connected to the bottom surface of the base module to receive the power from the base module, wherein the at least one expansion module is to provide an additional testing of the cell site that is different from the common base testing provided by the base module;

at least one solution module removably connected to the top surface of the base module to receive the power from the base module, wherein the at least one solution module is to operate to consume resources in the base module corresponding to the at least one solution module to provide a specific testing of the cell site that is different from the common base testing provided by the base module and the additional testing provided by the at least one expansion module; and an input/output (I/O) module removably connected to a top of the at least one solution module to receive the power and communication from the base module through the at least one solution module and to display information, wherein the base module, the at least one expansion module, the at least one solution module, and the I/O module are integrated into a single unified device.

2. The test tool of claim 1, the at least one expansion module includes first and second expansion modules removably connected to the bottom surface of the base module via first and second expansion interfaces, respectively.

3. The test tool of claim 1, wherein the test tool is to test optical fibers, radio frequency (RF), Spectrum Analysis (SA), Common Public Radio Interface (CPRI), and Ethernet.

4. The test tool of claim 1, wherein the at least one expansion module is one of a cable antenna analyzer (CAA) module, an Optical Time-Domain Reflectometer (OTDR) module, or an Optical Spectrum Analyzer (OSA) module.

5. The test tool of claim 1, wherein the at least one solution module is one of a Common Public Radio Interface (CPRI) Solution Module housing a single internal module or a Spectrum Analyzer and Common Public Radio Interface (SA/CPRI) Solution Module housing dual internal modules.

6. The test tool of claim 1, wherein the battery module is removably connected to the bottom surface the base module and includes a chargeable battery and an internal circuitry to regulate charging of the chargeable battery and to supply the power to the base module in a uniform manner.

7. The test tool of claim 1, wherein the housing of the base module further contains:

a cooling unit including a temperature sensor and a fan to facilitate cooling of the electrical components inside the base module.

8. The test tool of claim 1, wherein the electrical components in the base module include: a power meter module to determine optical signal power of an optical fiber and a talkset-datalink module to communicate voice or data with another device along the optical fiber.

9. The test tool of claim 1, wherein the electrical components in the base module include a Visual Fault Locator module to provide detection of a visual fault location along an optical fiber.

10. A test tool for cell site testing, comprising:

a base module having a housing containing:

electrical components to provide common base testing of a cell site, the common base testing provided by the base module including power meter testing, talkset-datalink testing, and Visual Fault Locator testing, an internal battery compartment having a battery, a power interface circuit to receive power from one of the internal battery compartment or a battery module external to the base module, and distribute the power to the electrical components in the base module and external modules attached to the base module, wherein the housing of the base module includes a top surface having a first top interface and a bottom surface having a first bottom interface;

a first expansion module removably connected to the bottom surface of the base module, wherein the first expansion module includes a first expansion interface connected to the first bottom interface of the base module to receive the power from the base module, and wherein the first expansion module is to provide an additional test of the cell site that is different from the common base testing provided by the base module;

a first solution module removably connected to the top surface of the base module, wherein the first solution module includes a first solution interface connected to the first top interface of the base module to receive the power from the base module, and wherein the first solution module is to operate to consume resources in the base module corresponding to the first solution module to provide a specific testing of the cell site that is different from the common base testing provided by the base module and the additional testing provided by the first expansion module; and an input/output (I/O) module removably connected to a top of the first solution module, the I/O module comprising a display to display information, wherein the first solution module provides the power received from the base module to the I/O module, wherein the base module, the first expansion module, the first solution module, and the I/O module are integrated into a single unified device.

11. The test tool of claim 10, wherein the test tool is used to test optical fibers, radio frequency (RF), Spectrum Analysis (SA), Common Public Radio Interface (CPRI), and Ethernet.

12. The test tool of claim 10, wherein the first expansion module is one of a cable antenna analyzer (CAA) module, an Optical Time-Domain Reflectometer (OTDR) module, or an Optical Spectrum Analyzer (OSA) module.

13. The test tool of claim 10, wherein the first solution module is one of a Common Public Radio Interface (CPRI) Solution Module housing a single internal module or a Spectrum Analyzer and Common Public Radio Interface (SA/CPRI) Solution Module housing dual internal modules.

14. The test tool of claim 10, wherein the battery module is removably connected to the bottom surface of the base module and includes a chargeable battery and an internal circuitry to regulate charging of the chargeable battery and to supply the power to the base module in a uniform manner.

15. The test tool of claim 10, wherein the bottom surface of the base module further includes a second bottom interface, and wherein the test tool further includes:

a second expansion module including a second expansion interface connected to the second bottom interface of the base module.

16. The test tool of claim 10, wherein the housing of the base module further contains: ventilation ports to facilitate cooling of the electrical components and a loudspeaker to provide audio information.

17. The test tool of claim 10, wherein the electrical components in the base module include: a power meter module to determine optical signal power of an optical fiber and a talkset-datalink module to communicate voice or data with another device along the optical fiber.

18. The test tool of claim 10, wherein the electrical components in the base module include: a Visual Fault Locator module to provide detection of a fault location along an optical fiber.

19. A test tool comprising:

a base module having a housing containing:

electrical components to provide common base testing, including signal power testing and datalink testing, of a cell site, a processor to communicate with a server to obtain configuration settings and software updates for the common base testing, and an internal battery compartment having a battery to provide power to the base module, wherein the housing of the base module includes a top surface and a bottom surface;

a plurality of expansion modules removably connected to the bottom surface of the base module, wherein one of the plurality of expansion modules is a battery module to provide additional power to the base module;

an input/output (I/O) module to display information; and at least one solution module removably connected between the top surface of the base module and the I/O module, wherein the at least one solution module is to operate to consume resources in the base module corresponding to the at least one solution module to provide a specific testing of the cell site that is different from the common base testing provided by the base module, wherein the base module provides the power received from the internal battery compartment or the additional power received from the first expansion module to the at least one solution module, and the at least one solution module provides the power received from the base module to the I/O module, and wherein the base module, the plurality of expansion modules, the at least one solution module, and the I/O module are integrated into a single unified device.

20. The test tool of claim 19, wherein the at least one solution module includes a plurality of solution modules connected on top of each other.

* * * * *